US009481585B2

(12) United States Patent
Liang et al.

(10) Patent No.: US 9,481,585 B2
(45) Date of Patent: Nov. 1, 2016

(54) FLOW DISTRIBUTORS FOR ELECTROCHEMICAL SEPARATION

(75) Inventors: Li-Shiang Liang, Harvard, MA (US); Keng Hoo Yeo, Singapore (SG); Zhee Min Jimmy Yong, Singapore (SG)

(73) Assignee: Evoqua Water Technologies Pte. Ltd, Singapore (SG)

( * ) Notice: Subject to any disclaimer, the term of this patent is extended or adjusted under 35 U.S.C. 154(b) by 0 days.

(21) Appl. No.: 13/294,235

(22) Filed: Nov. 11, 2011

(65) Prior Publication Data
US 2012/0118731 A1    May 17, 2012

Related U.S. Application Data

(60) Provisional application No. 61/510,157, filed on Jul. 21, 2011, provisional application No. 61/413,021, filed on Nov. 12, 2010.

(51) Int. Cl.
| | |
|---|---|
| *B01D 61/46* | (2006.01) |
| *B01D 61/48* | (2006.01) |
| *C02F 1/469* | (2006.01) |
| *B01D 61/50* | (2006.01) |
| *B01D 61/52* | (2006.01) |
| *C25B 9/00* | (2006.01) |
| *C25B 9/08* | (2006.01) |

(Continued)

(52) U.S. Cl.
CPC ............ *C02F 1/4695* (2013.01); *B01D 61/46* (2013.01); *B01D 61/48* (2013.01); *C02F 1/4693* (2013.01); *C25B 9/00* (2013.01); *C25B 9/08* (2013.01); *C25B 9/18* (2013.01); *H01F 41/02* (2013.01); *C02F 2201/46* (2013.01); *Y10T 29/49002* (2015.01); *Y10T 29/4902* (2015.01)

(58) Field of Classification Search
CPC ......... C25B 9/00; C25B 13/00; C02F 1/469; C02F 1/4695; B01D 61/46; B01D 61/48; B01D 61/50; B01D 61/52
USPC ............. 204/242, 275.1, 518–520, 522–525, 204/627, 632–636, 638, 639
See application file for complete search history.

(56) References Cited

U.S. PATENT DOCUMENTS

| | | | |
|---|---|---|---|
| 2,784,158 | A | 3/1957 | Bodamer et al. |
| 2,894,894 | A | 7/1959 | Kressman et al. |
| 2,923,674 | A | 2/1960 | Kressman |

(Continued)

FOREIGN PATENT DOCUMENTS

| | | |
|---|---|---|
| AU | 2008200413 A1 | 2/2009 |
| CN | 201037122 Y | 3/2008 |

(Continued)

OTHER PUBLICATIONS

Tanaka et al. "A Computer Simulation of Ion Exchange Membrane Electrodialysis for Concentration of Seawater". Membrane Water Treatment, vol. 1, No. 1 (2010) pp. 13-37.

(Continued)

*Primary Examiner* — Zulmariam Mendez

(57) ABSTRACT

An electrochemical separation system may be modular and may include at least a first modular unit and a second modular unit. Each modular unit may include a cell stack and a frame. The frame may include a manifold system. A flow distribution system in the frame may enhance current efficiency. Spacers positioned between modular units may also enhance current efficiency of the system.

25 Claims, 50 Drawing Sheets

(51) Int. Cl.
 *C25B 9/18* (2006.01)
 *H01F 41/02* (2006.01)

(56) References Cited

U.S. PATENT DOCUMENTS

| | | |
|---|---|---|
| 2,990,361 A | 6/1961 | Solt |
| 3,933,617 A | 1/1976 | Yamamoto et al. |
| 4,022,692 A | 5/1977 | Janneck |
| 4,033,850 A | 7/1977 | Kedem et al. |
| 4,217,200 A | 8/1980 | Kedem et al. |
| 4,303,493 A | 12/1981 | Kneifel et al. |
| 4,350,581 A | 9/1982 | Schmoldt et al. |
| 4,569,747 A | 2/1986 | Kedem et al. |
| 4,624,778 A | 11/1986 | Clermont et al. |
| 4,732,656 A | 3/1988 | Hurd |
| 5,116,509 A | 5/1992 | White |
| 5,154,809 A | 10/1992 | Oren et al. |
| 5,292,422 A | 3/1994 | Liang et al. |
| 5,407,553 A | 4/1995 | Herron et al. |
| 5,439,577 A | 8/1995 | Weres et al. |
| 5,681,438 A | 10/1997 | Proulx |
| 6,197,174 B1 | 3/2001 | Barber et al. |
| 6,241,867 B1 | 6/2001 | Mir |
| 6,284,124 B1 | 9/2001 | DiMascio et al. |
| 6,402,920 B1 | 6/2002 | Sato et al. |
| 6,649,037 B2 | 11/2003 | Liang et al. |
| 6,929,748 B2 | 8/2005 | Avijit et al. |
| 6,929,765 B2 | 8/2005 | Cotton et al. |
| 7,094,325 B2 | 8/2006 | Mack et al. |
| 7,147,785 B2 | 12/2006 | Arba et al. |
| 7,232,507 B2 | 6/2007 | Gattrell et al. |
| 7,335,284 B2 | 2/2008 | Haenni et al. |
| 7,572,359 B2 | 8/2009 | Liang et al. |
| 7,662,267 B2 | 2/2010 | Carson et al. |
| 8,101,058 B2 | 1/2012 | Liang et al. |
| 8,114,260 B2 | 2/2012 | Wilkins et al. |
| 8,627,560 B2 | 1/2014 | Liang et al. |
| 8,741,121 B2 | 6/2014 | Liang et al. |
| 8,956,521 B2 | 2/2015 | Liang et al. |
| 9,139,455 B2 | 9/2015 | Liang et al. |
| 9,187,350 B2 | 11/2015 | Liang et al. |
| 9,227,858 B2 | 1/2016 | Liang et al. |
| 2001/0037942 A1 | 11/2001 | Schmidt et al. |
| 2002/0011413 A1 | 1/2002 | DiMascio et al. |
| 2003/0019818 A1 | 1/2003 | Carson et al. |
| 2003/0079992 A1 | 5/2003 | Wilkins et al. |
| 2003/0089609 A1 | 5/2003 | Liang et al. |
| 2003/0173222 A1 | 9/2003 | Srinivasan et al. |
| 2003/0235749 A1 | 12/2003 | Haltiner et al. |
| 2004/0159543 A1 | 8/2004 | Boyer et al. |
| 2004/0178075 A1 | 9/2004 | Sato |
| 2004/0206627 A1* | 10/2004 | Bejtlich et al. ............. 204/632 |
| 2005/0037254 A1 | 2/2005 | Skala et al. |
| 2005/0051485 A1 | 3/2005 | Saini |
| 2005/0064266 A1 | 3/2005 | Abdou et al. |
| 2005/0087446 A1 | 4/2005 | Liang et al. |
| 2005/0103630 A1 | 5/2005 | Ganzi et al. |
| 2006/0016685 A1 | 1/2006 | Hawkins et al. |
| 2006/0144787 A1 | 7/2006 | Schmidt et al. |
| 2006/0163056 A1 | 7/2006 | Grebenyuk et al. |
| 2006/0166053 A1 | 7/2006 | Badding et al. |
| 2006/0231495 A1 | 10/2006 | Freydina et al. |
| 2006/0249390 A1 | 11/2006 | Yan et al. |
| 2006/0254919 A1 | 11/2006 | Jangbarwala |
| 2006/0263646 A1 | 11/2006 | Seale |
| 2007/0215474 A1 | 9/2007 | Batchelder et al. |
| 2008/0073215 A1 | 3/2008 | Barber et al. |
| 2008/0105551 A1 | 5/2008 | Wang et al. |
| 2008/0182147 A1 | 7/2008 | Blake et al. |
| 2008/0245667 A1 | 10/2008 | Jones et al. |
| 2010/0086819 A1 | 4/2010 | Gemba et al. |
| 2010/0163471 A1 | 7/2010 | Elyanow et al. |
| 2010/0181257 A1 | 7/2010 | Frechet et al. |
| 2010/0282689 A1 | 11/2010 | Ganzi et al. |
| 2010/0326833 A1 | 12/2010 | Messalem et al. |
| 2012/0118729 A1 | 5/2012 | Liang et al. |
| 2012/0118738 A1 | 5/2012 | Liang et al. |

FOREIGN PATENT DOCUMENTS

| | | |
|---|---|---|
| CN | 201482423 U | 5/2010 |
| EP | 1387428 A2 | 2/2004 |
| EP | 1598318 A1 | 11/2005 |
| EP | 2131430 A1 | 12/2009 |
| GB | 852272 A | 10/1960 |
| JP | 2004-243194 A | 9/2004 |
| JP | 2009-095821 A | 5/2009 |
| SU | 527197 A1 | 9/1976 |
| WO | 9406548 A1 | 3/1994 |
| WO | 03026049 A2 | 3/2003 |
| WO | 2005092799 A1 | 10/2005 |
| WO | 2008036461 A1 | 3/2008 |
| WO | 2008048656 A2 | 4/2008 |
| WO | 2009051612 A1 | 4/2009 |
| WO | 2009077992 A2 | 6/2009 |
| WO | 2011163278 A2 | 12/2011 |

OTHER PUBLICATIONS

International Search Report for PCT/US2011/060321 dated Mar. 9, 2012.

"HEED® Current Utilization Efficiency." EET Corporation. Sep. 3, 2009 capture of <http://www.eetcorp.com/Its/graph_HEED1.htm> using WayBack Machine Internet Archive.

Holt, "The path of least resistance," Electrical Construction and Maintenance, Jul. 1, 2001, <http://ecmweb.com/content/path-least-resistance>.

Sadrzadeh et al., "Treatment of sea water using electrodialysis: Current efficiency evaluation," Oct. 2, 2009, Desalination, vol. 249, Issue 1, pp. 279-285.

* cited by examiner

Section view

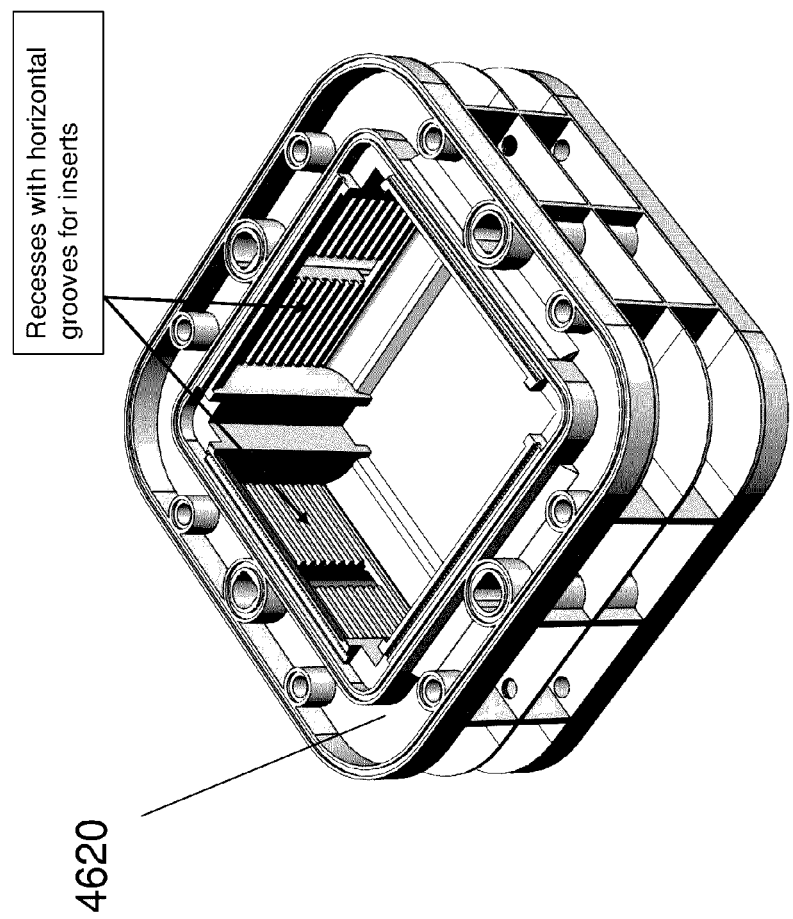

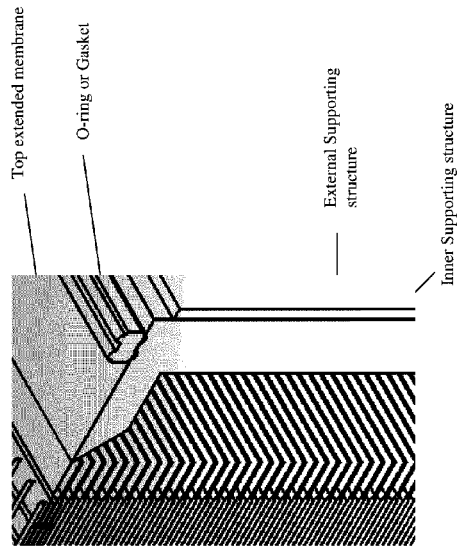
FIG. 47C
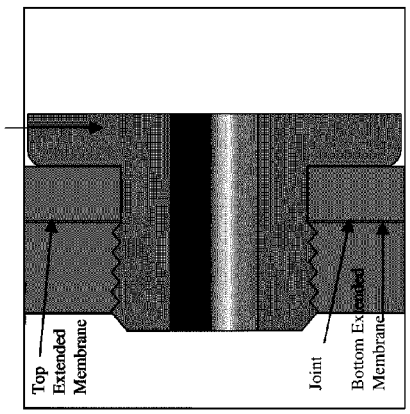
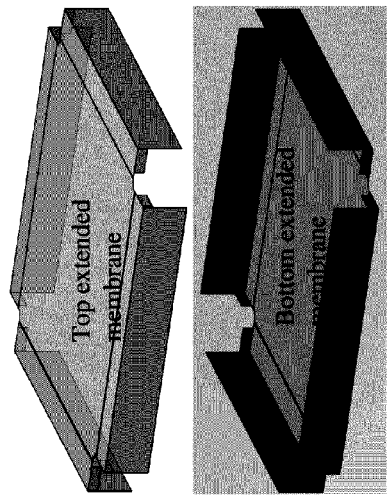
FIG. 47A
FIG. 47B

FLOW DISTRIBUTORS FOR ELECTROCHEMICAL SEPARATION

CROSS-REFERENCE TO RELATED APPLICATIONS

This application claims priority under 35 U.S.C. §119(e) to U.S. Provisional Patent Application Ser. No. 61/413,021, filed on Nov. 12, 2010, titled "CROSS-FLOW ELECTROCHEMICAL DEIONIZATION DEVICE AND METHODS OF MANUFACTURING THEREOF" and to U.S. Provisional Patent Application Ser. No. 61/510,157, filed on Jul. 21, 2011, titled "MODULAR CROSS-FLOW ELECTRODIALYSIS DEVICES AND METHODS OF MANUFACTURING THEREOF," the entire disclosure of each of which is hereby incorporated herein by reference in its entirety for all purposes.

FIELD OF THE DISCLOSURE

Aspects relate generally to electrochemical separation and, more particularly, to modular electrochemical systems and methods.

SUMMARY

In accordance with one or more aspects, an electrochemical separation system may comprise a first electrode, a second electrode, a first electrochemical separation modular unit having a first cell stack defining a plurality of alternating depleting compartments and concentrating compartments supported by a first frame, the first electrochemical separation modular unit positioned between the first electrode and the second electrode, and a second electrochemical separation modular unit, adjacent to and in cooperation with the first electrochemical separation modular unit, having a second cell stack defining a plurality of alternating depleting compartments and concentrating compartments supported by a second frame, the second electrochemical separation modular unit positioned between the first electrochemical separation modular unit and the second electrode.

In accordance with one or more aspects, a method of assembling an electrochemical separation system may comprise mounting a first electrochemical separation modular unit having a first cell stack surrounded by a first frame in a vessel between a first electrode and a second electrode, and mounting a second electrochemical separation modular unit having a second cell stack surrounded by a second frame in the vessel between the first electrochemical separation modular unit and the second electrode.

In accordance with one or more aspects, an electrochemical separation modular unit may comprise a cell stack defining a plurality of alternating depleting compartments and concentrating compartments, and a frame surrounding the cell stack and including a manifold system configured to facilitate fluid flow through the cell stack.

In accordance with one or more aspects, a flow distributor for electrochemical separation may comprise a plurality of first passages oriented in a first direction and configured to deliver feed to at least one compartment of an electrochemical separation device, and a plurality of second passages oriented in a second direction, the plurality of second passages in fluid communication with the plurality of first passages and with an inlet manifold associated with the electrochemical separation device.

In accordance with one or more aspects, an electrochemical separation system may comprise a first electrode, a second electrode, a first electrochemical separation modular unit including a plurality of alternating depleting compartments and concentrating compartments positioned between the first and second electrodes, a second electrochemical separation modular unit including a plurality of alternating depleting compartments and concentrating compartments, the second electrochemical separation modular unit arranged in cooperation with the first electrochemical separation modular unit and positioned between the first electrochemical separation modular unit and the second electrode, and a spacer disposed between and adjacent the first and second electrochemical separation modular units configured to reduce current loss within the system.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIG. 46 is a schematic illustration of a molded frame with horizontal grooves in recesses for inserts in accordance with one or more embodiments;

FIGS. 47A-47C present schematic illustrations of a modular unit including extended end membranes in accordance with one or more embodiments;

DETAILED DESCRIPTION

Figure 1:
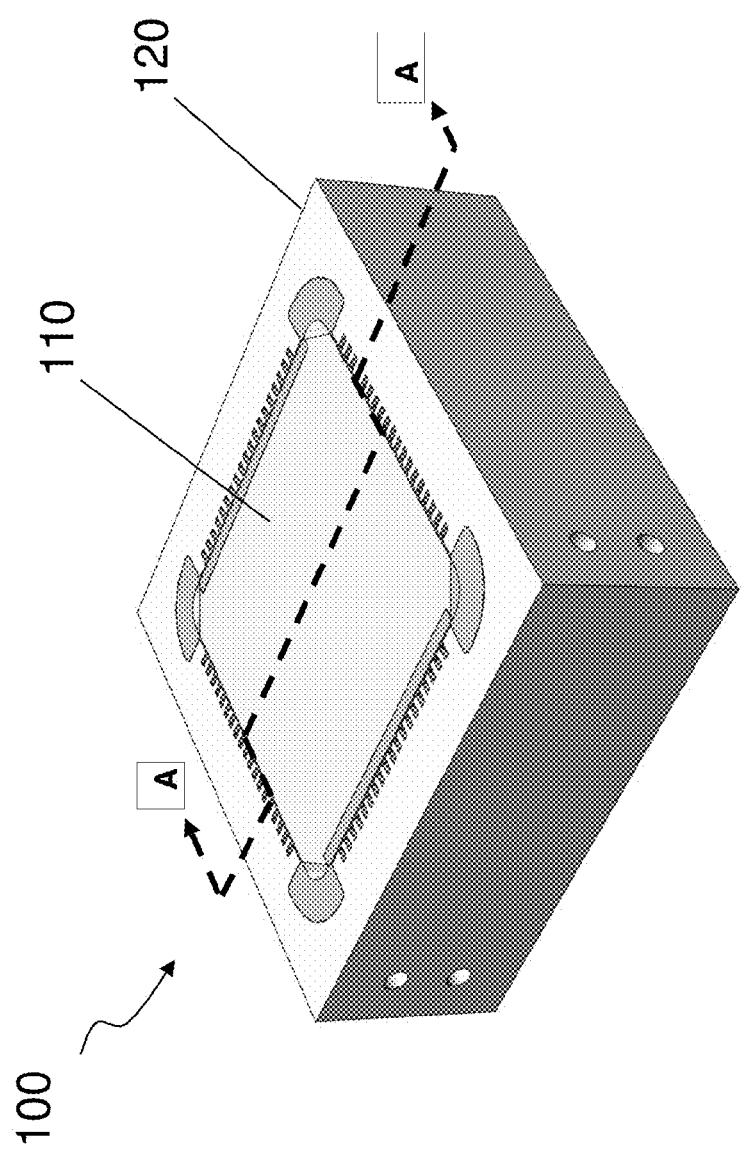
FIG. 1 is a schematic illustration of a stack of cell pairs in a frame of unitary construction in accordance with one or more embodiments.

In accordance with one or more embodiments, a modular electrochemical separation system, which may also be referred to as an electrical purification device or apparatus, may enhance the efficiency and overall flexibility of various treatment processes. In some embodiments, cross-flow electrochemical separation devices, such as cross-flow electrodialysis (ED) devices, may be implemented as an attractive alternative to traditional plate-and-frame devices. In some embodiments, current inefficiencies in cross-flow electrochemical separation devices may be reduced. In at least certain embodiments, current inefficiency due to current bypass through inlet and outlet manifolds may be addressed. Energy consumption and membrane requirements may also be reduced, both of which may affect life cycle cost in various applications. In some embodiments, at least 85% membrane utilization may be achieved. Reduction in membrane requirement may in turn result in reduction in manufacturing cost, weight and space requirements for electrochemical separation devices. In some specific embodiments, the process efficiency of cross-flow ED devices may be significantly improved. In some embodiments, the efficiency of electrochemical separation systems may be improved for desalination of brackish water, seawater and brines from oil and gas production. In at least some embodiments, the cost competitiveness of ED may be improved in comparison to RO which is currently the dominant technology for desalination.

Devices for purifying fluids using electrical fields are commonly used to treat water and other liquids containing dissolved ionic species. Two types of devices that treat water in this way are electrodeionization and electrodialysis devices. Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms, EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations.

One or more embodiments relate to devices that may purify fluids electrically that may be contained within a housing, as well as methods of manufacture and use thereof. Liquids or other fluids to be purified enter the purification device and, under the influence of an electric field, are treated to produce an ion-depleted liquid. Species from the entering liquids are collected to produce an ion-concentrated liquid.

In accordance with one or more embodiments, an electrochemical separation system or device may be modular. Each modular unit may generally function as a sub-block of an overall electrochemical separation system. A modular unit may include any desired number of cell pairs. In some embodiments, the number of cell pairs per modular unit may depend on the total number of cell pairs and passes in the separation device. It may also depend on the number of cell pairs that can be thermally bonded and potted in a frame with an acceptable failure rate when tested for cross-leaks and other performance criteria. The number can be based on statistical analysis of the manufacturing process and can be increased as process controls improve. In some non-limiting embodiments, a modular unit may include about 50 cell pairs. Modular units may be individually assembled and quality control tested, such as for leakage, separation performance and pressure drop prior to being incorporated into a larger system. In some embodiments, a cell stack may be mounted in a frame as a modular unit that can be tested independently. A plurality of modular units can then be assembled together to provide an overall intended number of cell pairs in an electrochemical separation device. In some embodiments, an assembly method may generally involve placing a first modular unit on a second modular unit, placing a third modular unit on the first and second modular units, and repeating to obtain a plurality of modular units of a desired number. In some embodiments, the assembly or individual modular units may be inserted into a pressure vessel for operation. Multi-pass flow configurations may be possible with the placement of blocking membranes and/or spacers between modular units or within modular units. A modular approach may improve manufacturability in terms of time and cost savings. Modularity may also facilitate system maintenance by allowing for the diagnosis, isolation, removal and replacement of individual modular units. Individual modular units may include manifolding and flow distribution systems to facilitate an electrochemical separation process. Individual modular units may be in fluid communication with one another, as well as with central manifolding and other systems associated with an overall electrochemical separation process.

In accordance with one or more embodiments, the efficiency of electrochemical separation systems may be improved. Current loss is one potential source of inefficiency. In some embodiments, such as those involving a cross-flow design, the potential for current leakage may be addressed. Current efficiency may be defined as the percentage of current that is effective in moving ions out of the dilute stream into the concentrate stream. Various sources of current inefficiency may exist in an electrochemical separation system. One potential source of inefficiency may involve current that bypasses the cell pairs by flowing through the dilute and concentrate inlet and outlet manifolds. Open inlet and outlet manifolds may be in direct fluid communication with flow compartments and may reduce pressure drop in each flow path. Part of the electrical current from one electrode to the other may bypass the stack of cell pairs by flowing through the open areas. The bypass current reduces current efficiency and increases energy consumption. Another potential source of inefficiency may involve ions that enter the dilute stream from the concentrate due to imperfect permselectivity of ion exchange membranes. In some embodiments, techniques associated with the sealing and potting of membranes and screens within a device may facilitate reduction of current leakage.

In one or more embodiments, a bypass path through a stack may be manipulated to promote current flow along a direct path through a cell stack so as to improve current efficiency. In some embodiments, an electrochemical separation device may be constructed and arranged such that one or more bypass paths are more tortuous than a direct path through the cell stack. In at least certain embodiments, an electrochemical separation device may be constructed and arranged such that one or more bypass paths present higher resistance than a direct path through the cell stack. In some embodiments involving a modular system, individual modular units may be configured to promote current efficiency. Modular units may be constructed and arranged to provide a current bypass path that will contribute to current efficiency. In non-limiting embodiments, a modular unit may include a manifold system and/or a flow distribution system configured to promote current efficiency. In at least some embodiments, a frame surrounding a cell stack in an electrochemical separation modular unit may be constructed and arranged to provide a predetermined current bypass path. In some embodiments, promoting a multi-pass flow configuration within an electrochemical separation device may facilitate reduction of current leakage. In at least some non-limiting embodiments, blocking membranes or spacers may be inserted between modular units to direct dilute and/or concentrate streams into multiple-pass flow configurations for improved current efficiency. In some embodiments, current efficiency of at least about 60% may be achieved. In other embodiments, a current efficiency of at least about 70% may be achieved. In still other embodiments, a current efficiency of at least about 80% may be achieved. In at least some embodiments, a current efficiency of at least about 85% may be achieved.

In accordance with one or more embodiments, a method for preparing a cell stack for an electrical purification apparatus may comprise forming compartments. A first compartment may be formed by securing ion exchange membranes to one another to provide a first spacer assembly having a first spacer disposed between the ion exchange membranes. For example, a first cation exchange membrane may be secured to a first anion exchange membrane at a first portion of a periphery of the first cation exchange membrane and the first anion exchange membrane to provide a first spacer assembly having a first spacer disposed between the first cation exchange membrane and the first anion exchange membrane.

A second compartment may be formed by securing ion exchange membranes to one another to provide a second spacer assembly having a second spacer disposed between the ion exchange membranes. For example, a second anion exchange membrane may be secured to a second cation exchange membrane at a first portion of a periphery of the second cation exchange membrane and the second anion exchange membrane to provide a second spacer assembly having a second spacer disposed between the second anion exchange membrane and the second cation exchange membrane.

A third compartment may be formed between the first compartment and the second compartment by securing the first spacer assembly to the second spacer assembly, and by positioning a spacer therebetween. For example, the first spacer assembly may be secured to the second spacer assembly at a second portion of the periphery of the first cation exchange membrane and at a portion of the periphery of the second anion exchange membrane to provide a stack assembly having a spacer disposed between the first spacer assembly and the second spacer assembly.

Each of the first compartment and the second compartment may be constructed and arranged to provide a direction of fluid flow that is different from the direction of fluid flow in the third compartment. For example, the fluid flow in the third compartment may be running in a direction of a 0° axis. The fluid flow in the first compartment may be running at 30°, and the fluid flow in the second compartment may be running at the same angle as the first compartment (30°) or at another angle, such as 120°. The method may further comprise securing the assembled cell stack within a housing.

In accordance with one or more embodiments, an electrochemical separation system may include a cross-flow design. A cross-flow design may allow for increased membrane utilization, lower pressure drop and a reduction in external leaks. Additionally, limitations on operating pressure may be reduced by a cross-flow design. In at least some embodiments, the pressure rating of a shell and endcaps may be the only substantial limitations on operating pressure. Automation of manufacturing processes may also be achieved.

In accordance with one or more embodiments, a first fluid flow path and a second fluid flow path may be selected and provided by way of the portions of the peripheries of the ion exchange membranes that are secured to one another. Using the first fluid flow path as a direction running along a 0° axis, the second fluid flow path may run in a direction of any angle greater than zero degrees and less than 360°. In certain embodiments of the disclosure, the second fluid flow path may run at a 90° angle, or perpendicular to the first fluid flow path. In other embodiments, the second fluid flow path may run at a 180° angle to the first fluid flow path. If additional ion exchange membranes are secured to the cell stack to provide additional compartments, the fluid flow paths in these additional compartments may be the same or different from the first fluid flow path and the second fluid flow path. In certain embodiments, the fluid flow path in each of the compartments alternates between a first fluid flow path and a second fluid flow path. For example, the first fluid flow path in the first compartment may be running in a direction of 0°. The second fluid flow path in the second compartment may be running in a direction of 90°, and the third fluid flow path in the third compartment may be running in a direction of 0°. In certain examples, this may be referred to as cross-flow electrical purification.

In other embodiments, the fluid flow path in each of the compartments alternates sequentially between a first fluid flow path, a second fluid flow path, and a third fluid flow path. For example, the first fluid flow path in the first compartment may be running in a direction of 0°. The second fluid flow path in the second compartment may be running at 30°, and the third fluid flow path in the third compartment may be running at 90°. The fourth fluid flow path in the fourth compartment may be running at 0°. In another embodiment, the first fluid flow path in the first compartment may be running in a direction of 0°. The second fluid flow path in the second compartment may be running at 60°, and the third fluid flow path in the third compartment may be running at 120°. The fourth fluid flow path in the fourth compartment may be running at 0°. In some embodiments, one or more flow paths may be substantially non-radial. In at least some embodiments, one or more flow paths may facilitate achieving a substantially uniform liquid flow velocity profile within the system.

In accordance with one or more embodiments, the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment, which will be discussed further below. In certain embodiments, the obstructions, projections, protrusions flanges, or baffles may be referred to as a flow redistributor. A flow redistributor may be present in one or more of the compartments of the cell stack.

Each of the compartments in the cell stack for an electrical purification apparatus may be constructed and arranged to provide a predetermined percentage of surface area or membrane utilization for fluid contact. It has been found that greater membrane utilization provides greater efficiencies in the operation of the electrical purification apparatus. Advantages of achieving greater membrane utilization may include lower energy consumption, smaller footprint of the apparatus, less passes through the apparatus, and higher quality product water. In certain embodiments, the membrane utilization that may be achieved is greater than 65%. In other embodiments, the membrane utilization that may be achieved is greater than 75%. In certain other embodiments, the membrane utilization that may be achieved may be greater than 85%. The membrane utilization may be at least in part dependent on the methods used to secure each of the membranes to one another, and the design of the spacer. In order to obtain a predetermined membrane utilization, appropriate securing techniques and components may be selected in order to achieve a reliable and secure seal that allows optimal operation of the electrical purification apparatus, without encountering leakage within the apparatus. In some embodiments, stack production processes may involve thermal bonding techniques to maximize membrane utilization, while maintaining a large surface area of membrane that may be used in the process.

In accordance with one or more embodiments, an electrical purification apparatus comprising a cell stack is provided. The electrical purification apparatus may comprise a first compartment comprising ion exchange membranes and may be constructed and arranged to provide a direct fluid flow in a first direction between the ion exchange membranes. The electrical purification apparatus may also comprise a second compartment comprising ion exchange membranes and may be constructed and arranged to provide a direct fluid flow in a second direction. Each of the first compartment and the second compartment may be constructed and arranged to provide a predetermined percentage of surface area or membrane utilization for fluid contact.

An electrical purification apparatus may comprise a cell stack. The electrical purification apparatus may comprise a first compartment comprising a first cation exchange membrane and a first anion exchange membrane, the first compartment constructed and arranged to provide a direct fluid flow in a first direction between the first cation exchange membrane and the first anion exchange membrane. The apparatus may also comprise a second compartment comprising the first anion exchange membrane and a second cation exchange membrane to provide a direct fluid flow in a second direction between the first anion exchange membrane and the second cation exchange membrane. Each of the first compartment and the second compartment may be constructed and arranged to provide a predetermined membrane utilization, for example, a fluid contact of greater than 85% of the surface area of the first cation exchange membrane, the first anion exchange membrane and the second cation exchange membrane. At least one of the first compartment and the second compartment may comprise a spacer, which may be a blocking spacer.

In accordance with one or more embodiments, the electrical purification apparatus comprising a cell stack may further comprise a housing enclosing the cell stack, with at least a portion of a periphery of the cell stack secured to the housing. A frame may be positioned between the housing and the cell stack to provide a first modular unit in the housing. A flow redistributor may be present in one or more of the compartments of the cell stack. At least one of the compartments may be constructed and arranged to provide flow reversal within the compartment.

In some embodiments of the disclosure, a cell stack for an electrical purification apparatus is provided. The cell stack may provide a plurality of alternating ion depleting and ion concentrating compartments. Each of the ion depleting compartments may have an inlet and an outlet that provides a dilute fluid flow in a first direction. Each of the ion concentrating compartments may have an inlet and an outlet that provides a concentrated fluid flow in a second direction that is different from the first direction. A spacer may be positioned in the cell stack. The spacer may provide structure to and define the compartments and, in certain examples, may assist in directing fluid flow through the compartment. The spacer may be a blocking spacer which may be constructed and arrange to redirect at least one of fluid flow and electrical current through the cell stack. As discussed, the blocking spacer may reduce or prevent electrical current inefficiencies in the electrical purification apparatus.

In some embodiments of the disclosure, an electrical purification apparatus is provided. The apparatus may comprise a cell stack comprising alternating ion diluting compartments and ion concentrating compartments. Each of the ion diluting compartments may be constructed and arranged to provide a fluid flow in a first direction. Each of the ion concentrating compartments may be constructed and arranged to provide a fluid flow in a second direction that is different from the first direction. The electrical purification apparatus may also comprise a first electrode adjacent an anion exchange membrane at a first end of the cell stack, and a second electrode adjacent a cathode exchange membrane at a second end of the cell stack. The apparatus may further comprise a blocking spacer positioned in the cell stack and constructed and arranged to redirect at least one of a dilute fluid flow and a concentrate fluid flow through the electrical purification apparatus and to prevent a direct current path between the first electrode and the second electrode. As discussed above, the blocking spacer may be constructed and arranged to reduce electrical current inefficiencies in the electrical purification apparatus.

The cell stack for the electrical purification apparatus may be enclosed in a housing with at least a portion of a periphery of the cell stack secured to the housing. A frame may be positioned between the housing and the cell stack to provide first modular unit in the housing. A second modular unit may also be secured within the housing. A blocking spacer may also be positioned between the first modular unit and the second modular unit. A flow redistributor may be present in one or more of the compartments of the cell stack. At least one of the compartments may be constructed and arranged to provide flow reversal within the compartment. A bracket assembly may be positioned between the frame and the housing to provide support to the modular unit and to secure the modular unit within the housing.

The fluid flow in the first direction may be a diluting stream and the fluid flow in the second direction may be a concentrating stream. In certain embodiments, the fluid flow in the first direction may be converted to a concentrating stream and the fluid flow in the second direction may be converted to a diluting stream with the use of polarity reversal where the applied electrical field is reversed thus reversing the stream function. Multiple spacer assemblies separated by spacers may be secured together to form a stack of cell pairs, or a membrane cell stack.

The electrical purification apparatus of the present disclosure may further comprise a housing that encloses the cell stack. At least a portion of the periphery of the cell stack may be secured to the housing. A frame or support structure may be positioned between the housing and the cell stack to provide additional support to the cell stack. The frame may also comprise inlet manifolds and outlet manifolds that allow the flow of liquid in and out of the cell stack. The frame and the cell stack together may provide an electrical purification apparatus modular unit. The electrical purification apparatus may further comprise a second modular unit secured within the housing. A spacer, for example, a blocking spacer, may be positioned between the first modular unit and the second modular unit. A first electrode may be positioned at an end of the first modular unit that is opposite an end in communication with the second modular unit. A second electrode may be positioned at an end of the second modular unit that is opposite an end in communication with the first modular unit.

A bracket assembly may be positioned between the frame and the housing of the first modular unit, the second modular unit, or both. The bracket assembly may provide support to the modular units, and provide for a secure attachment to the housing. In one embodiment of the disclosure, the electrical purification apparatus may be assembled by positioning a membrane cell stack into a housing or vessel. Endplates may be provided at each end of the cell stack. Adhesive may be applied to seal at least a portion of the periphery of the cell stack to the inside wall of the housing.

In certain embodiments of the disclosure, an electrical purification apparatus is provided that reduces or prevents inefficiencies resulting from greater electrical power consumption. The electrical purification apparatus of the present disclosure may provide for a multiple pass flow configuration to reduce or prevent current inefficiencies. The multiple pass flow configuration may reduce the bypass of current through the flow manifolds, or leakage of current, by eliminating or reducing the direct current path between the anode and the cathode of the electrical purification apparatus. In certain embodiments of the disclosure the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment. The obstructions, projections, protrusions, flanges, or baffles may be formed as part of ion exchange membranes, the spacer, or may be an additional separate structure that is provided within the compartment. In at least one embodiment, a membrane or blocking spacer may be substantially non-conductive so as to impact current flow within the system.

In some embodiments of the present disclosure, a method is provided for securing or bonding ion exchange membranes and, optionally, spacers to produce a membrane cell stack for an electrical purification apparatus. The method may provide for securing of multiple anion exchange membranes and cation exchange membranes for use in electrical purification apparatus such as a cross-flow electrodialysis (ED) modular unit.

In certain embodiments of the disclosure, a method of preparing a first cell stack for an electrical purification apparatus is provided. The method may comprise securing a first ion exchange membrane to a second ion exchange membrane. A spacer may be positioned between the first ion exchange membrane and the second ion exchange membrane to form a spacer assembly. When used in an electrical purification apparatus, this spacer assembly defines a first compartment that may allow fluid flow. A plurality of ion exchange membranes may be secured to one another to provide a series of compartments. In certain embodiments, a plurality of spacer assemblies may be constructed and the spacer assemblies may be secured to one another. A spacer may be positioned between each of the spacer assemblies. In this way, a series of compartments for an electrical purification apparatus is constructed to allow fluid flow in one or more directions in each of the compartments.

The spacers that may be positioned within the compartments may provide structure to and define the compartments and, in certain examples, may assist in directing fluid flow through the compartment. The spacers may be made of polymeric materials or other materials that allow for a desired structure and fluid flow within the compartments. In certain embodiments, the spacers may be constructed and arranged to redirect or redistribute fluid flow within the compartments. In some examples, the spacer may comprise a mesh-like or screen material to provide structure and allow for the desired fluid flow through the compartment. The spacer may be constructed and arranged to redirect at least one of fluid flow and electrical current to improve process efficiency. The spacer may also be constructed and arranged to create multiple fluid flow stages in an electrical purification apparatus. The spacer may comprise a solid portion to redirect fluid flow in a particular direction. The solid portion may also redirect electrical current flow in a particular direction, and prevent a direct path between an anode and a cathode in an electrical purification apparatus. In some embodiments, a spacer may promote current flow through a cell stack and generally deter current bypass with respect to the cell stack. A spacer comprising a solid portion may be referred to as a blocking spacer. The blocking spacer may be positioned within a cell stack, or may be positioned between a first cell stack, or first modular unit, and a second cell stack, or second modular unit.

In some embodiments, the plurality of ion exchange membranes secured to one another may alternate between cation exchange membranes and anion exchange membranes to provide a series of ion diluting compartments and ion concentrating compartments. The geometry of the membranes may be of any suitable geometry such that the membranes may be secured within a cell stack. In certain embodiments, a particular number of corners or vertices on the cell stack may be desired so as to suitably secure the cell stack within a housing. In certain embodiments, particular membranes may have different geometries than other membranes in the cell stack. The geometries of the membranes may be selected to assist in at least one of securing the membranes to one another, to secure spacers within the cell stack, to secure membranes within a modular unit or modular unit, to secure membranes within a support structure, to secure a group of membranes such as a cell stack to a housing, and to secure a modular unit or modular unit into a housing. The membranes, spacers, and spacer assemblies may be secured at a portion of a periphery or edge of the membranes, spacers, or spacer assemblies. A portion of a periphery may be a continuous or non-continuous length of the membrane, spacer, or spacer assembly. The portion of the periphery that is selected to secure the membrane, spacer, or spacer assembly may provide a boundary or border to direct fluid flow in a predetermined direction.

In accordance with one or more embodiments, a cell stack as discussed herein may have any desired number of ion exchange membranes, cell pairs or flow compartments. In some embodiments, an electrochemical separation system may include a single cell stack. In other embodiments, such as in modular embodiments, and electrochemical separation system may include two or more cell stacks. In some embodiments, each cell stack may be included in a separate modular unit as discussed herein. Modularity may offer design flexibility and ease of manufacturability.

In accordance with one or more embodiments, an electrochemical separation system may include a first electrode, a second electrode, a first electrochemical separation modular unit having a first cell stack defining a plurality of alternating depleting compartments and concentrating compartments supported by a first frame, the first electrochemical separation modular unit positioned between the first electrode and the second electrode, and a second electrochemical separation modular unit, in cooperation with the first electrochemical separation modular unit, having a second cell stack defining a plurality of alternating depleting compartments and concentrating compartments supported by a second frame, the second electrochemical separation modular unit positioned between the first electrochemical separation modular unit and the second electrode. The first cell stack may be surrounded by the first frame, and the second cell stack may be surrounded by the second frame. In some embodiments, the first and second electrochemical separation modular units are arranged fluidly in parallel. The first and second electrochemical separation modular units may each be of unitary construction or may themselves be constructed of sub-blocks. The first and second electrochemical separation modular units may be removable. In some embodiments, a blocking spacer may be positioned between the first and second electrochemical separation modular units. As discussed below, each of the frames may include a manifold system and/or a flow distributions system. The first and second electrochemical separation modular units may be mounted in a vessel, such as with a bracket assembly. The system may include two, three, four or more modular units depending on an intended application and various design elements. A source of water to be treated may be fluidly connected to an inlet of the vessel. The depleting compartments and concentrating compartments may each have an inlet in fluid communication with the inlet of the vessel.

In some non-limiting embodiments, at least one of the depleting compartments and concentrating compartments comprises a flow redistributor. In some embodiments, the system is configured such that a direction of flow through the depleting compartments is different than a direction of flow through the concentrating compartments. In at least one embodiment, the system may be configured such that the direction of flow through the depleting compartment is substantially perpendicular to the direction of flow through the concentrating compartments. The first and second electrochemical separation modular units may be configured to facilitate multi-pass flow within the system.

In accordance with one or more embodiments, a method of assembling a separation system may include mounting a first electrochemical separation modular unit having a first cell stack surrounded by a first frame in a vessel between a first electrode and a second electrode, and mounting a second electrochemical separation modular unit having a second cell stack surrounded by a second frame in the vessel between the first electrochemical separation modular unit and the second electrode. The method may further comprise disposing a blocking spacer between the first and second electrochemical separation modular units. The performance of each of the first and second electrochemical separation modular units may be tested prior to mounting in the vessel. A source of water to be treated may be fluidly connected to an inlet of the vessel.

In accordance with one or more embodiments, one, two or more modular units may be inserted between a first electrode and a second electrode. In some embodiments, two modular units may be substantially adjacent one another within the system. In other embodiments, a blocking spacer may be positioned between two adjacent modular units. In at least certain embodiments, a modular unit in a separation system may not have a dedicated set of electrodes. Instead, multiple modular units may be positioned between a single pair of electrodes.

In accordance with one or more embodiments, an electrochemical separation modular unit may comprise a cell stack defining a plurality of alternating depleting compartments and concentrating compartments, and a support system. The support system may be configured to maintain vertical alignment of the cell stack. The support system may be a frame in some embodiments. A frame may at least partially surround the cell stack. In other embodiments, the frame may substantially surround the cell stack. In some embodiments, a frame may include a manifold system configured to facilitate fluid flow through the cell stack. A manifold system may deliver process liquid from a central system manifold to an individual modular unit that it services. A manifold system may include an inlet manifold and an outlet manifold. A manifold system may comprise an inlet manifold in fluid communication with an inlet of each depleting compartment and with an inlet of each concentrating compartment. The manifold system may further comprise an outlet manifold in fluid communication with an outlet of each depleting compartment and with an outlet of each concentrating compartment. The manifold system may be configured to deliver treated liquid downstream via the outlet manifold. At least a portion of the manifold system may be integral to the frame or in a structure separate from the frame. In at least some embodiments, the manifold system may be constructed and arranged to prevent mixing of dilute and concentrate streams in a modular unit. The manifold system may fluidly isolate and keep separated outlets of dilute and concentrate compartments associated with a stack.

In some embodiments, a support system such as a frame may include a flow distribution system. The flow distribution system may be a part of the manifold system or a separate system. The flow distribution system may be in fluid communication with the manifold system and may be configured to promote uniform flow distribution to a cell stack. The flow distribution system may be in fluid communication with an inlet of each depleting compartment and with an inlet of each concentrating compartment. In some embodiments, at least a portion of the flow distribution system may be integral to the frame. In other embodiments, at least a portion of the flow distribution system may engage with the frame. In some embodiments, at least a portion of the flow distribution system comprises an insert that is removably receivable by the frame. This may be for ease of manufacturability of one or more features of the flow distribution system. One or more features of the manifold and/or flow distribution system may be integrated into the frame such as via an insert structure. In some embodiments, a flow distribution system may engage with each inlet and outlet of the cell stack. In some embodiments, a frame may include an insert associated with at least one side of the cell stack. In at least some embodiments, a frame may include an insert associated with each side of the cell stack. For example, a rectangular cell stack may include four inserts. The manifold system and/or flow distribution system or component thereof may be associated with each side of a cell stack.

In accordance with one or more embodiments, a flow distribution system or an insert associated with a modular unit frame may be constructed and arranged to supply liquid to be treated to inlets of dilute and concentrate compartments of a cell stack. The flow distribution system or insert may be further constructed and arranged to receive and fluidly isolate outlet streams associated with dilute and concentrate compartments of the cell stack. The flow distribution system or insert may keep dilute and concentrate outlet streams separated. Various designs for flow distributions systems capable of having the intended functionality may be implemented in accordance with one or more embodiments. Based on the nature of the cell stack, compartment inlets and outlets may be positioned on one or more sides of the cell stack. In some embodiments, compartment inlets and outlets may be positioned on all sides of the cell stack. The design of the frame, including manifold system and flow distribution systems, may be configured such that it may receive the cell stack in any orientation. Inserts or flow distributors may also be inserted into any side of the frame and be associated with any side of the cell stack for flexibility. An insert or flow distributor may be inserted and serve to both provide fluid to be treated to the multiple compartment of the stack, as well as fluidly isolate and keep separate outlet streams of the cell stack. Further as discussed herein, the insert or flow distributor may also be constructed and arranged to improve current efficiency of the overall modular unit.

In one or more embodiments, a bypass path through a stack may be manipulated to promote current flow along a direct path through a cell stack so as to improve current efficiency. In some embodiments, an electrochemical separation device may be constructed and arranged such that one or more bypass paths are more tortuous than a direct path through the cell stack. In at least certain embodiments, an electrochemical separation device may be constructed and arranged such that one or more bypass paths present higher resistance than a direct path through the cell stack. In some embodiments involving a modular system, individual modular units may be configured to promote current efficiency. Modular units may be constructed and arranged to provide a current bypass path that will contribute to current efficiency. In non-limiting embodiments, a modular unit may include a manifold system and/or a flow distribution system configured to promote current efficiency. In at least some embodiments, a frame surrounding a cell stack in an electrochemical separation modular unit may be constructed and arranged to provide a predetermined current bypass path. In some embodiments, inserts associated with the support system, such as components of a manifold or flow distribution system, may be configured to promote current efficiency.

In accordance with one or more embodiments, at least one of the manifold system and the flow distribution system may be constructed and arranged to improve efficiency of a modular unit. The flow distribution system may comprise at least one bypass path configured to reduce current loss. The flow distribution system may include a plurality of first fluid passages oriented in a first direction. The flow distribution system may further comprise a plurality of second fluid passages oriented in a second direction and in fluid communication with the plurality of first fluid passages. In some embodiments, the first and second directions may be substantially perpendicular. The flow distribution system may comprise an insert, wherein the frame defines a recess configured to receive the insert. The insert may define a lattice structure configured to promote uniform flow distribution to the cell stack in at least some embodiments.

In some non-limiting embodiments, the insert may have a first side proximate the cell stack, and a second side opposite the first side. The insert may comprise a plurality of ports on at least one of the first and second sides. In some embodiments, at least some of the ports may be slots or grooves. Ports may be different on one side of the insert versus another side. In some embodiments, each port on the first side of the insert may be oriented substantially perpendicular to ion exchange membranes of the cell stack, and each port on the second side of the insert may be oriented substantially parallel to ion exchange membranes of the cell stack. In some embodiments, at least one port on the first side is in fluid communication with two or more compartments of the cell stack. A plurality of ports may be staggered on a side of the insert. A port may service one or multiple compartments. A cell stack may be constructed and arranged to achieve at least about 85% fluid contact with respect to surface area of ion exchange membranes defining the cell stack in some embodiments. At least one of the depleting compartments and concentrating compartments may include a blocking spacer or flow redistributor. In some embodiments, a cell stack is configured such that a direction of flow through the depleting compartments is different than a direction of flow through the concentrating compartments. In at least one embodiment, the cell stack is configured such that the direction of flow through the depleting compartment is substantially perpendicular to the direction of flow through the concentrating compartments.

In accordance with one or more embodiments, an electrochemical separation modular unit may include a flow distributor configured to promote uniform flow distribution within a cell stack. The flow distributor may be integral to the structure of a frame or manifold surrounding the cell stack. In other embodiments, at least a portion of the flow distributor may be configured to engage with the frame or manifold. The flow distributor may comprise an insert removably receivable by the frame. The modular unit can include one or more flow distributors. In some embodiments, a flow distributor may be associated with one or more sides of the cell stack. In at least some embodiments, a flow distributor may be associated with each side of the cell stack. Each side of the cell stack may have a dedicated flow distributor. A flow distributor may be configured to be removably received by the electrochemical separation device. Multiple-pass flow configuration may be possible with use of blocking membranes.

In accordance with one or more embodiments, a flow distributor for electrochemical separation may include a plurality of first passages oriented in a first direction and configured to deliver feed to at least one compartment of an electrochemical separation device, and a plurality of second passages oriented in a second direction, the plurality of second passages in fluid communication with the plurality of first passages and with an inlet manifold associated with the electrochemical separation device. In some embodiments, the first direction is substantially vertical. In at least one embodiment, the second direction is substantially horizontal. The plurality of first passages may be arranged in parallel. In at least one embodiment, the plurality of second passages may be arranged in parallel. In some embodiments, at least one first passage intersects at least one second passage. A blocking member may be positioned at an intersection of a first passage and a second passage. The plurality of first passages and the plurality of second passages may be arranged to reduce current leakage within the electrochemical separation device. The plurality of first passages may be arranged with the plurality of second passages to define a lattice structure in some non-limiting embodiments.

In accordance with one or more embodiments, a flow distributor may have a first side configured to be disposed proximate a cell stack of the electrochemical separation device. The distributor may include a plurality of ports on the first side. The flow distributor of claim may have a second side arranged opposite the first side and may have a plurality of ports on the second side. The plurality of ports on the first and second sides may comprise slots or grooves in some embodiments. In at least one embodiment, the ports may be different on the first and second side. Each port on the first side may be oriented substantially perpendicular to compartments of the electrochemical separation device in some non-limiting embodiments. Each port on the second side may be oriented substantially parallel to compartments of the electrochemical separation device. The plurality of ports on the second side may be configured to distribute fluid flow to the plurality of ports on the first side. In some embodiments, at least one port on the first side may be in fluid communication with two or more compartments of electrochemical separation device. In some embodiments, the plurality of ports on the first side or the second side may be staggered. The flow distributor may be constructed and arranged to promote current flow to operating surfaces of the electrochemical separation device. A port may be associated with the flow distributor. The port may have various positions with respect to the flow distributor. The flow distributor may comprise a port substantially centered with respect to the flow distributor to promote uniform flow distribution from the inlet manifold to the compartments of the electrochemical separation device. In other embodiments, a port may be offset relative to the flow distributor.

In accordance with one or more embodiments, a stack of cell pairs may be constructed to form a modular unit or sub-block for quality control prior to final assembly into an electrochemical separation system. The sub-blocks may be formed by thermal bonding, adhesive or other method. In some embodiments, a cross-flow modular unit may be assembled after a sub-block of cell pairs is tested. Ports may be embedded on walls of a casing to allow for multiple dumping during operation. In a cross-flow modular unit there may be a large number of cell pairs stacked and packed in a shell or housing. Seals may be associated with the cell pairs to define flow paths. If even one of the seals fails then the entire modular unit may be deemed inoperable. In accordance with one or more embodiments, sub-blocks of cell pairs may be used to detect defective seals before stacking all of the cell pairs to form a larger modular unit or system. In some embodiments, cell pairs may be broken down into stacks each packaged in a frame to determine seal integrity prior to final assembly. In some embodiments, the packaging method may use an O-ring or a gasket to mechanically connect a sub-block to either another sub-block or an electrode-plate without any internal cross-leak or external leakage. Frame design may facilitate multi-dumps of concentrate fluid such that a standard sub-block may be manufactured, stocked, and easily configured into any desired number of passes and dumps per modular unit for a specific operating condition. Frame design may promote uniform flow distribution, isolation of dilute and concentrate streams, as well as current efficiency In accordance with one or more embodiments, a frame may tightly support sides of a stack of cell pairs to maintain alignment. Vertical slots may connect inlet and outlet manifolds to the flow compartments. This may promote uniform flow distribution across a width of flow compartments and reduce current leakage from compartments to manifolds. Membranes at the ends of a stack may be secured and sealed to the frame with o-rings or other mechanism. A frame may be assembled from multiple sections or may be integral, such as molded as one part. Each modular unit may function as a one pass with a blocking membrane sealed in between modular units. Modular units next to endblocks may be separated from electrode compartments by membranes and may also be sealed, such as with o-ring or adhesive. A modular unit frame, or the manifold system of a modular unit frame, may generally include one or more dilute ports and one or more concentrate ports. The ports may be on the frame or on an insert. The modular unit frame may also include a flow distribution system that may include one or more inserts or flow distributors removably receivable by the frame. The frame may include one or more recesses sized and shaped to receive an insert. The overall frame and modular unit design may be configured to reduce bypass current. A bypass path may be tortuous and present higher resistance than a direct path through the stack. In some non-limiting embodiments, current may only bypass the stack by flowing through the bottom half of slots, along the horizontal manifolds to the port manifold, back along the top horizontal manifold and back into the stack through the top half of slots.

Figure 2:
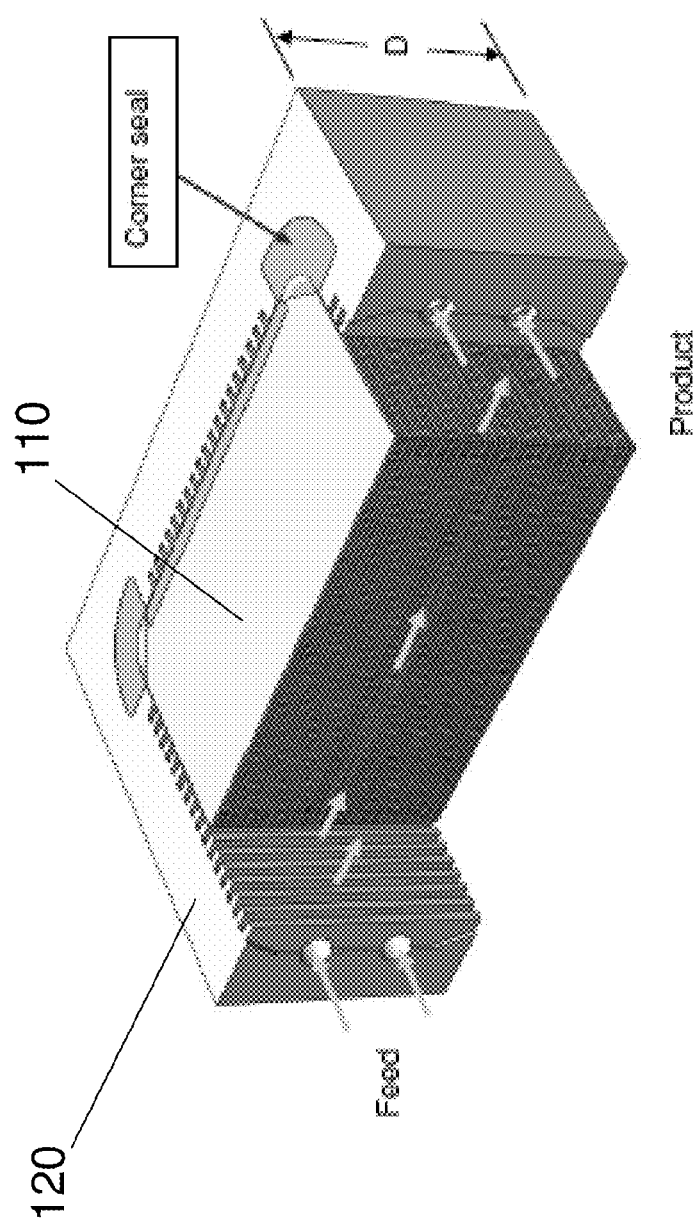
FIG. 2 is a schematic illustration of Section A-A in FIG. 1 in accordance with one or more embodiments.
Figure 3:
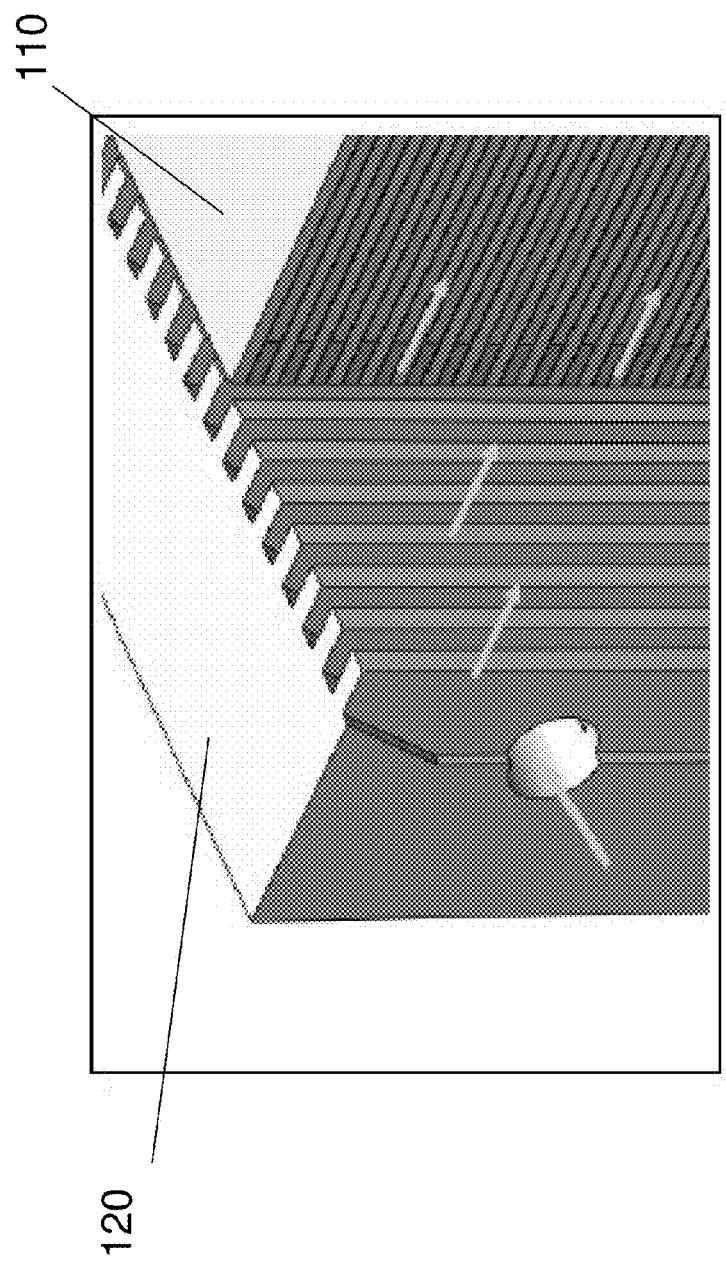
FIG. 3 is a schematic illustration of showing dilute flow from slots to an inlet of dilute flow compartments in accordance with one or more embodiments.

In accordance with one or more specific non-limiting embodiments, a stack 110 of cell pairs may be enclosed on four sides in a frame 120 of unitary construction to form modular unit 100, as shown in FIG. 1. FIGS. 2 and 3 present views through Section A-A. The thicknesses of the flow compartments and the membranes are exaggerated for clarity. A set of manifolds in the frame section supplies the feed to the inlet of the dilute compartments via an array of slots oriented perpendicularly to the membrane surfaces. At the outlet of the dilute compartments, product water flows through a second array of slots and enters a second set of manifolds in the frame section at the right of the figure. A section perpendicular to Section A-A would show the same arrangement of manifolds and slots for the concentrate compartments.

Figure 4:
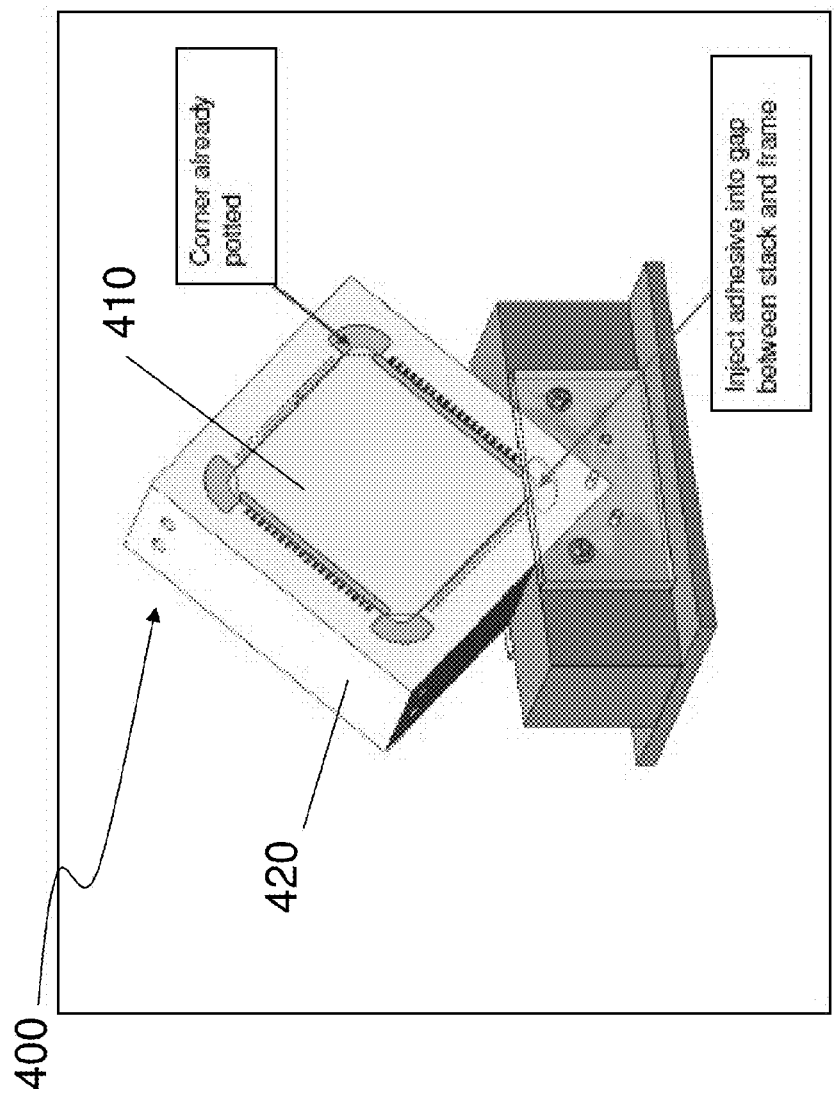
FIG. 4 is a schematic illustration of a method for potting corners with adhesive in accordance with one or more embodiments.

The inlet and outlet to the dilute and concentrate compartments may be isolated from each other by seals between the corners of the stack and the frame as shown in FIG. 2. The seals can be achieved by various techniques such as adhesives, thermal bonds or combinations thereof. FIG. 4 shows one method of sealing the corners. The stack 410 is inserted into the frame 420 and a potting adhesive is dispensed into the gap between the stack 410 and the frame 420 to form modular unit 400. After the adhesive has set, the stack and frame are rotated 90° and the next corner is potted, and so on. Further curing at an elevated temperature may be necessary to fully develop the properties of the adhesive. Alternatively a molten hot melt adhesive of low enough viscosity can be dispensed into the gaps until all four corners are potted.

The frame of the overall design described above may serve several functions. It may maintain alignment of the cell pairs in the stack. Energy consumption in an ED device can be reduced by decreasing the thickness of the flow compartments and the membranes. Flow compartments (inter-membrane distance) in a current state of the art device can be as thin as 0.38 mm (0.015") while membrane thickness can be as low as 30 microns (0.0012"). A stack of 1200 cell pairs, assembled from such thin and flexible components has very little rigidity and should be supported from lateral shifting. This problem is particularly acute in a traditional plate-and-frame device which requires compression to seal the components of the stack and relies on side support channels and tie-bars to align the stack. The problem is still present in a cross-flow device, even though the stack components are sealed either with adhesives or thermal bonding and the entire stack is housed in a cylindrical vessel. The slots that connect the inlet and outlet manifolds to the flow compartments, when properly designed, can ensure that flow is uniformly distributed across the inlet of each dilute compartment. The slots are oriented perpendicular to the flow compartments. There is no need to line up the slots with the inlets of individual compartments. The slots reduce the area available for current leakage from the stack into the inlet and outlet manifolds and thereby the fraction of current which bypasses the stack of membranes and cell. Current bypass reduces current efficiency (theoretical current required/actual current measured, based on Faraday's constant of 96,498 coulombs/equivalent) and increases energy consumption per unit volume of product. Other methods to improve current efficiency involve the use of multi-pass modular unit configurations using blocking membranes or spacers.

Figure 5:
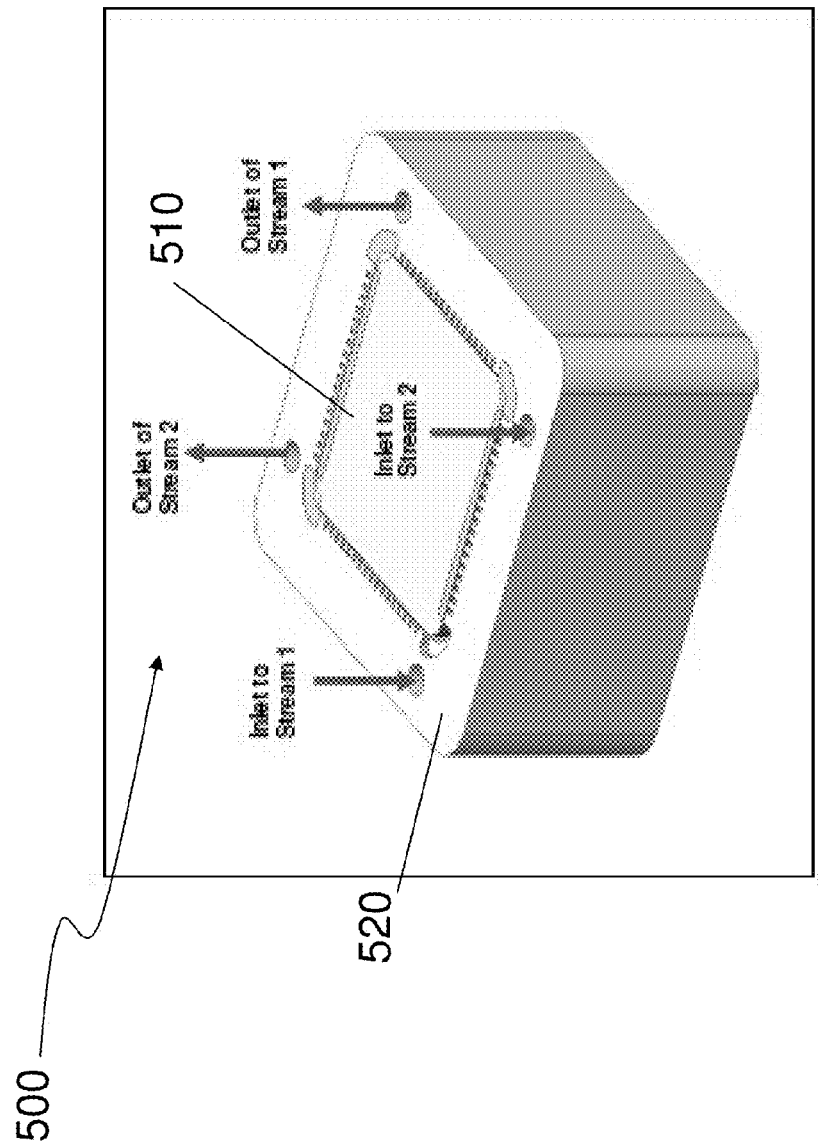
FIG. 5 is a schematic illustration of stack in a frame with inlet and outlet ports oriented vertically in accordance with one or more embodiments.
Figure 6:
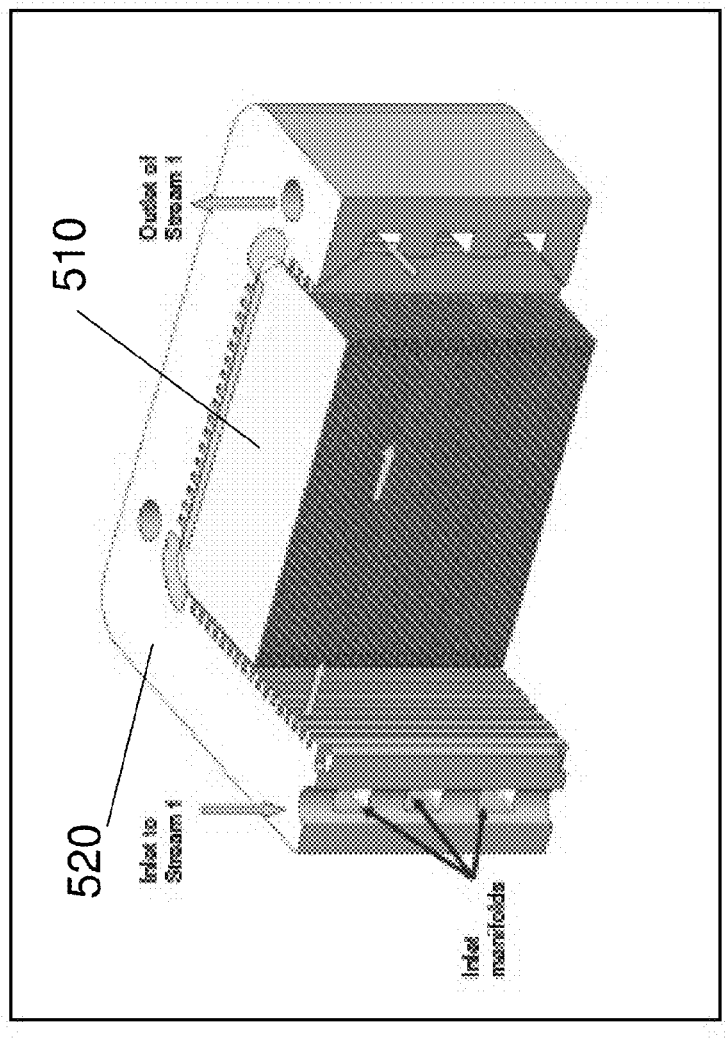
FIG. 6 is a schematic illustration of a flow path in accordance with one or more embodiments.

In another embodiment, the configuration of the slots can be modified to further reduce current leakage and thus improve the current efficiency with the placement of blocks within the slots. FIG. 5 shows modular unit 500 including a stack 510 of cell pairs in a frame 520 with inlet and outlet ports oriented vertically. FIG. 6 is a section view showing the flow path for Stream 1. From the inlet port, the fluid flows into the flow compartments in the stack via three horizontal inlet manifolds in parallel followed by vertical slots. From the stack, the fluid flows to the outlet port though another set of vertical slots and three outlet manifolds.

Figure 7:
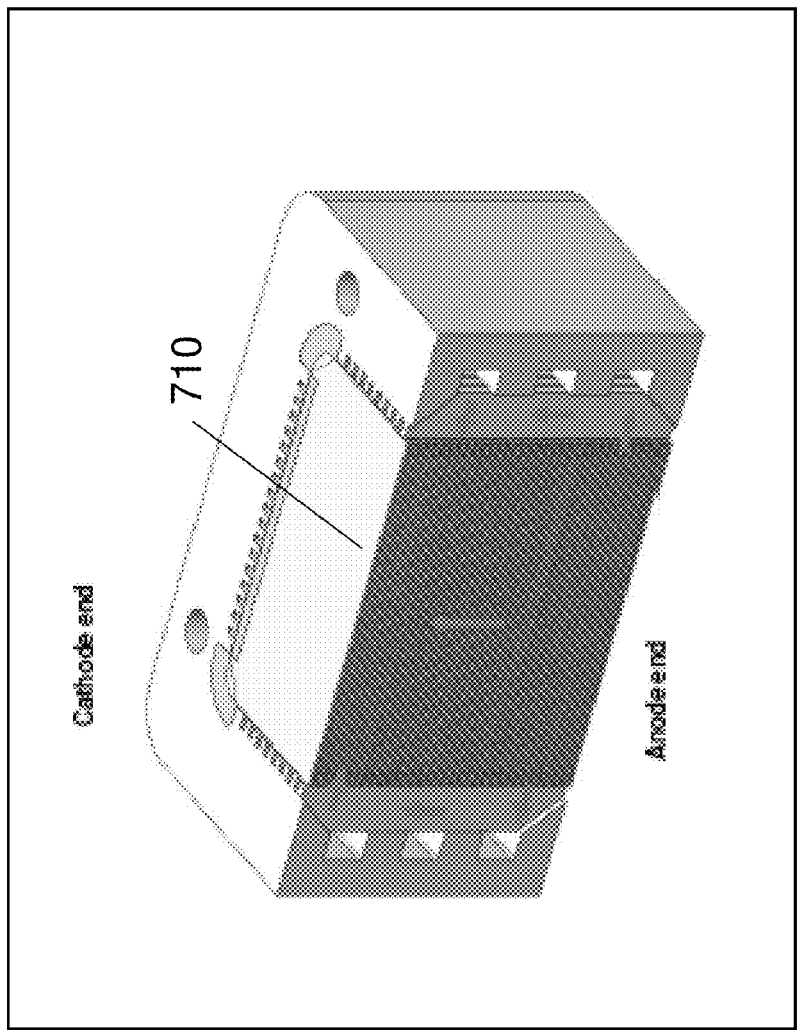
FIG. 7 is a schematic illustration of potential current bypass through slots in accordance with one or more embodiments.
Figure 8:
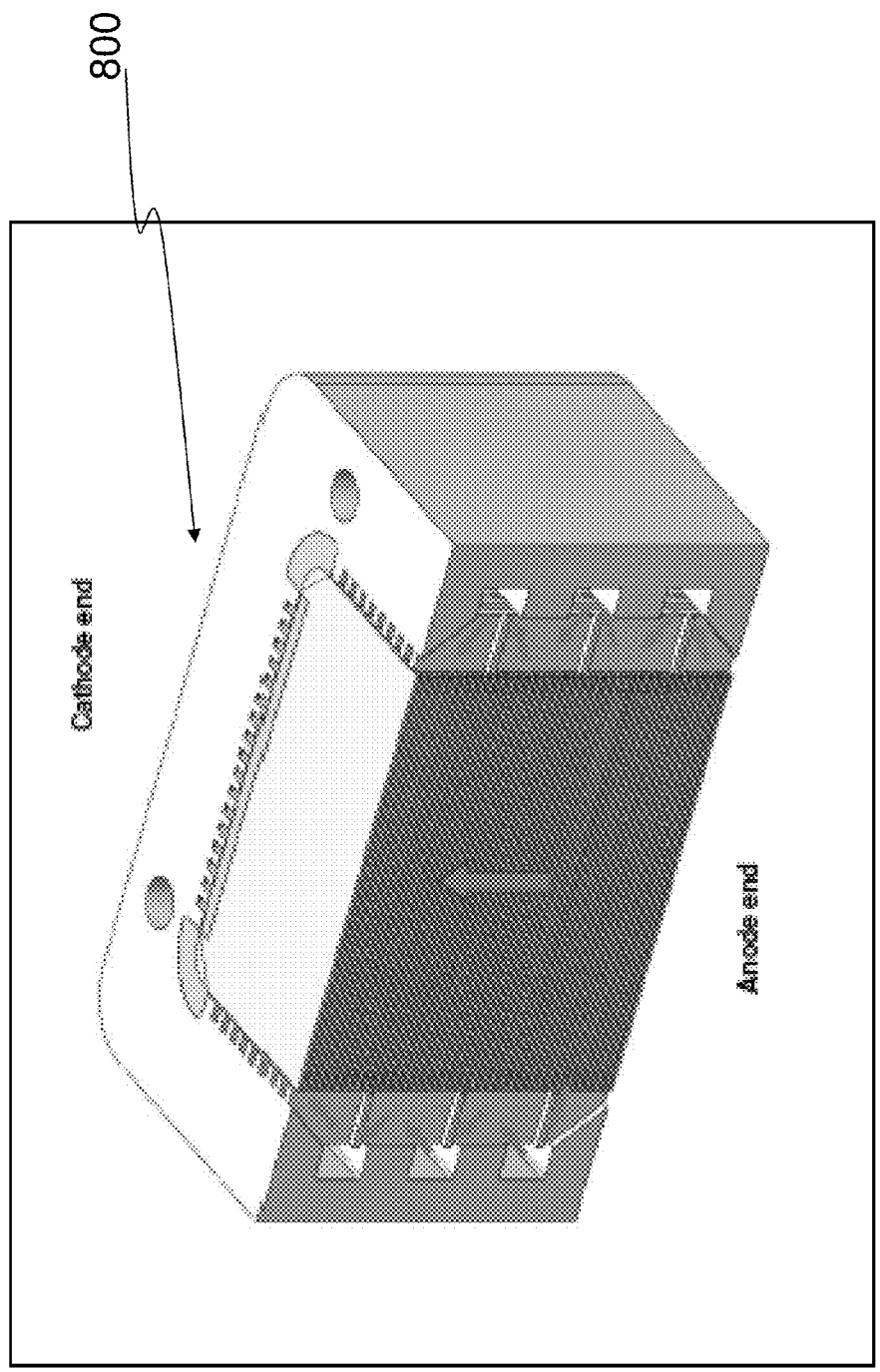
FIG. 8 is a schematic illustration horizontal blocks to reduce current bypass in accordance with one or more embodiments.

FIG. 7 shows that the current, however, can potentially bypass the stack 710 by flowing through the vertical slots from one end of the stack to the other. FIG. 8 shows one non-limiting embodiment of the slot modification with reference to modular unit 800. Obstacles or obstructions may be placed in the slots to force the bypass current to take a more circuitous path and thereby increase the electrical resistance in the bypass paths. In some embodiments, blocks, such as horizontal blocks may be placed in the slots.

Figure 9:
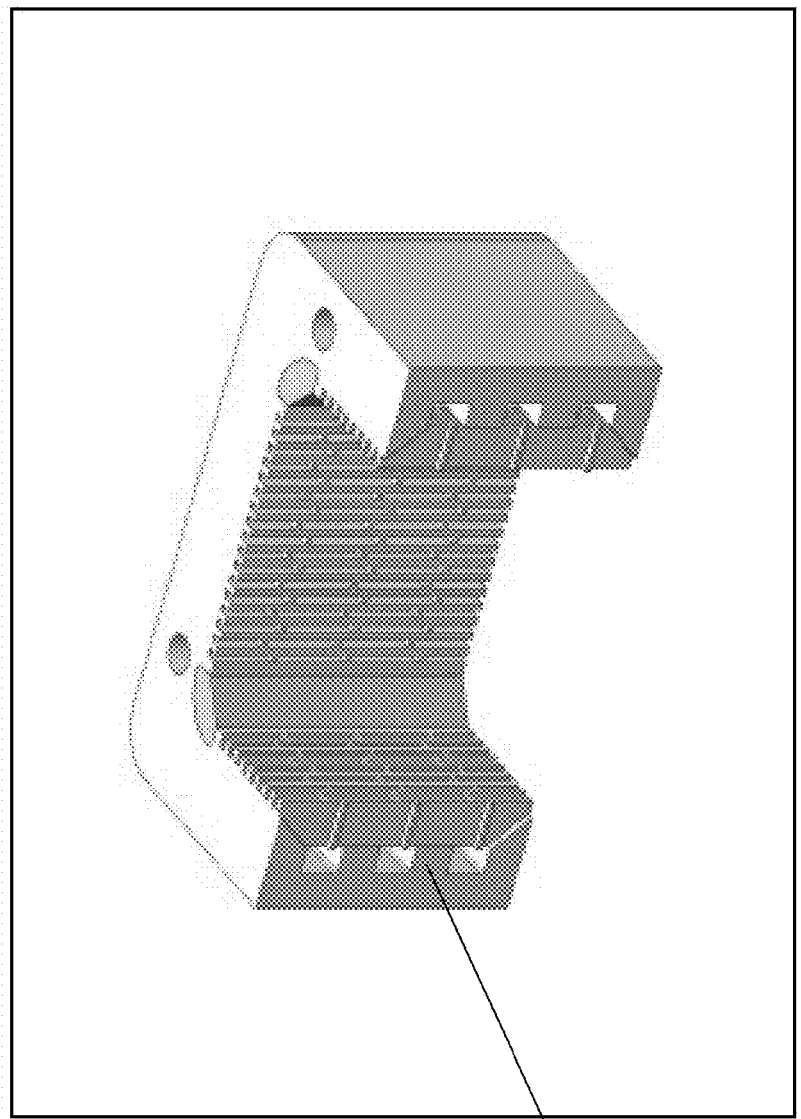
FIG. 9 is a schematic illustration of staggered horizontal blocks in accordance with one or more embodiments.

In some embodiments, the horizontal blocks are not in the same locations in every slot; otherwise one or more flow compartments may be completely blocked off from the inlet or outlet manifolds. FIG. 9 shows how the blocks 930 can be staggered so only a small fraction of the inlet or outlet to any given flow compartment would be blocked. Uniform average flow velocity in the compartment can still be achieved by proper design of the inter-membrane screen. In some embodiments, the staggered blocks may all line up with one of the horizontal manifolds if the frame is to be machined or molded in one piece, which restricts the number and locations of the blocks.

Figure 10:
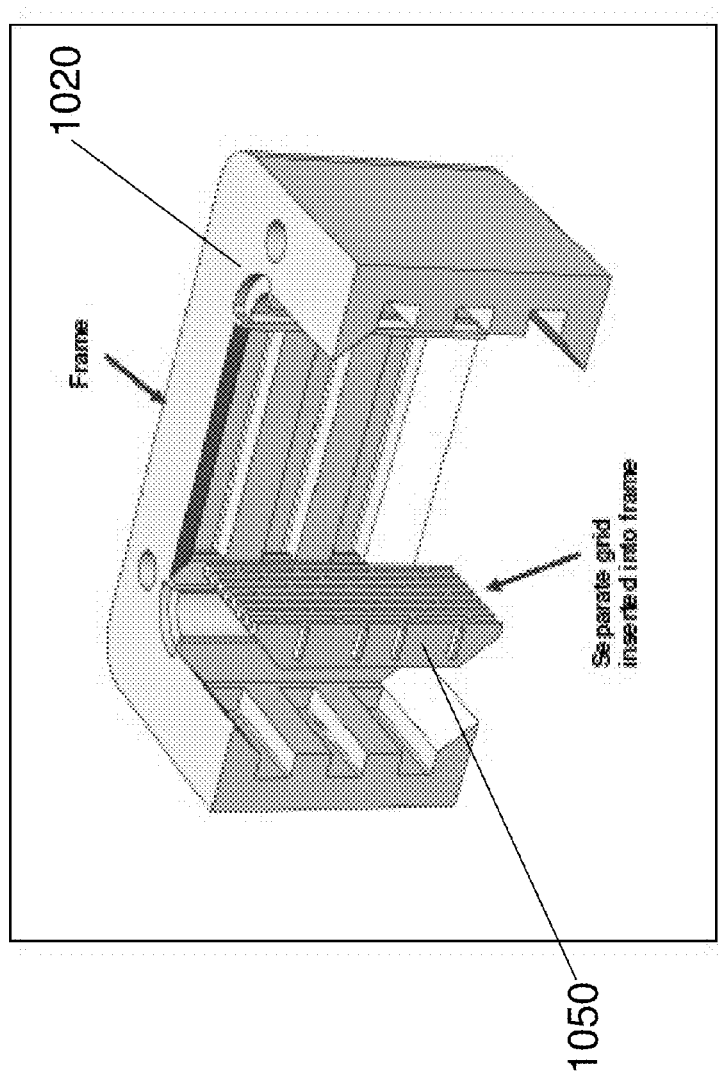
FIG. 10 is a schematic illustration of a frame with separately fabricated grid in accordance with one or more embodiments.
Figure 11:
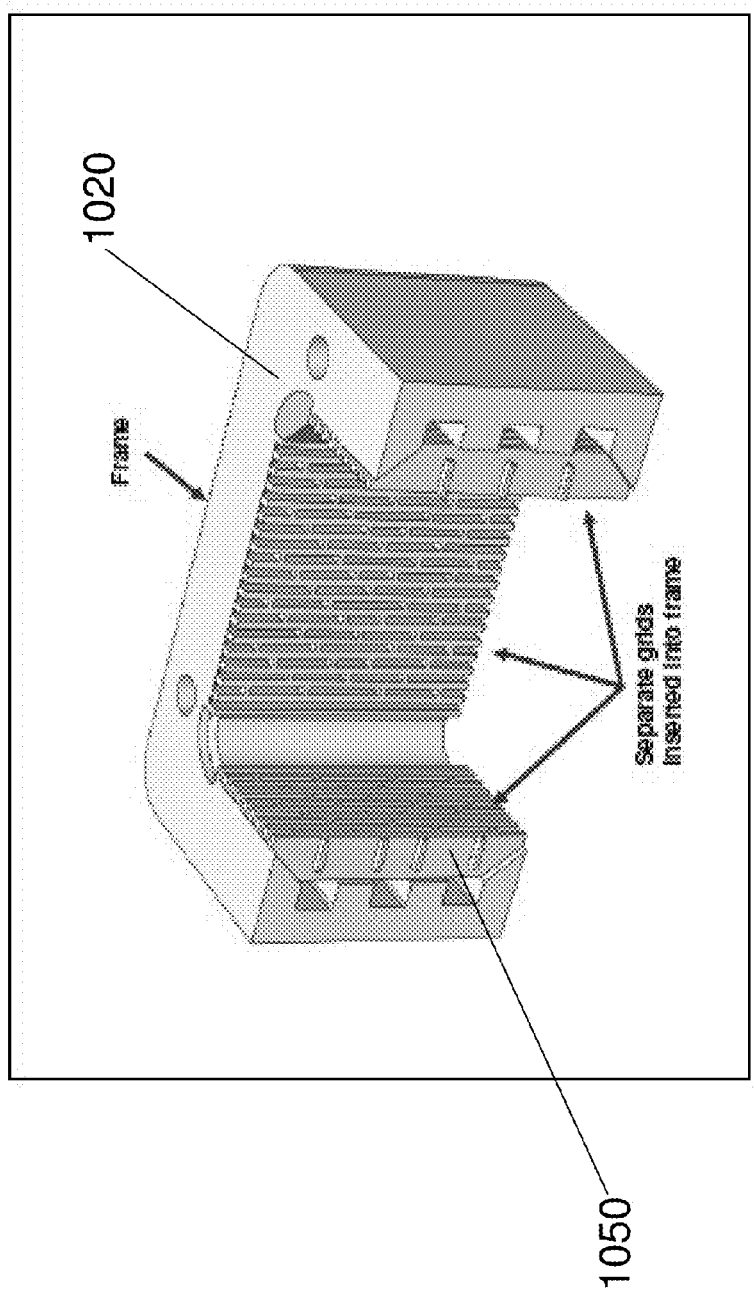
FIG. 11 is a schematic illustration of grids with staggered blocks in accordance with one or more embodiments.

In another embodiment, the frame is machined or molded without the slots. Grids which contain the slots and horizontal blocks are fabricated separately and inserted into the frame 1020 as flow distributor 1050 shown in FIGS. 10 and 11. There is then more flexibility in the number and locations of blocks. The blocks can be arranged in arrays or at random.

The frame can be fabricated from materials with the requisite mechanical properties and chemical compatibility with the fluid to be deionized by ED. In applications such as desalination of seawater, for example, plastic materials are favored because of their resistance to corrosion and low cost. Potential plastics include polyvinyl chloride (PVC), polyethylene (PE), polypropylene (PP), polyamides (PA or nylon), acrylonitrile butadiene styrene (ABS), polysulfone or blends of plastics such as Noryl, which is a blend of polyphenylene oxide (PPO) and polystyrene (PS). Reinforcing fillers such as glass fibers may be added for enhancement of chemical resistance and mechanical and thermal properties.

Figure 12:
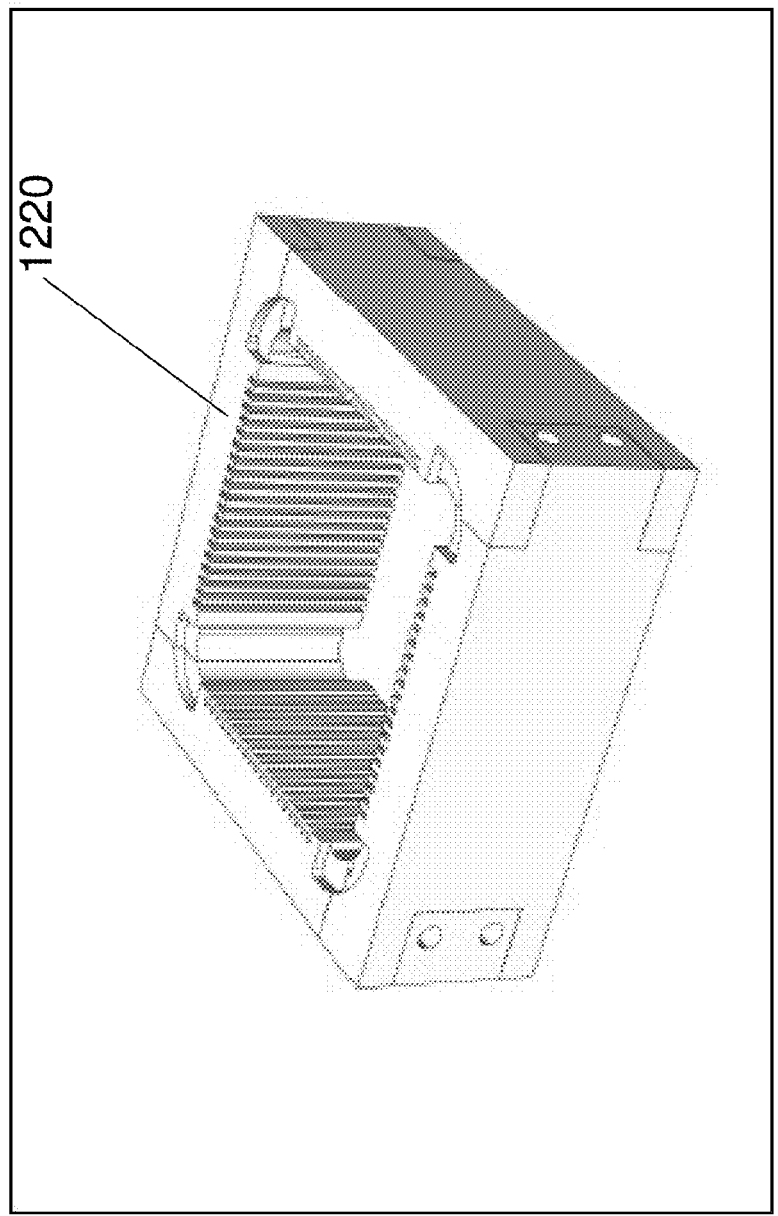
FIG. 12 is a schematic illustration of a frame assembled from four sections in accordance with one or more embodiments.

In some embodiments, the frame can be fabricated using methods such as machining and/or injection molding. In addition, "rapid prototyping" techniques such as stereolithography, 3D printing, fused deposition modeling, etc. can be used for fabrication of the frame. In another embodiment, the frame 1220 is assembled from four sections joined by adhesives, thermal or mechanical methods, or combinations thereof, as shown in FIG. 12. The sections can be fabricated using the same materials and methods as described above.

The frame can be as deep as necessary to accommodate the number of cell pairs in a stack (see height "D" in FIG. 2), particularly if the frame is assembled from sections. To accommodate a stack of 1200 cell pairs, for example, with 0.38 mm (0.015") inter-membrane distance and 30 micron (0.0012") thick membranes, the depth the frame would have to be about 0.984 m (38.74").

There may be practical limitations, however, on manufacturing of such an assembly. Insertion of a stack with a large number of cell pairs into a deep frame may be difficult. The flexible membranes and screens in the stack are initially connected only by adhesive or thermal seals, so the stack has no rigidity. Potting the corners may become more difficult as the height of the stack increases. A potting adhesive, for example, needs to be dispensed uniformly along the entire length of the gap between the stack and the frame as shown in FIG. 4. The seals in a stack assembled in a frame may not be tested until the corners are potted. The entire assembly may have to be rejected if any of the seals fail, resulting in complete loss of materials and labor.

Figure 13:
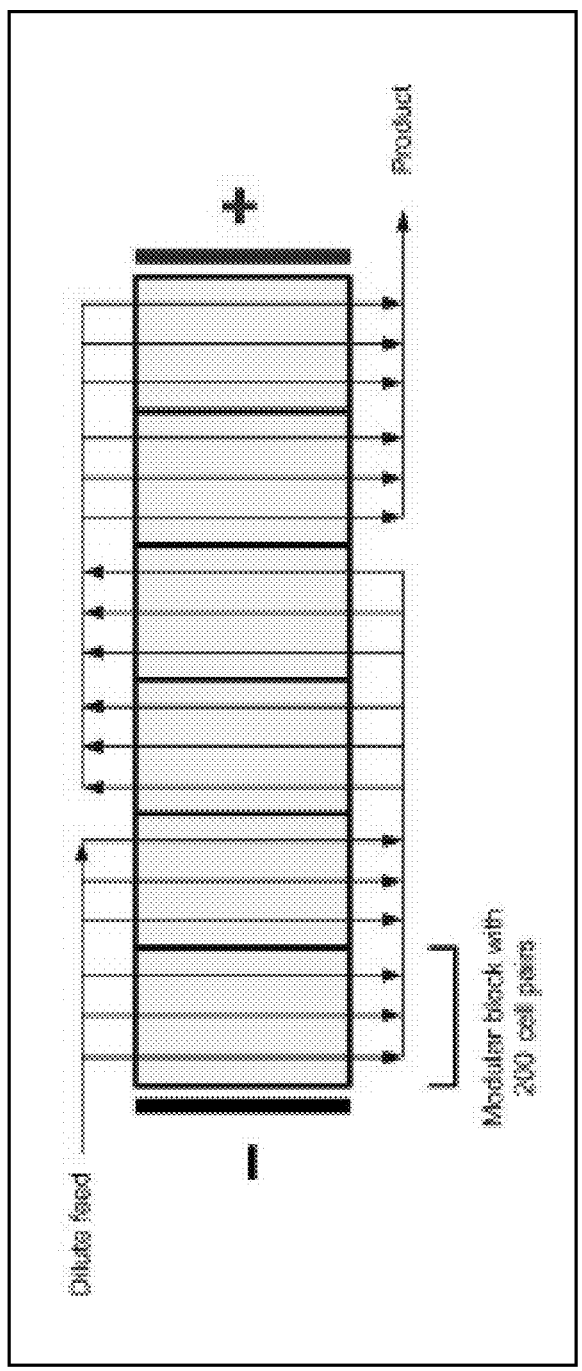
FIG. 13 is a schematic illustration of an electrochemical separation system in accordance with one or more embodiments.

FIG. 13 is a schematic, for example, of the dilute stream in a 3-pass ED device with 1200 cell pairs. There are 6 modular units, each with 200 cell pairs. Alternatively, 3 modular units may be used, each with 400 cell pairs. Many combinations of cell pairs and number of passes are possible. Additionally, the configuration can be asymmetric with different numbers of cell pairs in each pass. This invention is not limited to any specific number of cell pairs or number of passes.

Figure 14:
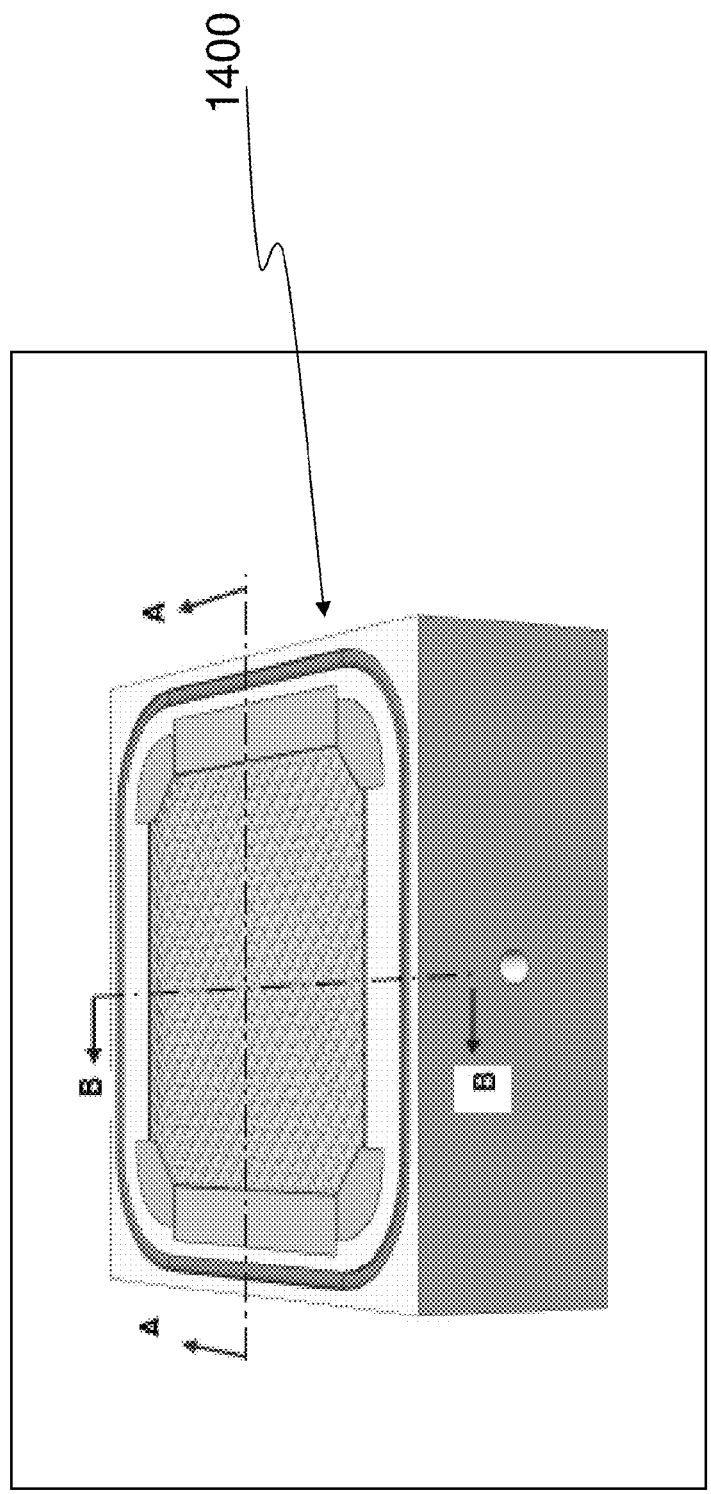
FIG. 14 is a schematic illustration of a modular unit with a stack inserted and potted into a frame in accordance with one or more embodiments.
Figure 15:
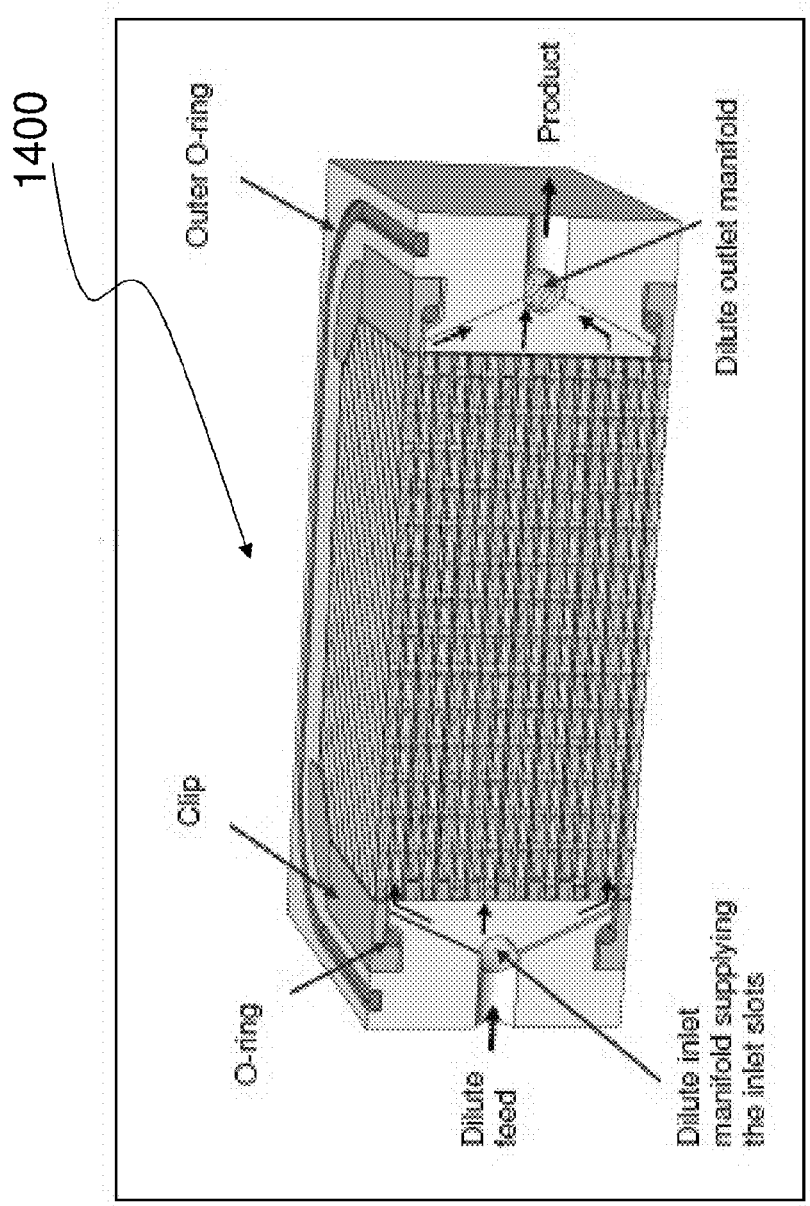
FIG. 15 is a schematic illustration of a view through Section A-A in FIG. 14 in accordance with one or more embodiments.
Figure 16:
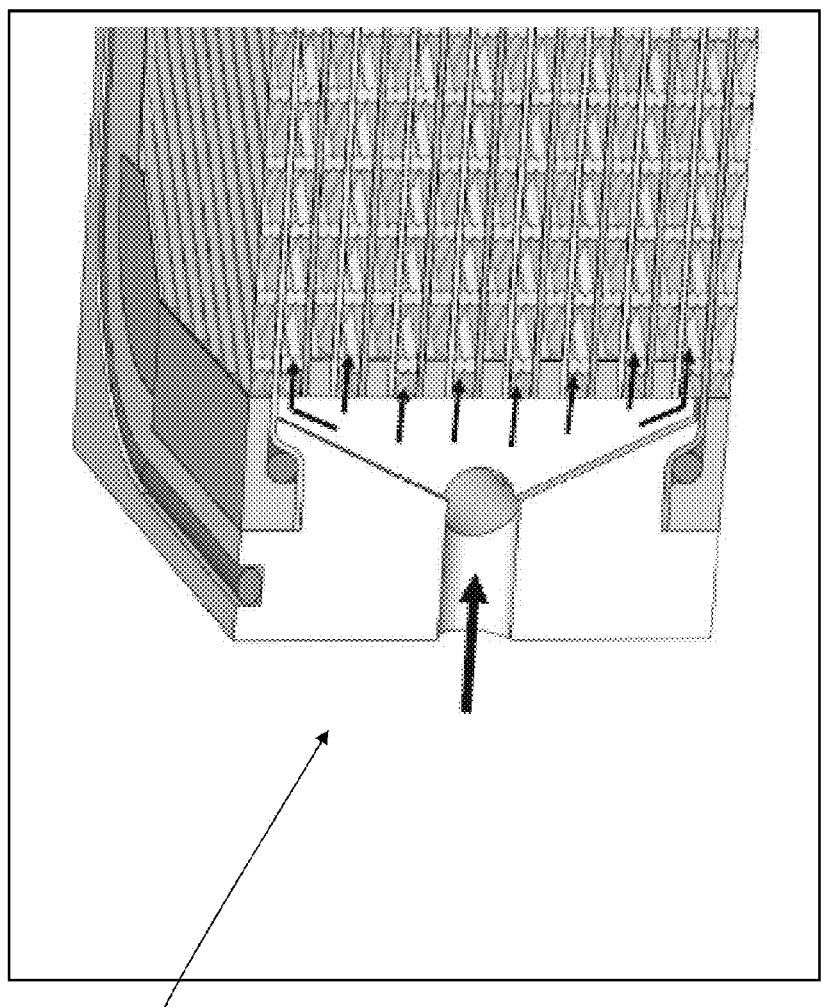
FIG. 16 is a schematic illustration showing details of FIG. 15 in accordance with one or more embodiments.
Figure 17:
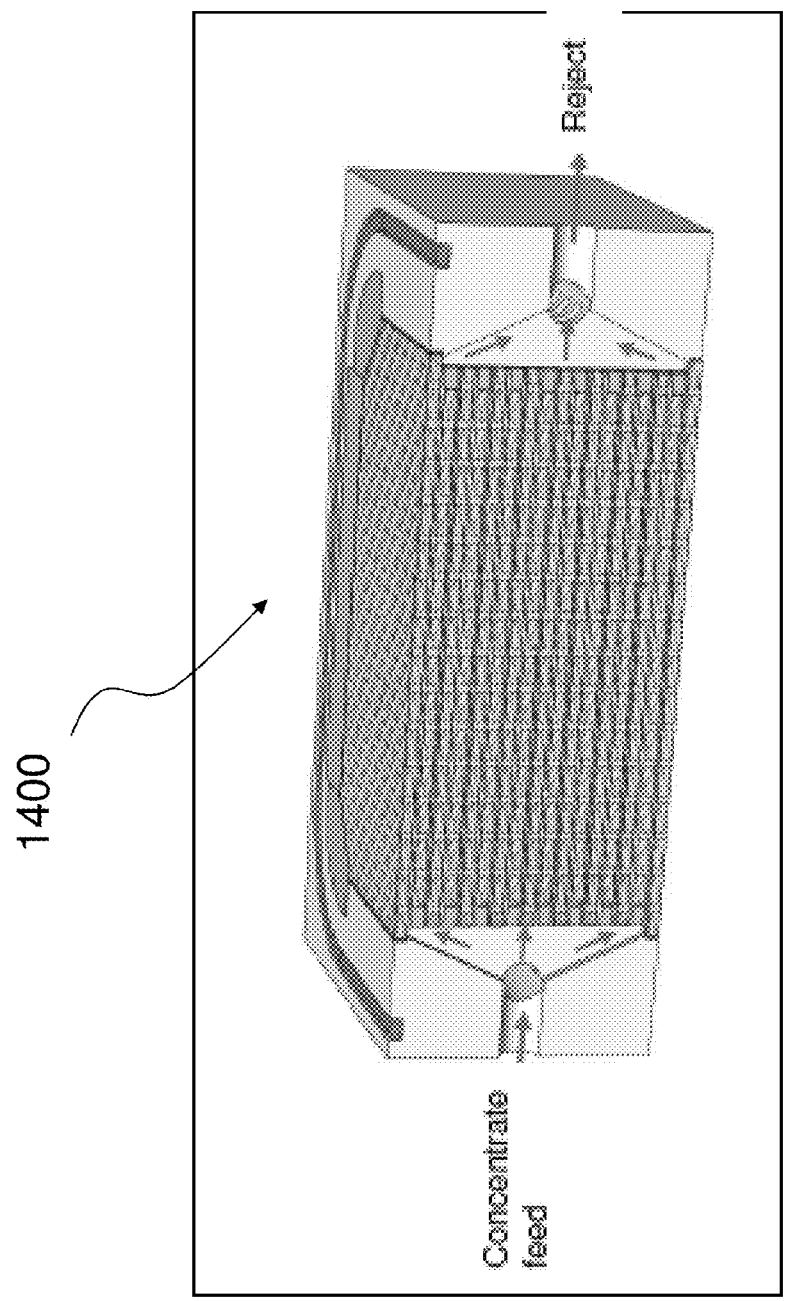
FIG. 17 is a schematic illustration of a view through Section B-B in FIG. 14 in accordance with one or more embodiments.

FIG. 14 shows a modular unit 1400 as another embodiment. FIGS. 15 and 16 are views through Section A-A and B-B, respectively. The thicknesses of the flow compartments and the membranes are again greatly exaggerated for clarity. Each compartment is filled with a screen that separates the adjacent membranes and enhances mixing of the fluid as it flows through the compartment. FIG. 15 is a view through Section A-A in FIG. 14, showing flow through the dilute compartments. The last membrane at the top of the stack (AEM) and the last membrane at the bottom (CEM) extend beyond the stack and are sealed by O-rings secured by clips. These membranes isolate the dilute stream (inlet and outlet manifolds, slots and compartments) from the last concentrate compartments at the top and bottom ends of the stack. FIG. 16 presents a close up view of the inlet to the dilute compartments. FIG. 17 is a view through Section B-B of FIG. 14. The concentrate stream flows through all of the concentrate compartments in parallel, including the one at the top and bottom ends of the stack.

Figure 18:
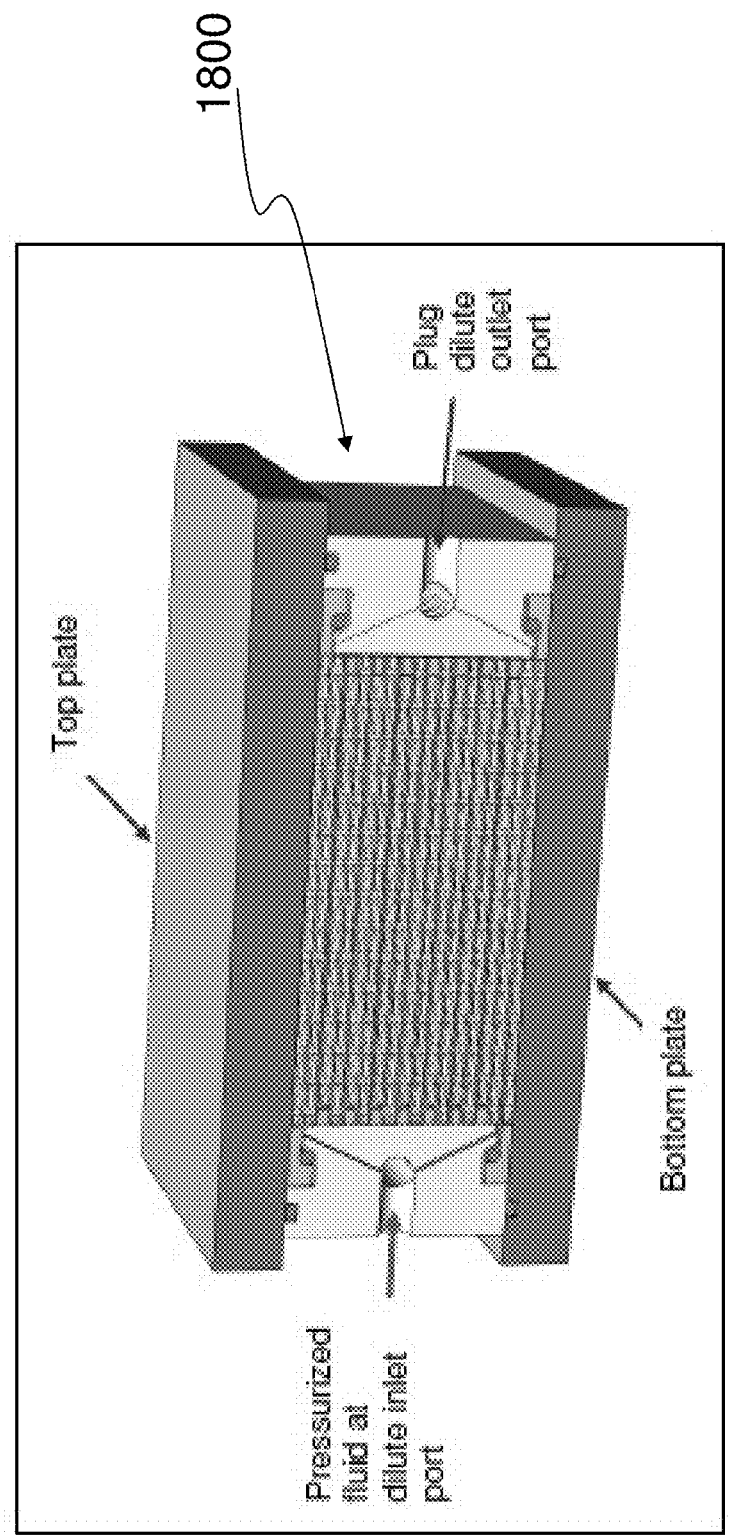
FIG. 18 is a schematic illustration of a section through a modular unit in accordance with one or more embodiments.
Figure 19:
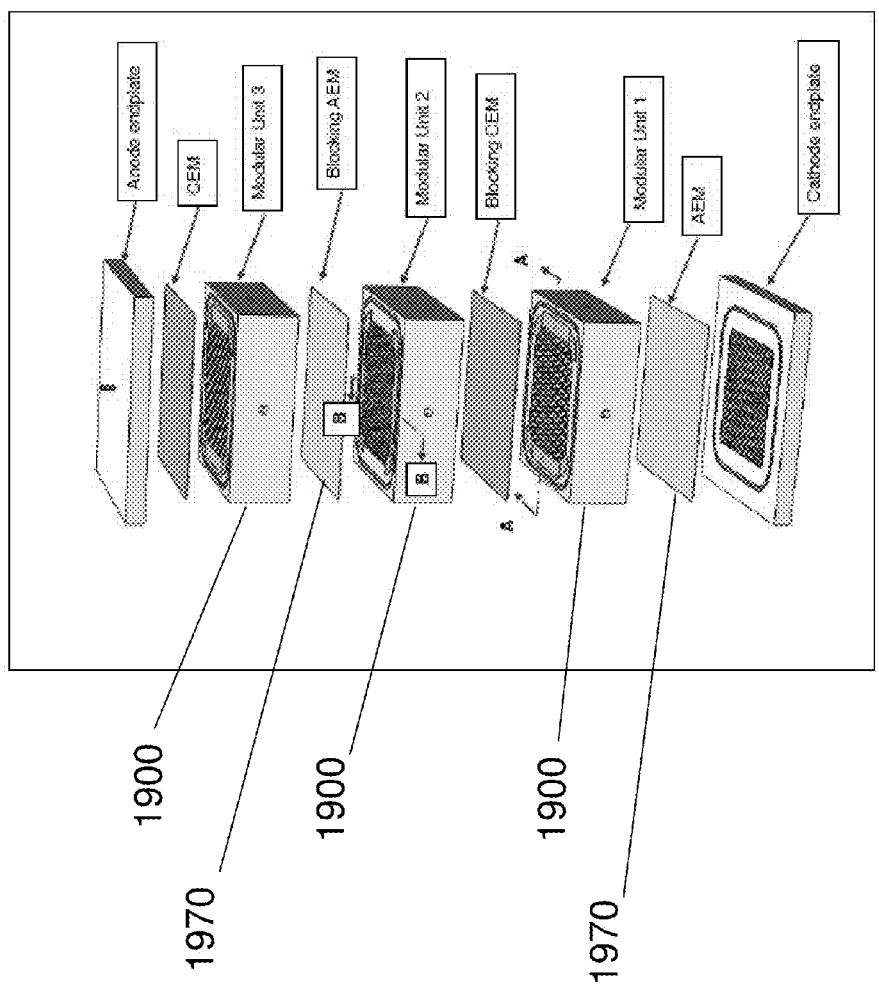
FIG. 19 is a schematic illustration of an exploded view of an ED device in accordance with one or more embodiments.

The outer O-ring on the top surface of the frame of FIG. 15 is used to seal the modular unit against an adjacent flat surface, which can be the top plate of a test device, the frame of an adjacent modular unit above, or an endplate. FIG. 18 shows, for example, a section view through a modular unit device 1800 to test the integrity of the seals in a modular unit. The modular unit is clamped between two plates. The bottom plate has an O-ring which seals against the bottom surface of the modular unit frame. The O-ring at the top of the modular unit seals against the top plate. The dilute outlet port is plugged and a pressurized fluid or gas is applied to the dilute inlet port. A leak in any of bonds between the membranes or at any corner seal will result in a cross-leak to the concentrate stream The presence or rate of cross-leak can be used as a criteria for determining modular unit quality. FIG. 19 shows a stack of endplates, modular units 1900 and separating membranes 1970 before assembly. The components can be aligned using locating pins, for example.

Figure 20:
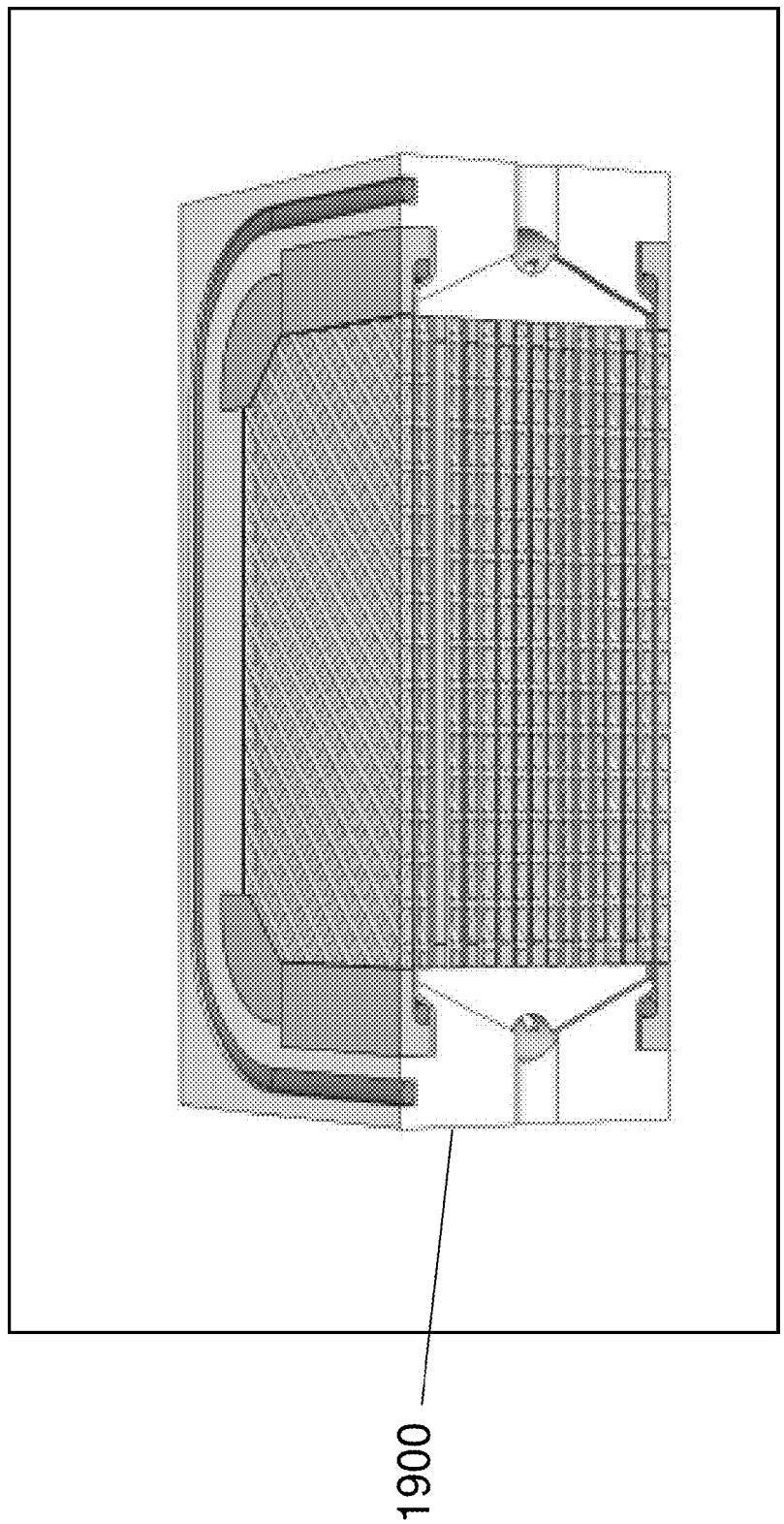
FIG. 20 is a schematic illustration of a view through Section A-A in Modular Unit 1 of FIG. 19 in accordance with one or more embodiments.
Figure 21:
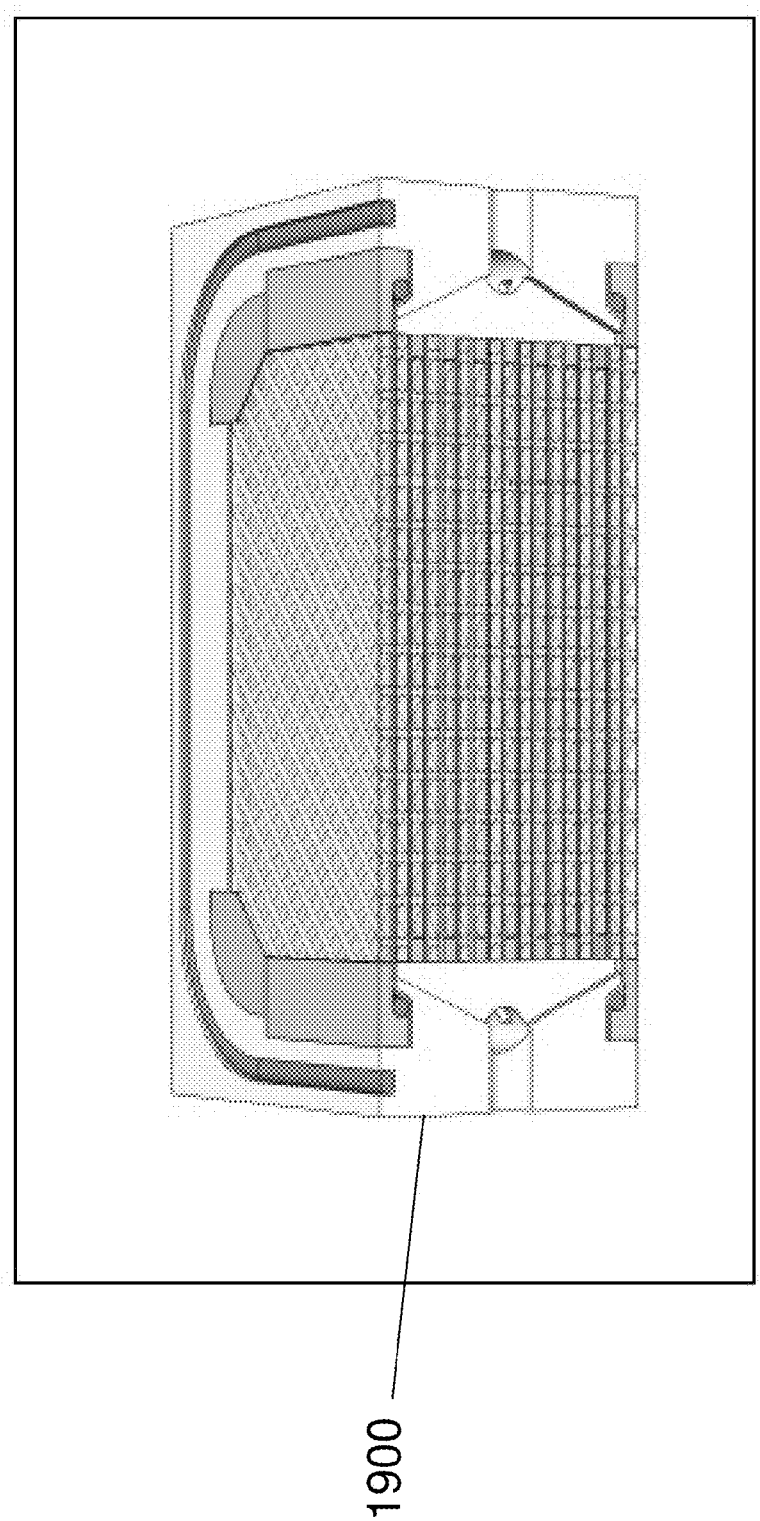
FIG. 21 is a schematic illustration of a view through Section B-B in Modular Unit 2 of FIG. 19 in accordance with one or more embodiments.

In some embodiments, each modular unit may use the same frame design. The frame for Unit 2 may be oriented perpendicularly to the frames for Units 1 and 3 as illustrated by the locations of the clips. The stacks inside Units 1 and 3 are the same, but different from the stack inside Unit 2. FIG. 20 is a view through Section A-A in Unit 1 and FIG. 21 is a view through Section B-B in Unit 2. The last compartments at the top and bottom of Unit 1 are concentrate compartments, the last membrane at the top is an extended or separating AEM and the last membrane at the bottom is an extended or separating CEM. In Unit 2, the last compartments at the top and bottom are dilute compartments, the last membrane at the top is an extended CEM and the last membrane at the bottom is an extended or separating AEM.

Figure 22:
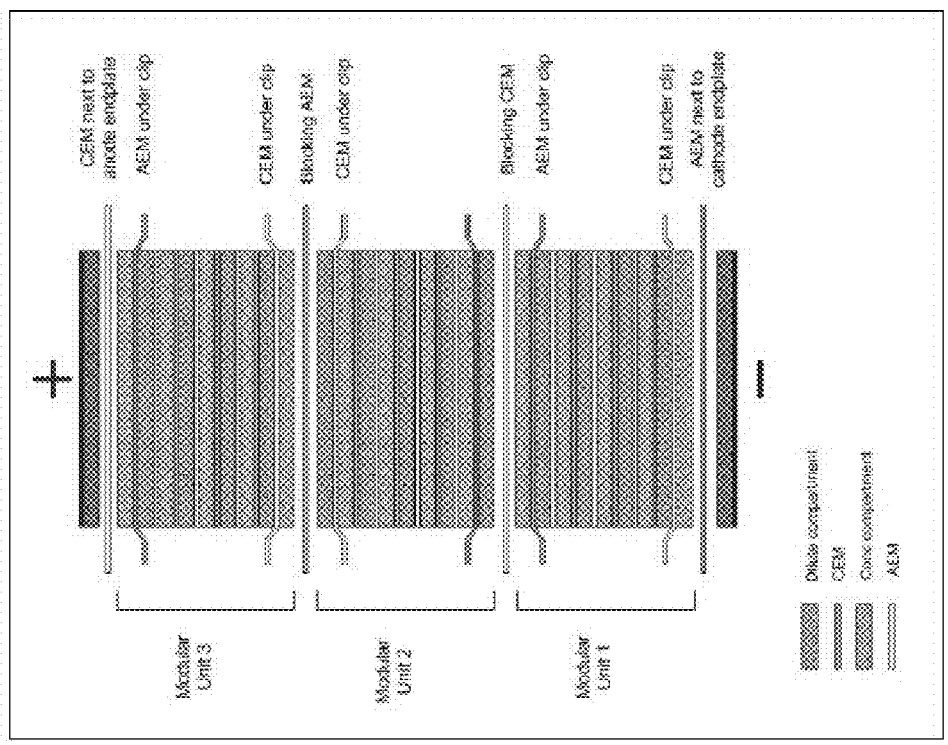
FIG. 22 is a schematic illustration of an arrangement of membranes and cells in an ED device in accordance with one or more embodiments.
Figure 23:
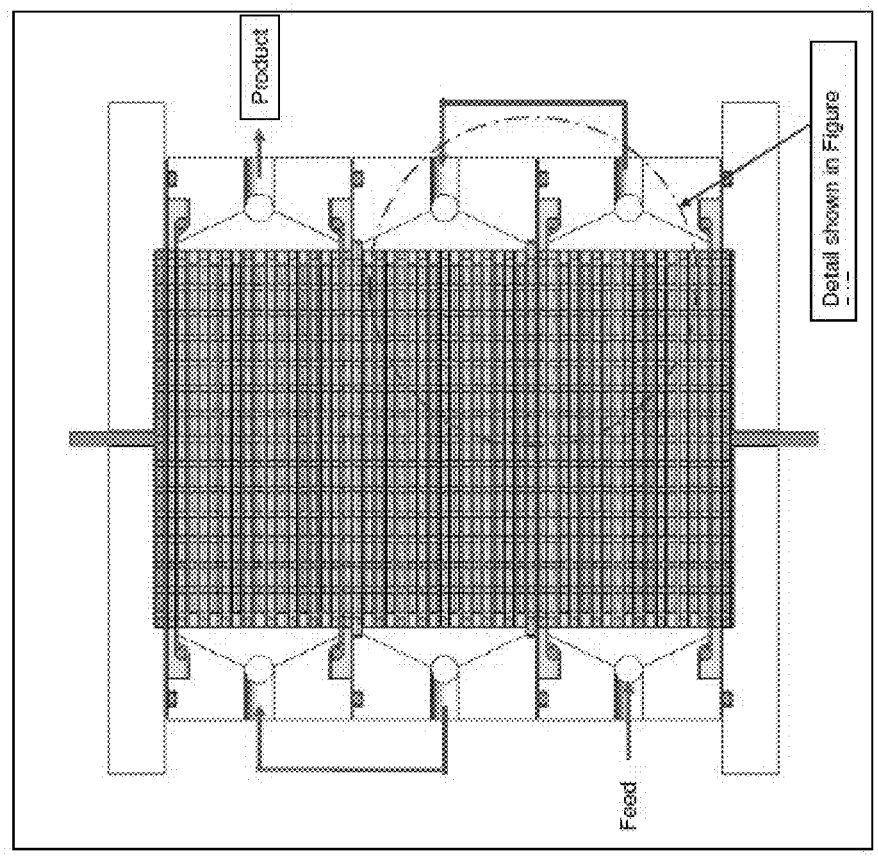
FIG. 23 is a schematic illustration of a section view through an assembled ED device in accordance with one or more embodiments.
Figure 24:
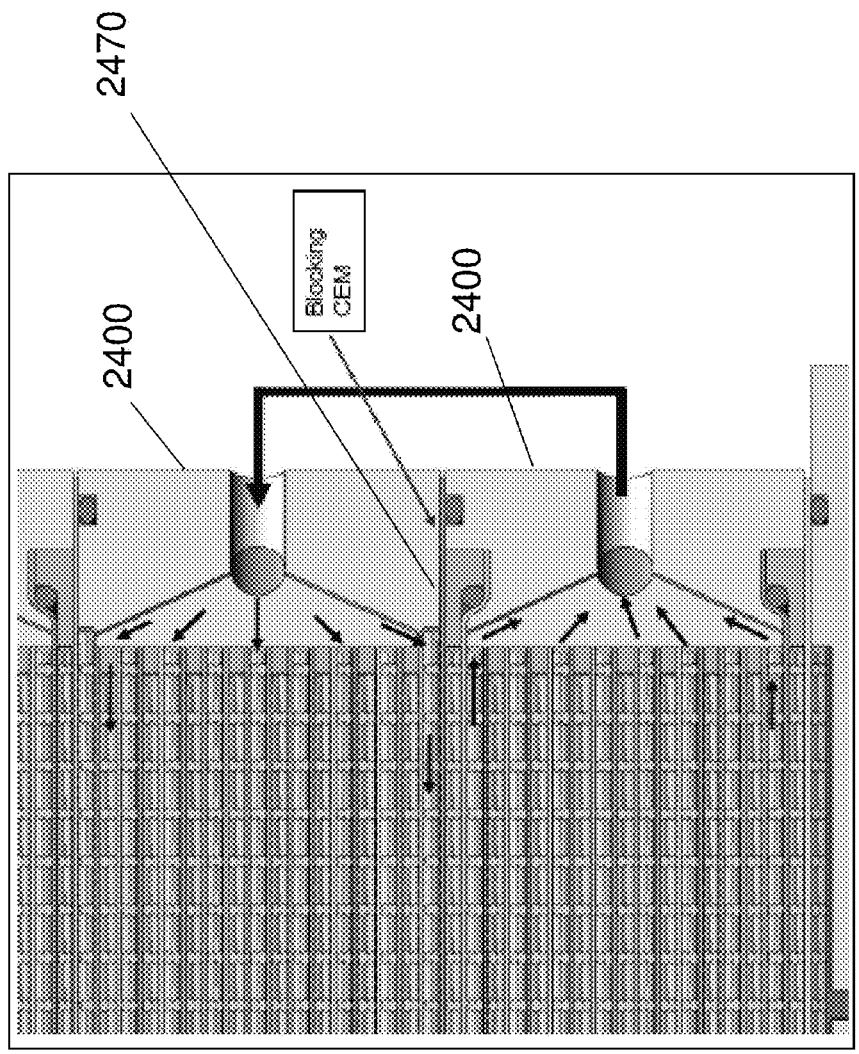
FIG. 24 is a schematic illustration of a detailed view of FIG. 23 in accordance with one or more embodiments.

The arrangement of membranes and cells in the modular units, along with blocking membranes, as shown in the schematic in FIG. 22, allows multi-pass flow configurations in the dilute and concentrate streams and results in concentrate compartments next to the electrode compartments. Those concentrate compartments serve as buffer cells between the electrode compartments and the next dilute. FIG. 23 is a view through an assembled ED device showing the 3-pass flow through the dilute compartments. FIG. 24 is a detailed view of the dilute outlet of Modular Unit 1 and dilute inlet of Unit 2 illustrating blocking spacer 2470 between modular units 2400.

Figure 25:
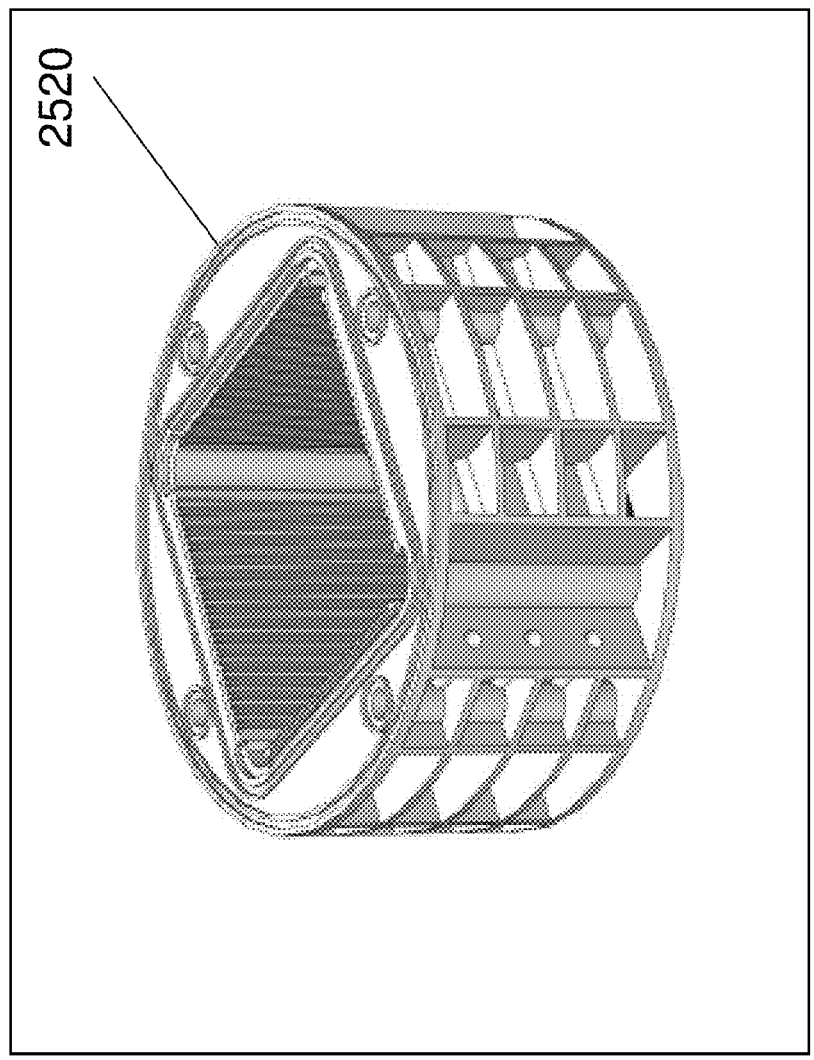
FIG. 25 is a schematic illustration of a frame with cylindrical outer shape in accordance with one or more embodiments.

A section view through the assembled ED modular unit perpendicular to the section in FIG. 23 would show the 3-pass flow through the concentrate compartments. The endplates in the ED device shown in FIG. 19 and FIG. 23 can be drawn together using threaded rods with nuts at the ends, commonly called tie-rods or tie-bars in plate-and-frame ED devices. The endplates must apply sufficient compression to the modular units to seal the O-rings. Other apparatus can also be used to apply compressive force to the modular units. One example would a pressurized bladder located at the end of the stack of modular units. The tie-bars can be arranged outside the frame (outboard), or the walls of the frames can be thick enough to allow the tie-bars to be located inside the walls (inboard). The ED device can be enclosed for cosmetic or safety reasons. The enclosure can be assembled from thermo-formed plastic panels, for example. The ED device can also be inserted into a pressure vessel for safety and structural reasons. In some embodiments, the frames are square in external shape and have walls that are essentially solid. The walls may be cored out if the frames are to be injection molded to avoid excessively thick sections. Pressurized fluid is pumped through the modular units during operation, so reinforcing ribs may be added to the wall for stiffness and strength. The external shape of the frames need not be square. For example, FIG. 25 shows a frame 2520 that is substantially circular in external shape and designed for injection molding. Rectangles, hexagons and octagons are among other possible shapes. The sides of the frame also can be asymmetrical in length and number.

Figure 26:
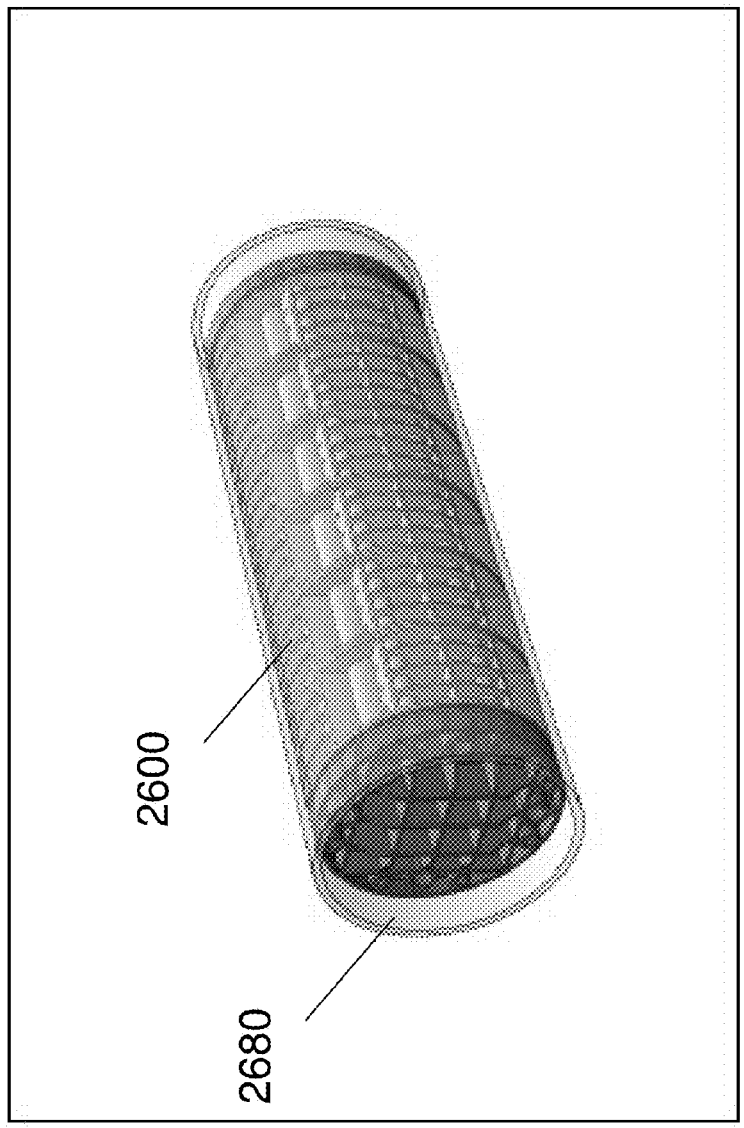
FIG. 26 is a schematic illustration of an ED device in a cylindrical vessel with molded endplates in accordance with one or more embodiments.
Figure 27:
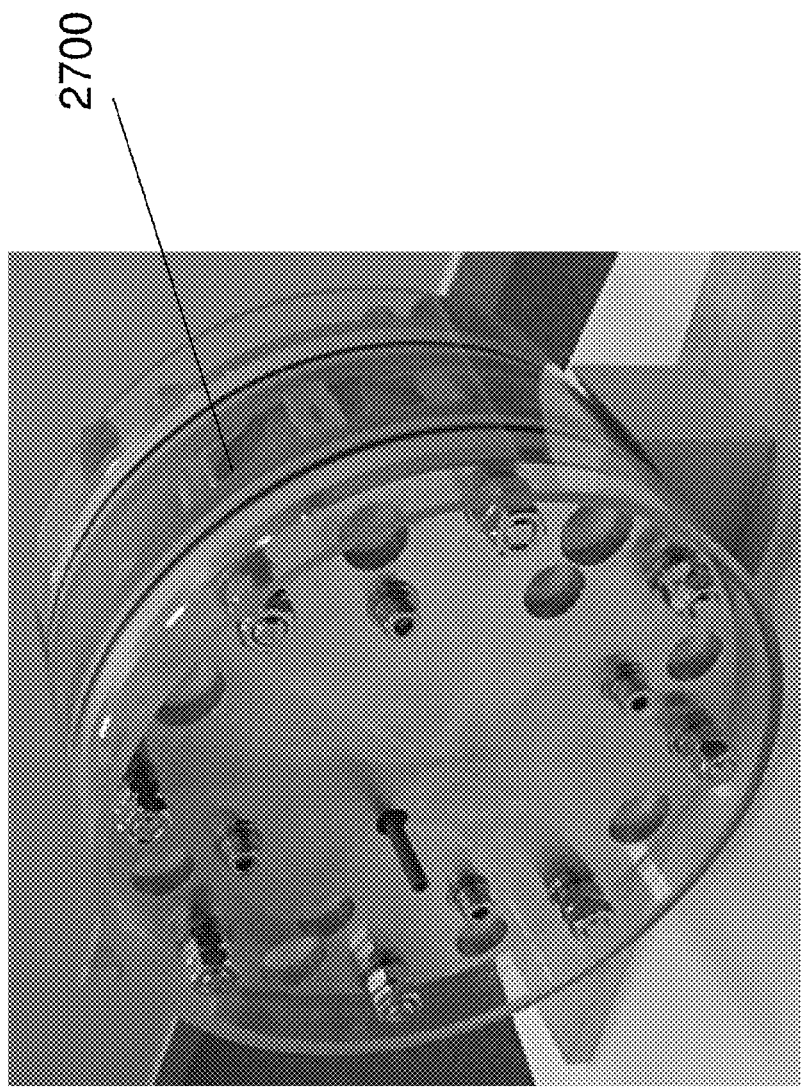
FIG. 27 is a schematic illustration of a prototype modular unit in a clear acrylic cylinder in accordance with one or more embodiments.
Figure 28:
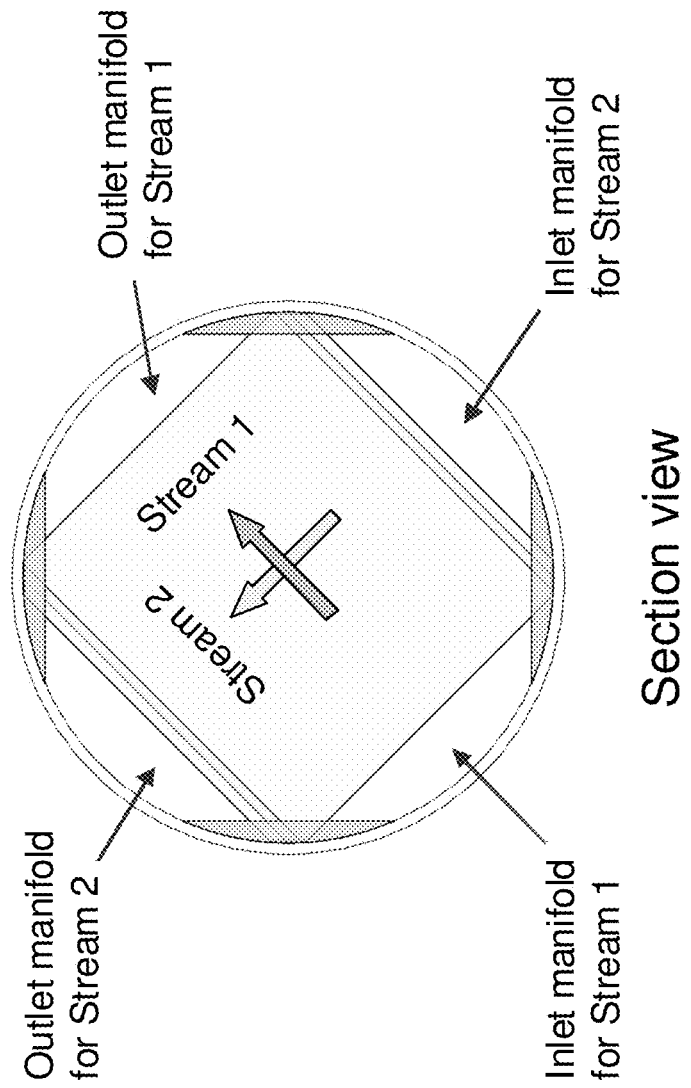
FIG. 28 is a schematic illustration of flow through a stack of cell pairs in accordance with one or more embodiments.
Figure 29:
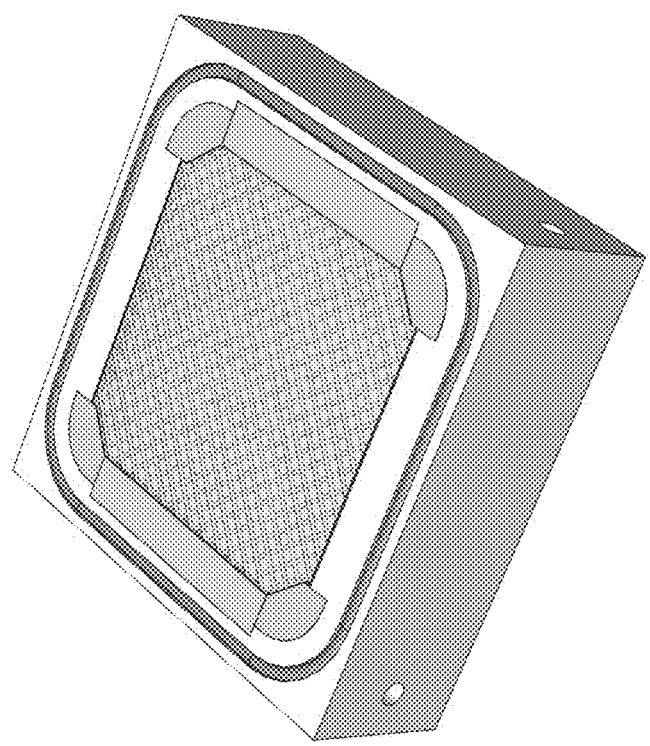
FIG. 29 is a schematic illustration of a cell stack in a frame with slots in accordance with one or more embodiments.
Figure 30:
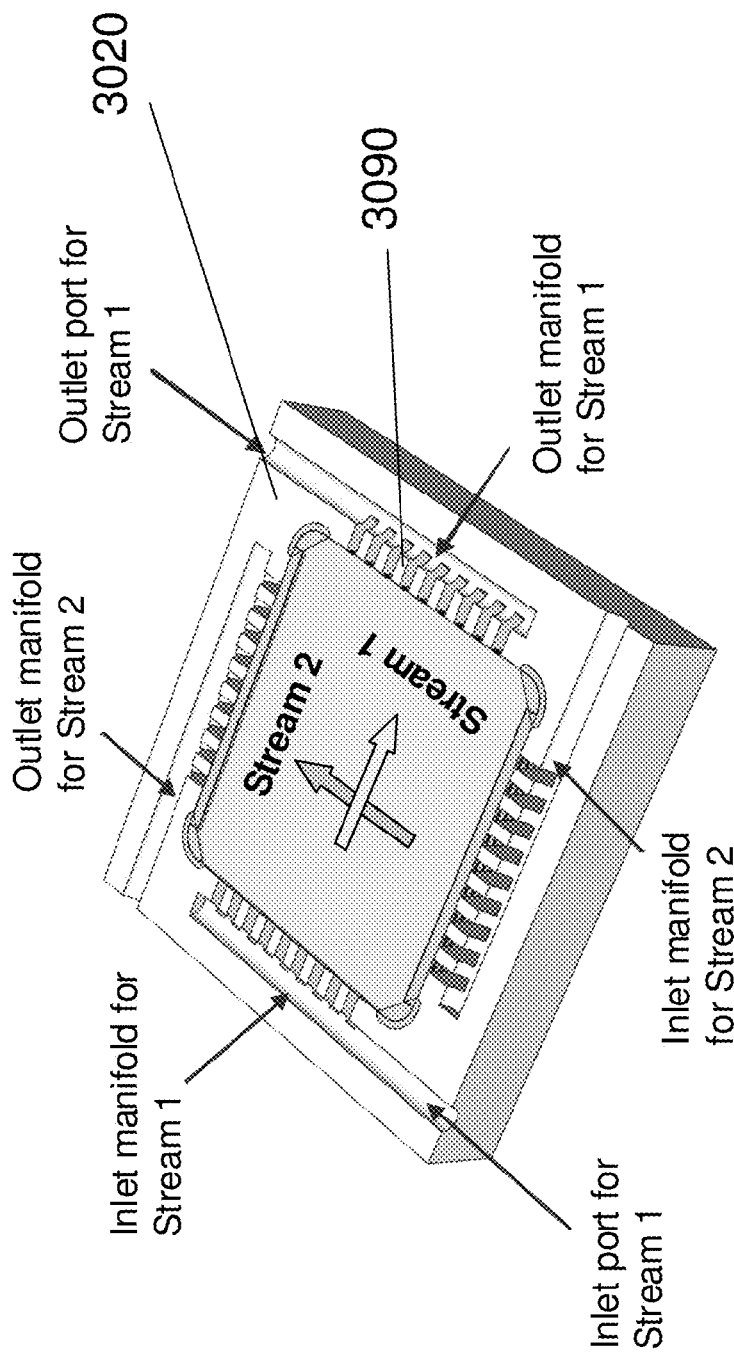
FIG. 30 is a schematic illustration of flow through a frame and stack of cell pairs in accordance with one or more embodiments.

FIG. 26 shows six modular units 2600 between two molded endplates, all housed in a cylindrical vessel 2680 (shown transparent). O-rings on the endplates seal against the inside wall of the cylinder at the ends. The cylinder can have multiple functions, including alignment of modular blocks during assembly, structural support to the round frames as the flow compartments and manifolds inside the ED device are pressurized during operation, prevention of external leaks if any of the O-rings between the modular units and between the units and the endplates were to leak, and as a cosmetic cover. The cylindrical vessel may not be necessary if the frames can be designed and fabricated with sufficient stiffness and strength. One or more non-structural cosmetic covers can be used to enclose the modular units. FIGS. 27 and 28 each illustrate a modular unit inserted into a circular enclosure without a frame. FIGS. 29 and 30 illustrate a modular unit constructed with a frame 3020 containing slots 3090.

This invention is not limited in use to electrodialysis equipment. Other electrochemical deionization device such as electrodeionization (EDI) or continuous electrodeionization (CEDI) can also be constructed using a cross flow configuration with multiple passes using a modular frame with slots in which cell pairs are inserted.

In cross-flow electrodialysis (ED) and electrodeionization (EDI) devices the diluting and concentrating streams flow in directions perpendicular to each other. Potential applications include desalination of seawater, brackish water and brines from oil and gas production.

Various designs and manufacturing methods may be used cross-flow modular units. In some non-limiting embodiments, modular units may be incorporated into a vessel. In at least one non-limiting embodiment, the vessel may be substantially cylindrical. FIG. 27 illustrates a 50 cell pair modular unit. In this design, open inlet and outlet manifolds are in direct fluid communication with the flow compartments as illustrated in FIG. 28. The open manifolds reduce pressure drop in each stream, but part of the electrical current from one electrode to the other can bypass the stack of cell pairs by flowing through the open areas. The bypass current reduces current efficiency and increases energy consumption. For desalination of NaCl solutions, current efficiency may be calculated as follows:

$$\eta_i = \frac{[(q_d)_{in} C_{in} - (q_d)_{out} C_{out}]zF}{I}$$

where:
$\eta_i$=current efficiency
$(q_d)_{in}$=flow rate per dilute compartment at inlet
$(q_d)_{out}$=flow rate per dilute compartment at inlet
$C_{in}$=concentration at dilute inlet
$C_{out}$=concentration at dilute outlet
z=valence=1 for NaCl
F=Faraday's constant
I=current For desalination of seawater, current efficiency may be calculated as follows:

$$\eta_i = \frac{\left[(q_d)_{in}\left(\sum_i C_i z_i\right)_{in} - (q_d)_{out}\left(\sum_i C_i z_i\right)_{out}\right]F}{I}$$

where:
$C_i$=concentration of individual ions
$z_i$=valence of individual ions

A "process efficiency $\eta_p$" may be defined as follows for NaCl solutions:

$$\eta_p = \frac{(q_d)_{out}(C_{in} - C_{out})zF}{I}$$

The process efficiency is generally less than or equal to the current efficiency:

$$\eta_p = n_i - \frac{\Delta(q_d)C_{in}zF}{I}$$

where:
$\Delta(q_d)$=rate of water loss from the dilute compartment due to electro-osmosis or osmosis.

Figure 31:
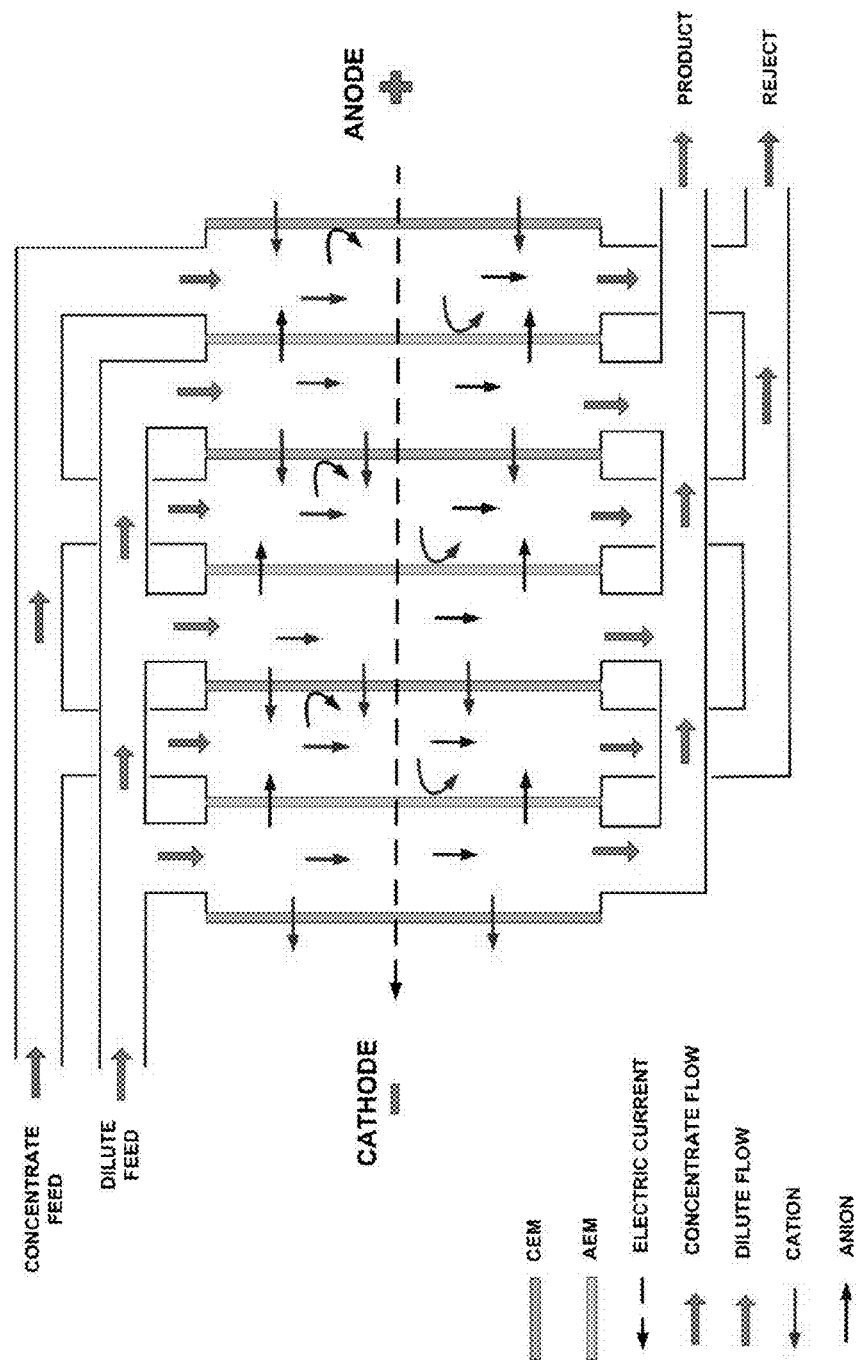
FIG. 31 is a schematic illustration of transport processes in a preferred ED modular unit in accordance with one or more embodiments.
Figure 32:
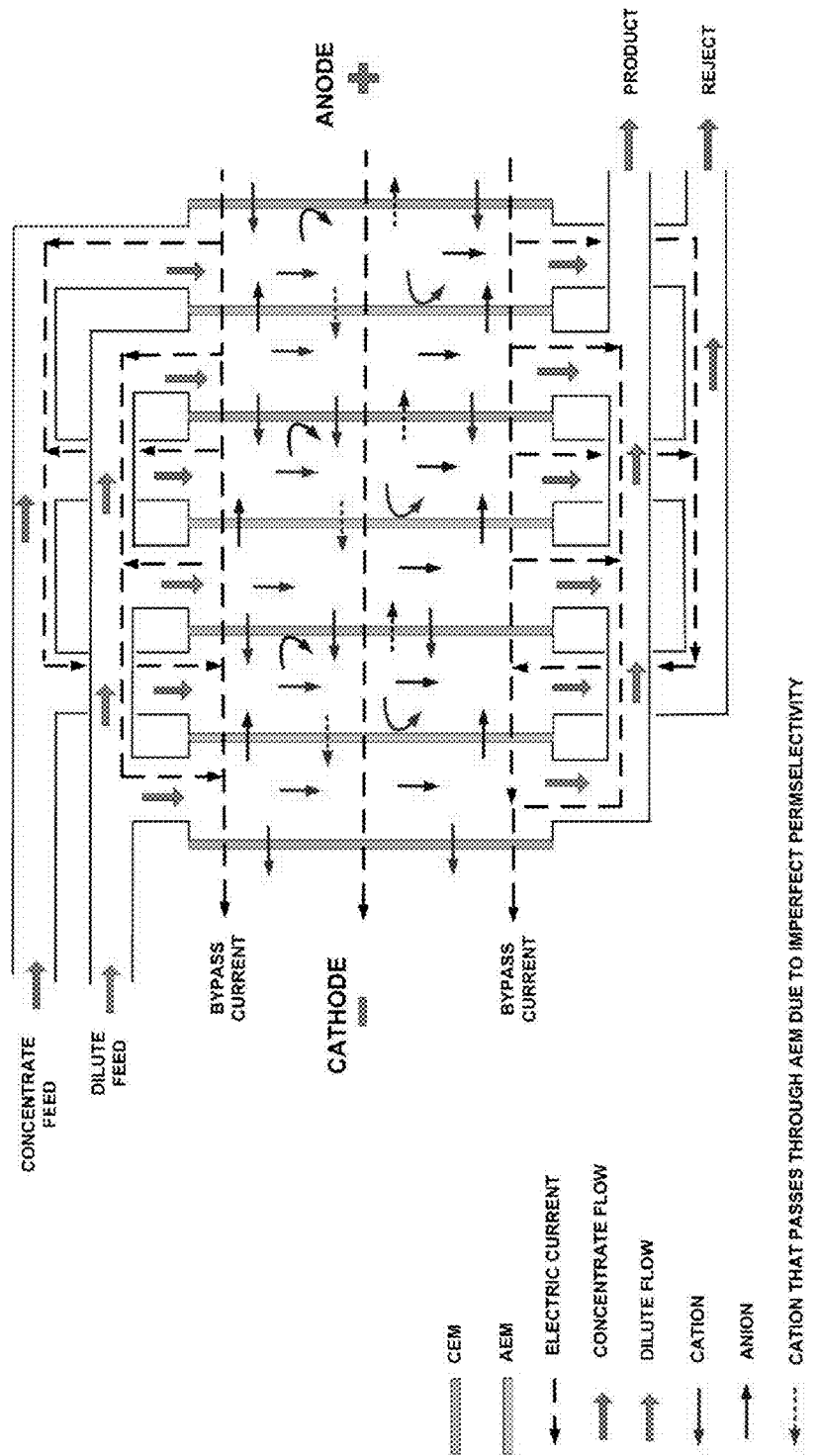
FIG. 32 is a schematic illustration of transport processes in an ED modular unit with current inefficiencies in accordance with one or more embodiments.
Figure 33:
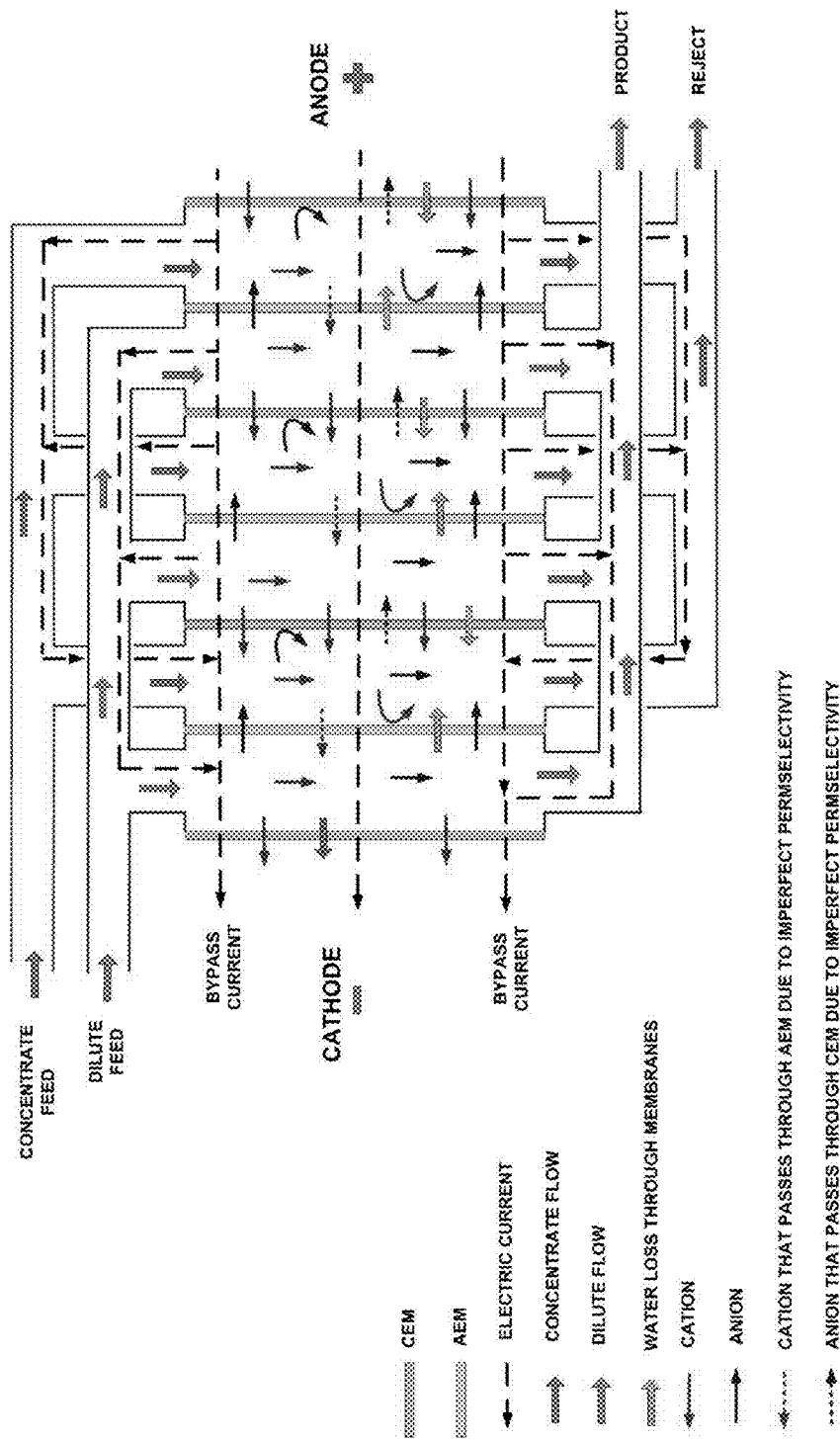
FIG. 33 is a schematic illustration of transport processes in an ED modular unit with current inefficiencies and water loss in accordance with one or more embodiments.

In some embodiments, systems and methods may support a stack of cell pairs on all sides by a frame. The frame may have vertical slots which connect the inlet and outlet manifolds for the dilute and concentrate streams to their respective flow compartments in the stack as illustrated in FIGS. 29 and 30. Among the expected benefits of such a design is reduction of current bypass by elimination of the open areas at the inlets and outlets to the stack. A stack of cell pairs can be potted at the corners in a frame to form a modular sub-block that can be checked for cross-leaks, desalination performance and pressure drop. Multiple blocks can be stacked to form an ED modular unit. Blocking membranes can be inserted between the blocks to direct the dilute and/or concentrate stream into multiple-pass flow configurations. FIG. 31 illustrates transport processes in an ideal electrochemical separation system. FIG. 32 illustrates transport processes involving current inefficiencies within an electrochemical separation system and FIG. 33 illustrates transport processes involving current inefficiency in combination with water loss an electrochemical separation system.

Figure 34:
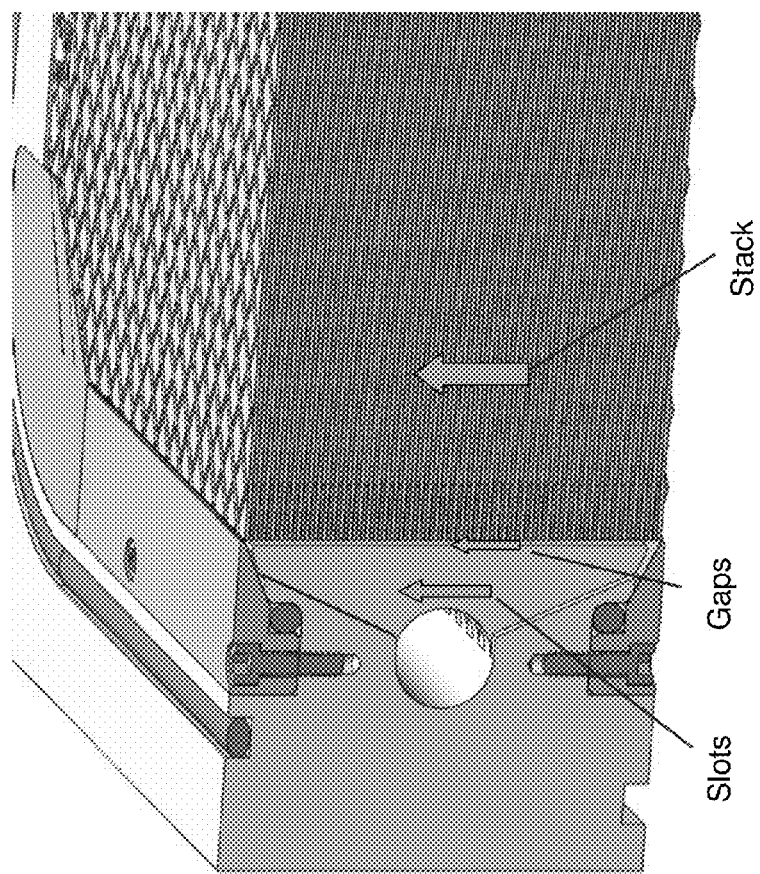
FIG. 34 is a schematic illustration of current paths in a modular unit in accordance with one or more embodiments.
Figure 35:
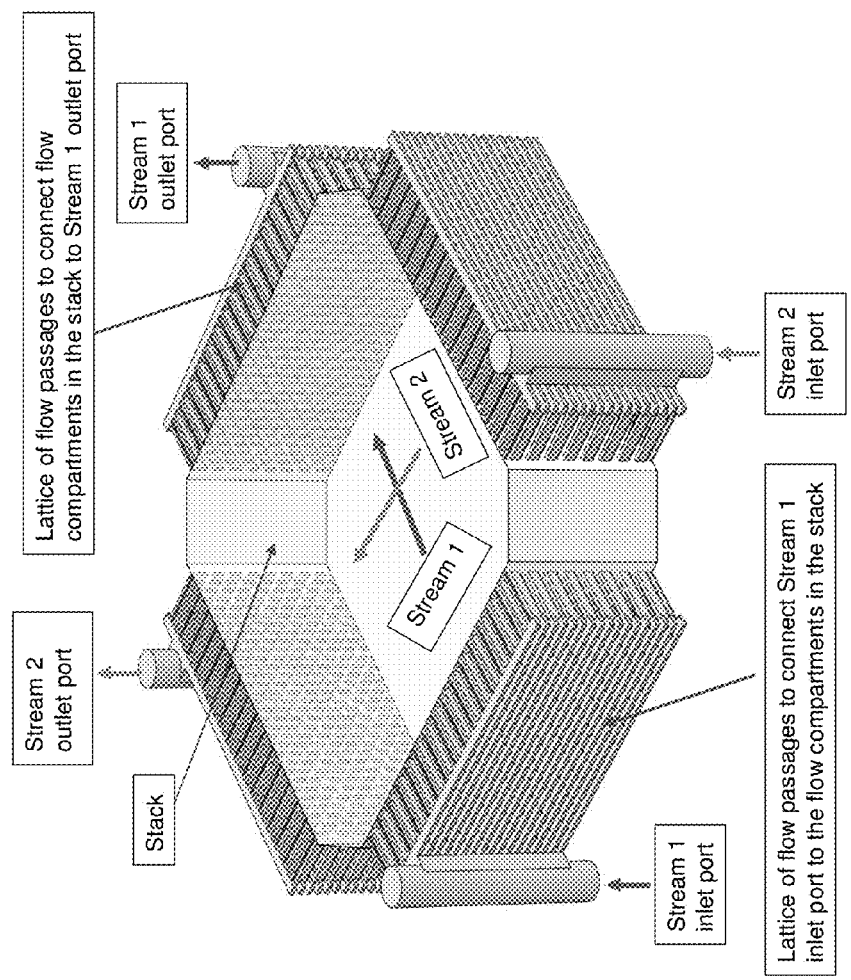
FIG. 35 is a schematic illustration of fluid volume in flow passages inside a modular unit frame in accordance with one or more embodiments.

FIG. 34 illustrates that the current can still bypass the stack by flowing through the gaps between the frame and the stack and within the vertical slots from one end of the stack to the other. Current bypass through the slots is therefore significant. In accordance with one or more embodiments, methods may reduce current bypass in cross-flow ED devices. In some embodiments, flow passages in a sub-block frame may reduce the fraction of current that bypasses the stack and thereby increase current efficiency. The passages may connect the inlet and outlet ports to the flow compartments in the stack of cell pairs. FIG. 35 shows the fluid volume in flow passages inside a sub-block frame. Stream 1, for example, enters the frame at an inlet port and flows through a lattice of passages into the stack. For simplicity the fluid volume in the stack is represented by a transparent block. The actual fluid volume in the flow compartments in the stack is defined by the membranes and the screens. From the stack Stream 1 flows to the outlet port via a second lattice of passages. Stream 2 is oriented perpendicular to Stream 1; otherwise the design of flow passages is the same.

Figure 36:
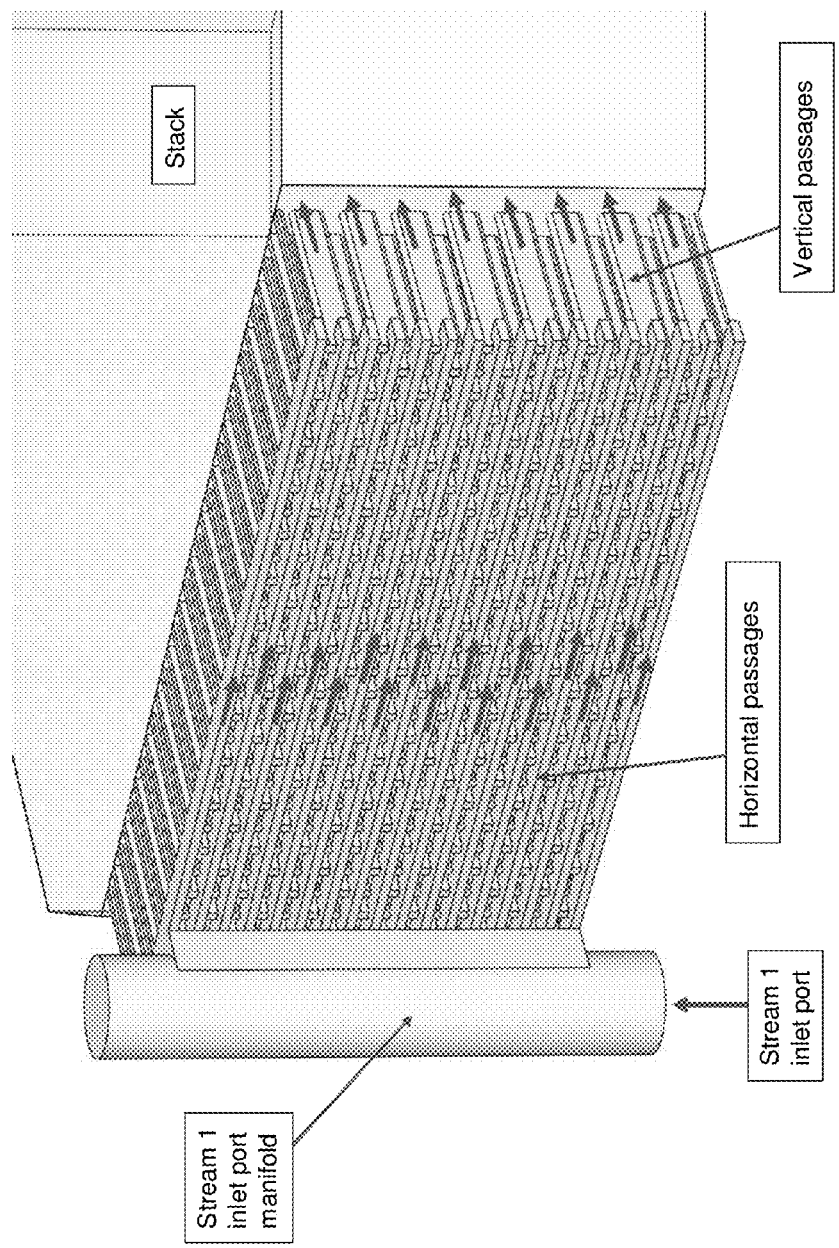
FIG. 36 is a schematic illustration of inlet flow passages in accordance with one or more embodiments.

FIG. 36 is a detailed view of the inlet flow passages for Stream 1. Flow from the inlet port is distributed to a number of horizontal passages in parallel. Each horizontal passage in turn distributes its portion of the flow to a number of flow compartments in the stack via vertical passages. At the outlet of the flow compartments, the reverse sequence of passages (vertical passages→horizontal passages→outlet port) allows the flow to exit the sub-block.

Figure 37:
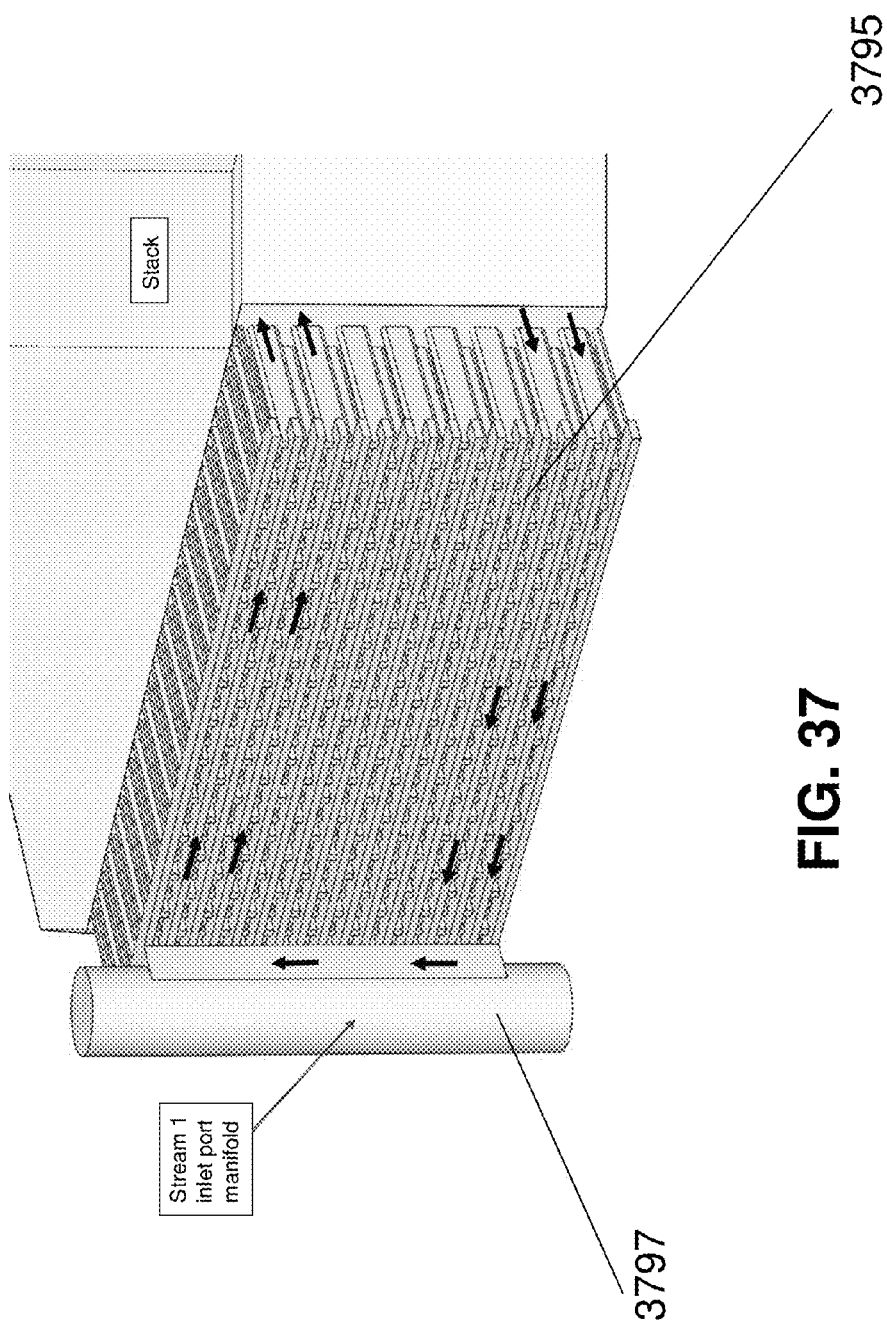
FIG. 37 is a schematic illustration of examples of paths for current bypass around the stack in accordance with one or more embodiments.

FIG. 37 shows that the bypass current can flow from one end of the stack to the other only through a series of vertical and horizontal passages; the horizontal passages are in fluid communication with each other only through the port manifolds. There are two sets of bypass paths, one via the inlet port manifold and the other via the outlet port manifold. Insert 3795 includes inlet manifold 3797.

The current paths through the sub-block can therefore be represented as a circuit with three resistors in parallel; one is the resistance of the cell pairs in the stack and the other two are resistances of the two sets of paths for the bypass current.

By proper sizing of the passages, the electrical resistance of the convoluted paths for the bypass current can be made significantly higher than the resistance of the direct path through the stack. The majority of the current can therefore be forced to flow through the stack. In at least some embodiments, at least 70% of the current may flow through the stack and therefore at least about 70% current efficiency may be achieved. In at least some embodiments, at least 80% of the current may flow through the stack and therefore at least about 80% current efficiency may be achieved. In at least some embodiments, at least 90% of the current may flow through the stack and therefore at least about 90% current efficiency may be achieved.

Figure 38:
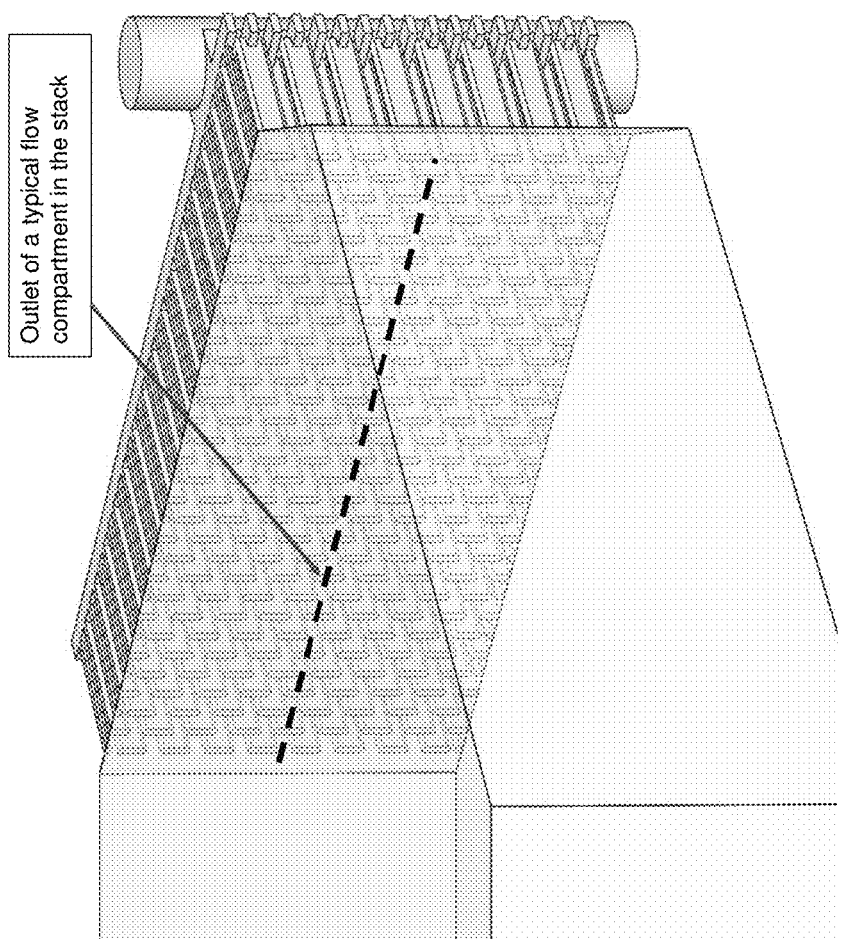
FIG. 38 is a schematic illustration of staggered vertical passages in accordance with one or more embodiments.

The flow passages adjacent to the stack are oriented vertically so that each communicates with several cell pairs. They are staggered vertically as shown in FIG. 38 so that every flow compartment is in communication with multiple vertical passages. The dimensions and spacing of the vertical and horizontal flow passages affect the flow distribution in the flow compartment in the stack and the overall pressure drop in the two streams. Computational Fluid Dynamics (CFD) software can be used to optimize the design.

In some embodiments, the internal flow passages as shown in FIG. 36 may be formed in a block of material. Thus, the internal flow passages may be integral to the frame. In other embodiments, at least a portion of the flow passages may be formed in a separate section of material and then inserted into the frame. For example, an insert may include a portion of the flow passages. An insert may include slots and/or grooves that are fabricated separately and then installed in a frame.

Figure 39:
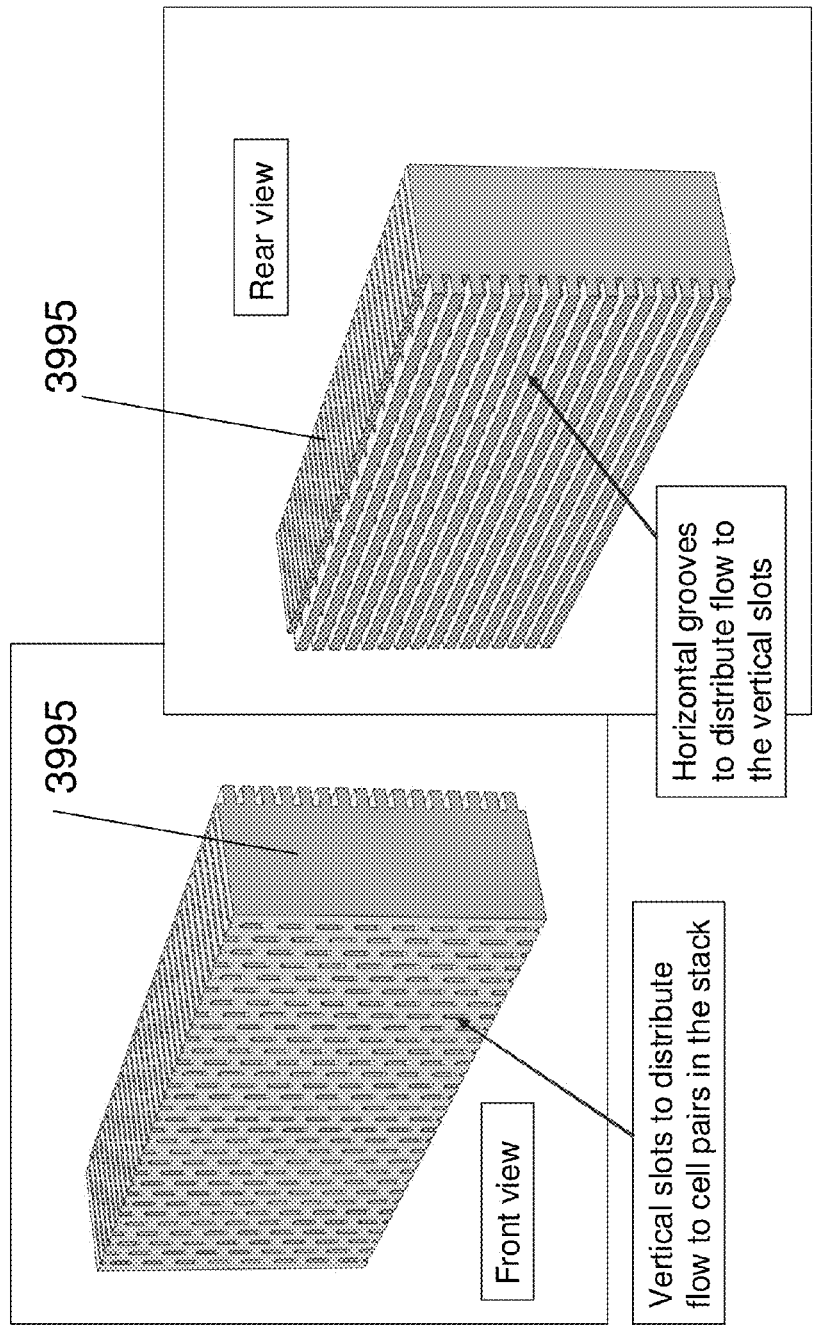
FIG. 39 is a schematic illustration of vertical slots and horizontal grooves in an insert in accordance with one or more embodiments.
Figure 40:
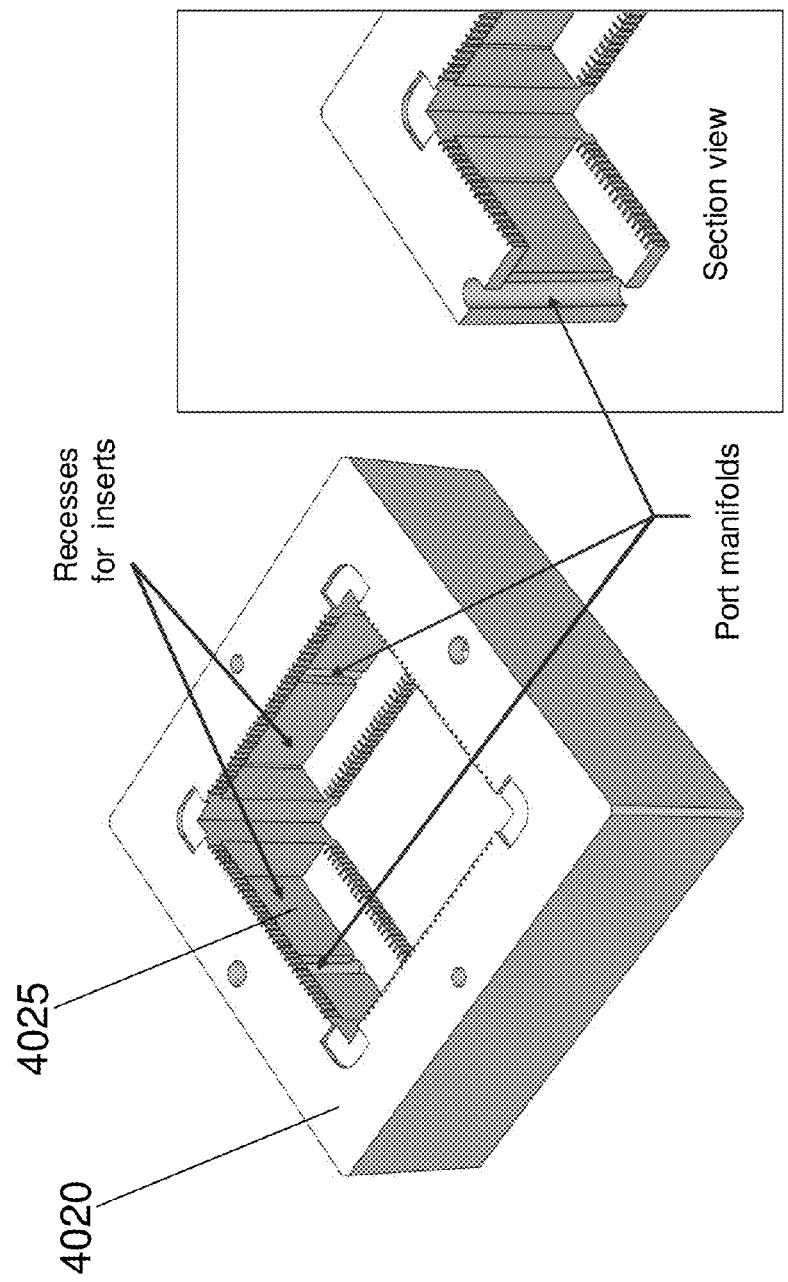
FIG. 40 is a schematic illustration of a frame with recesses for inserts in accordance with one or more embodiments.
Figure 41:
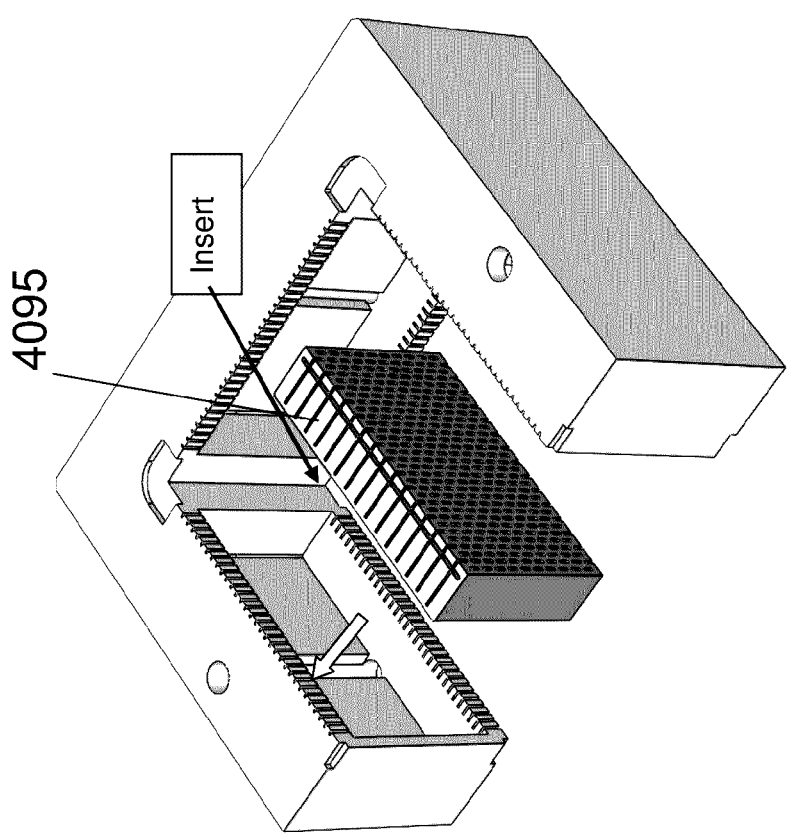
FIG. 41 is a schematic illustration of a frame with an insert to be installed in accordance with one or more embodiments.
Figure 42:
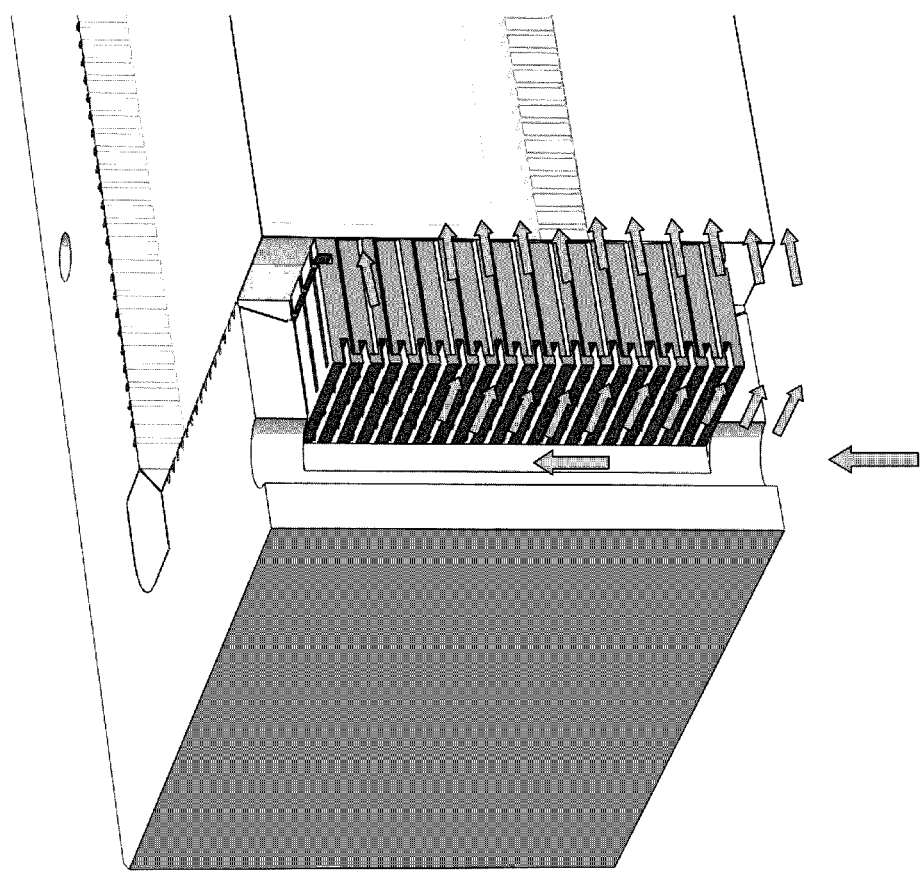
FIG. 42 is a schematic illustration of a section view showing flow paths in an assembled modular unit in accordance with one or more embodiments.
Figure 43:
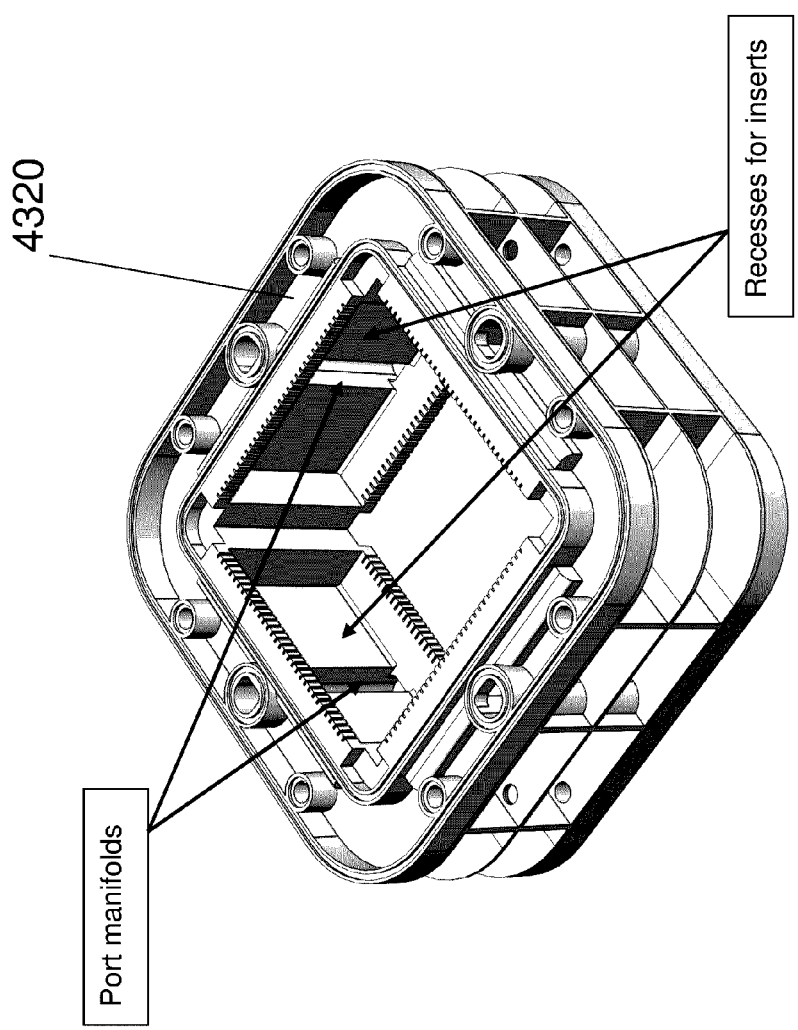
FIG. 43 is a schematic illustration of a molded frame in accordance with one or more embodiments.
Figure 44:
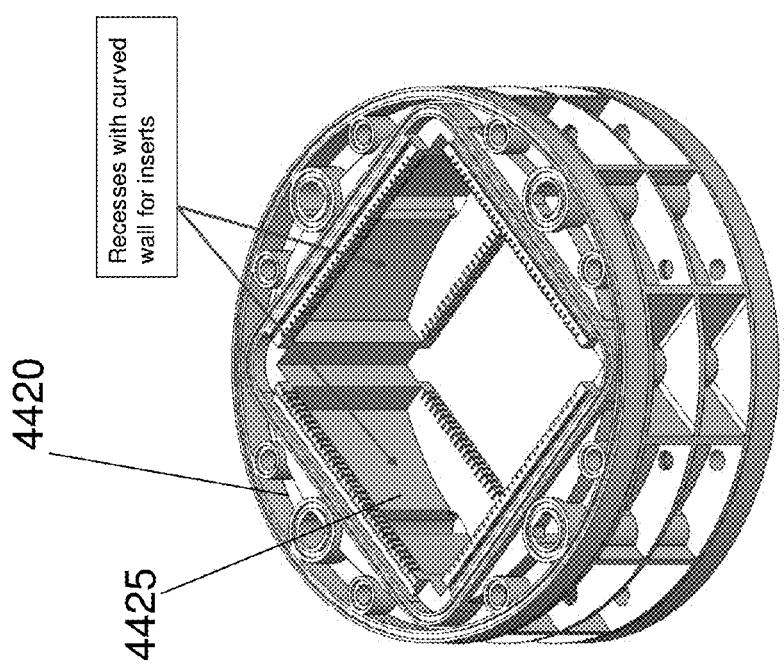
FIG. 44 is a schematic illustration of a molded frame with circular periphery in accordance with one or more embodiments.
Figure 45:
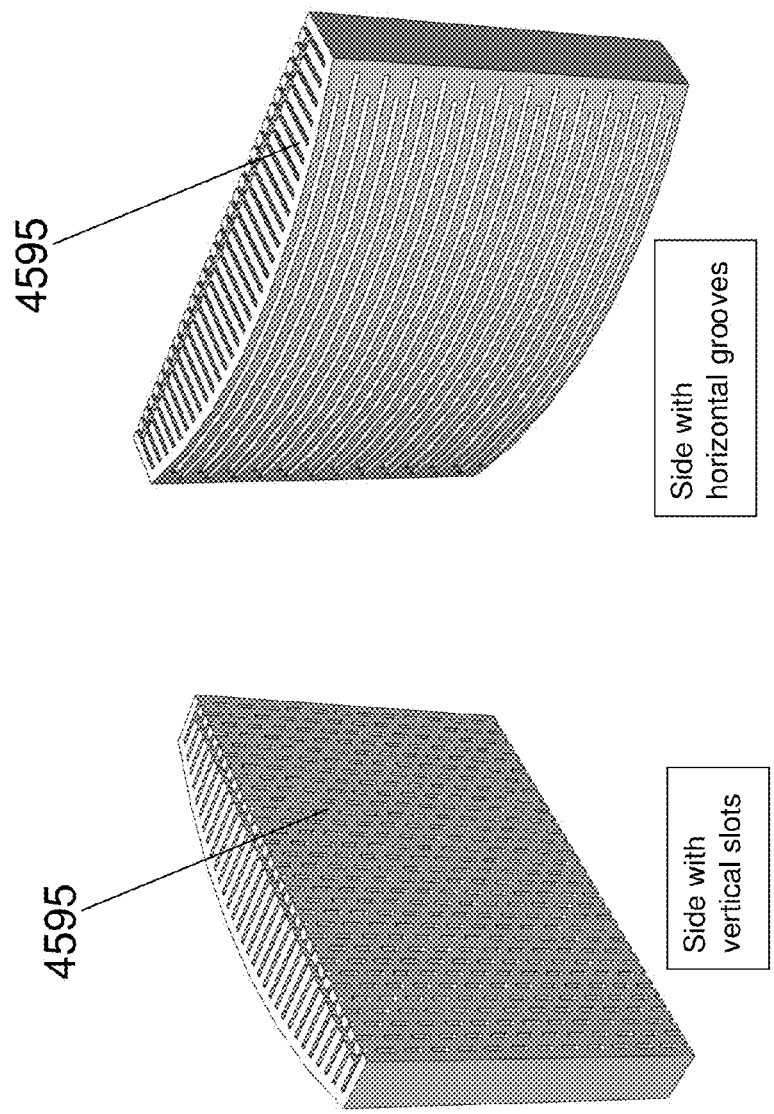
FIG. 45 is a schematic illustration of an insert with horizontal grooves on a curved side in accordance with one or more embodiments.

FIG. 39 shows the vertical slots on one face of an insert 3995 and the horizontal grooves on the other to form respectively the vertical and horizontal flow passages. The insert can be fabricated by machining or by molding. FIG. 40 shows an example of a frame 4020 design amenable to fabrication by machining. The frame has four recesses 4025 for inserts and four relatively wide grooves to form the port manifolds. Features such as grooves for O-rings to seal a sub-block to another are not shown for clarity. FIG. 41 shows a section view through the frame with an insert 4095 about to be installed. All four inserts, two for each stream, are installed before the stack is potted to the frame with adhesives at the corners. FIG. 42 is a section view that shows how each horizontal passage is in fluid communication with a number of vertical passages in parallel and how the horizontal passages are in fluid communication with each other via the port manifold. The stack of cell pairs is again represented by a transparent box for simplicity. The insert as shown also has additional slots on the top and bottom that are in fluid communication with slots in the frame that supply flow to the top and bottom ends of the stack. FIG. 43 shows an example of a molded frame 4310 that can accommodate the inserts shown in FIG. 39. The frame design can be optimized using Finite Element Analysis (FEA) software to minimize weight, which affect part cost, while meeting mechanical specifications on deflection and stress under a maximum internal pressure. FIG. 44 shows another example of a molded frame 4420. The recesses 4425 for the inserts have curved walls that conform to the overall circular shape of the frame. Multiple sub-blocks using this flame design can be stacked up and inserted into a cylindrical housing. FIG. 45 shows a corresponding insert with the horizontal grooves on the curved side. Not all of the flow passages have to be placed in the inserts. Horizontal grooves can be located in the frames 4620 to provide the horizontal flow passages while the vertical slots can be located in the inserts as illustrated in FIG. 46. Selection of the best frame and insert design for a cross-flow modular unit will be affected by the relative complexity and costs of component fabrication and assembly.

The insert and frames may be fabricated from materials with the requisite mechanical properties and chemical compatibility with the fluid to be treated. In applications such as desalination of seawater, for example, plastic materials are favored because of their resistance to corrosion and low cost. Potential plastics include polyvinyl chloride (PVC), polyethylene (PE), polypropylene (PP), polyamides (PA or nylon), acrylonitrile butadiene styrene (ABS), polysulfone or blends of plastics such as Noryl, which is a blend of polyphenylene oxide (PPO) and polystyrene (PS). Reinforcing fillers such as glass fibers may be added for enhancement of chemical resistance and mechanical and thermal properties.

In accordance with one or more embodiments, an electrochemical deionization device may comprise at least one cell pair and a frame. The at least one cell pair may be contained within the flame. In some embodiments, the electrochemical deionization device may comprise an electrodialysis device. In other embodiments, the electrochemical deionization device may comprise an electrodeionization device. The frame may include one or more slots. In some embodiments, blocks may be within the slots. In at least one embodiment, the slots may be perpendicular to the at least one cell pair.

In accordance with one or more embodiments, a cross-flow electrochemical separation device may comprise a modular unit. The modular unit may comprise at least one cell pair and a frame. The at least one cell pair may be attached to the frame. The device may be an electrodialysis device. In other embodiments, the device may be an electrodeionization device. The frame may include one or more slots. In some embodiments, blocks may be within the slots. In at least one embodiment, the slots may be perpendicular to the at least one cell pair. The device may further include a blocking membrane or spacer between each modular unit. The device may include a plurality of modular units. The modular units may be arranged to allow a multi-pass flow configuration. In some embodiments, the modular units may be contained within a cylindrical vessel.

In accordance with one or more embodiments, a method of assembly of an electrochemical deionization device may include bonding a first ion exchange membrane to a first screen, bonding a second ion exchange membrane to the first ion exchange membrane and screen, bonding a second screen to the first ion exchange membrane, first screen and second ion exchange membrane to form a cell pair, bonding a plurality of cell pairs together to form a stack of cell pairs, inserting the stack of cell pairs into a frame, and sealing the stack of cell pairs to the frame to form a modular unit. The method may further involve sealing a first ion exchange membrane to a first side of the modular unit, and sealing a second ion exchange membrane to a second side of the modular unit. In some embodiments, the method may further include placing a first modular unit on a second modular unit, placing an additional modular unit on the first and second modular units, and repeating to obtain a plurality of modular units of a desired number. The plurality of modular units may be inserted into a cylindrical vessel.

In some non-limiting embodiments, a stack of cell pairs may start and end with extended membranes. This may help isolate dilute, concentrate and electrode streams within a frame. The extended membranes may be of a different shape than the remainder of the membranes in the stack. The extended membranes may be bonded to the main stack on at least one side, such as on two sides. In some embodiments, corners of screen may protrude out of the stack at membrane corners. Protruding corners of screen may later act as a reinforcement to secure the membranes after corner potting or may wick to draw low-viscosity potting material into the stack during corner potting. An extended portion of top and bottom membranes may be folded as shown in FIG. 47A and bonded as shown in FIG. 47B to form a compartment after completing the potting of four corners. With the compartment formed, the integrity of the seals in the stack may be checked. An opening may then be created to allow dilute fluid to be diverted into another sub-block after final assembly. Concentrate may be separated from dilute and electrode fluid. O-rings or gaskets may be used where a sub-block is joined to another sub-block or to an electrode plate. In some embodiments, a single o-ring or gasket may be used to form a connection. In a sub-block, four pieces of inner supporting structure may be potted together with four corners of the stack to create a flat surface on a side wall for inlet and outlet ports. Ports may be important during assembly of two sub-assemblies as they provide an alternate flow path to separate concentrate and dilute stream at a sub-block connection to ensure streams will not mix. They may also create flat and solid surfaces on the membrane above and below it to facilitate sealing between sub blocks and end blocks during assembly. An external supporting structure may act as reinforcement to withhold positive pressure of the modular unit, preventing membrane rupture. It may also work with the inner supporting structure to strengthen bonding. Protrusions on each piece of external supporting structure may provide guidance during assembly to prevent misalignment. Port connectors may provide connection of sub-blocks. It may be plugged when flow path across sub block connection through extended membrane is required. This may also clamp the external and inner supporting structure in position to ensure that all four sides of the extended membrane are folded into a frame-like pattern before injecting a potting material to mold the corners. The top and bottom screen may be potted together with the corners potting to provide additional holding strength to the extended membranes. The two screens may serve as a spacer between the extended membranes of the sub-blocks at each connection. Grooves for o-ring or gaskets may be molded into both ends of the corners potted profile. During operation the corners potted profile may hold inner and external supporting structure together to withstand positive pressure in the manifolds. The potted corner portion that wicks through the corners of the screen may act to seal the stack. It may also serve as an isolating block to separate the dilute manifold from the concentrate manifold preventing cross-leak. The ends of the corner profile may act as a stopper preventing over clamp down of the sealing at all connections. FIG. 47C illustrates an assembly in accordance with these embodiments. In some embodiments, manufacturing may involve a first set of bonding between membranes and a second set of bonding at four-corners of a stack. Multiple modular units may be assembled, such as with o-rings, and sub-block quality control testing may be conducted during production.

Figure 48:
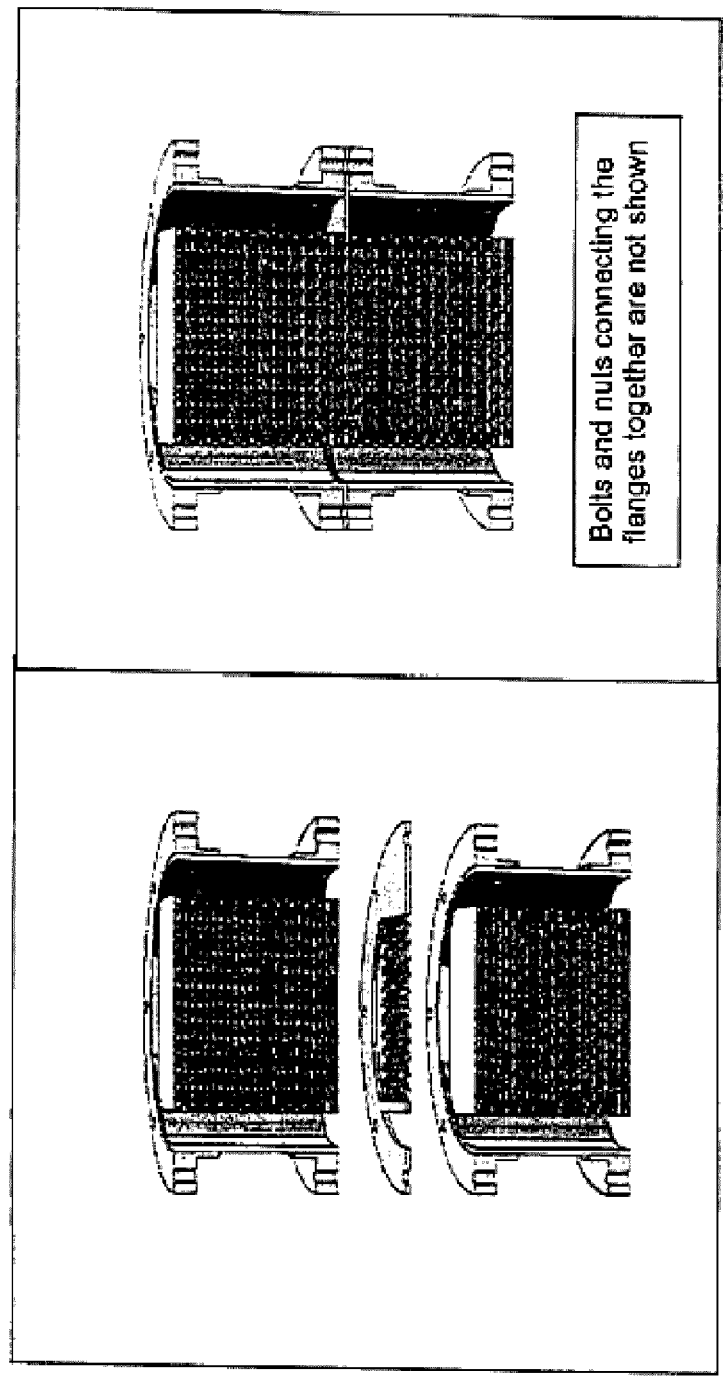
FIG. 48 presents a schematic illustration of modular units connected with flanges in accordance with one or more embodiments.

In accordance with one or more embodiments, a cell stack may be secured within a frame or support structure comprising an inlet manifold and an outlet manifold to provide a modular unit or modular unit. This modular unit may then be secured within a housing. The modular unit may further comprise a bracket assembly or corner support that may secure the modular unit to the housing. A second modular unit may be secured within the housing. One or more additional modular units may also be secured within the housing. In certain embodiments of the disclosure, a blocking spacer may be positioned between the first modular unit and the second modular unit. In some non-limiting embodiments, stacks of cell pairs with dilute and concentrate compartments in single-pass flow configurations may be sealed in sections to form modular units. The units may be joined together with blocking spacers in between to form multiple pass configurations. The stacks may be sealed to the housing section using adhesive at corners. The blocking spacers do not have to be sealed to the inside wall of the housing but are instead sandwiched between modular units and sealed between the ends. In some non-limiting embodiments, two modular units with flanges at ends may be stacked with a blocking spacer in between. The flanges may be bolted together. The blocking spacer may be molded with a frame and sealed between the flanges with adhesives or gaskets. Alternatively, the frame may be molded of a thermoplastic material or other fabrication method. In some embodiments, modular units may be connected with clamps or tie bars. The design of the blocking spacer may be modified accordingly. FIG. 48 illustrates one non-limiting embodiments of modular units assembled with a flange.

Figure 49:
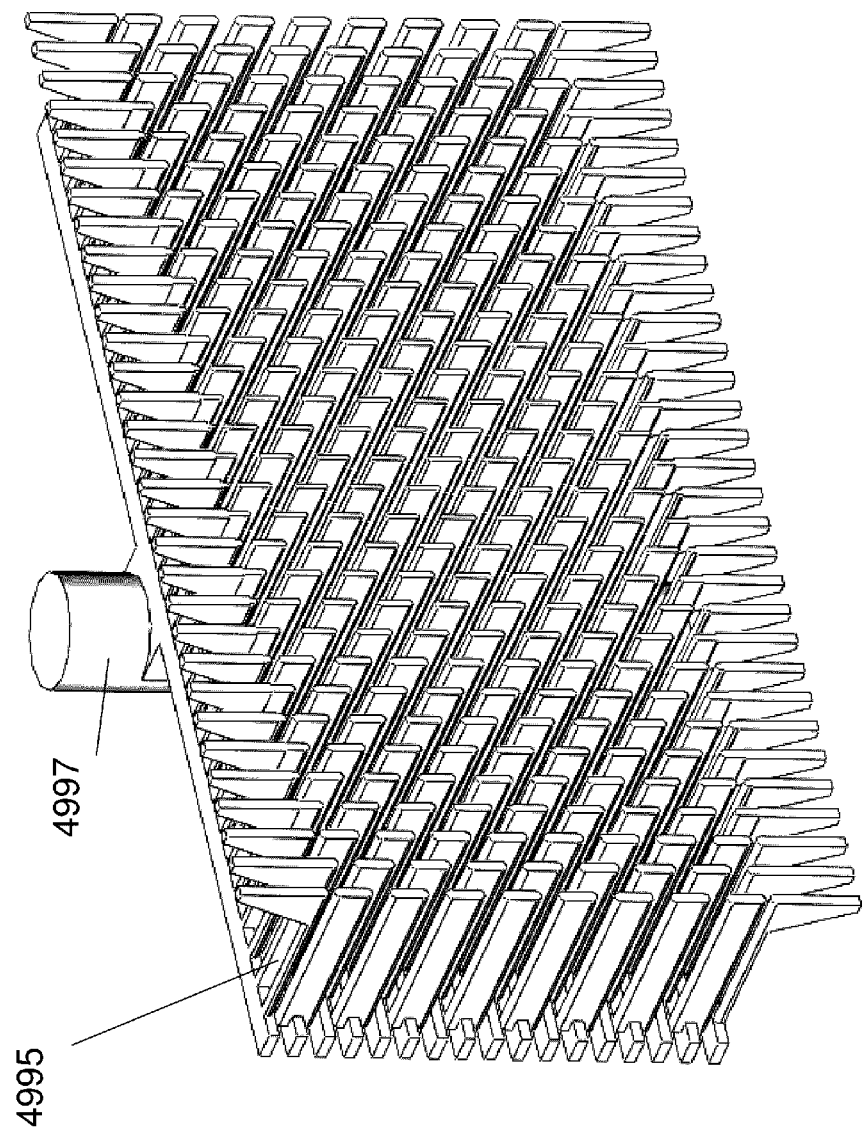
FIG. 49 presents a schematic illustration of a manifold associated with an insert in accordance with one or more embodiments.

In accordance with one or more embodiments, an insert as discussed herein may be designed to promote even flow distribution and with lower pressure drop across a membrane in a flow through an electrochemical separation device. Even flow distribution may help prevent scaling in spacers and improve current efficiency. Inlet and outlet port location and an insert's opening size may be varied to impact flow distribution. CFD software may facilitate evaluation of flow distribution and pressure drop. Lower pressure drop may lead to a lower pumping requirement. Modular unit cost may also be reduced as the modular unit may be built with thinner material. Inserts may act as a flow distributor and improve current efficiency. The size of ports or sots may be varied on the insert to vary flow distribution. FIG. 49 illustrates a flow distributor or insert 4995 with ports 4997 located towards center. In some embodiments, the size of slots on the insert may be varied at different locations.

The function and advantages of these and other embodiments will be more fully understood from the following examples. The examples are intended to be illustrative in nature and are not to be considered as limiting the scope of the embodiments discussed herein.

Example 1

Two modular units were constructed using a cross-flow configuration. Both modular units contained 50 cell pairs in a single pass. The control modular unit did not include a frame but was simply inserted into a circular enclosure as illustrated in FIGS. 27 and 28. The second modular unit was constructed with a frame containing slots as illustrated in FIGS. 29 and 30. The effective area per membrane for both modular units is 0.024 m2. The flow path length is 17.1 cm. The intermembrane spacing is 0.038 cm. Both modular units were operated on a feed water containing NaCl. An electric potential was applied to both modular units and the current efficiency determined.

The operating parameters were as follows:

| Modular unit | Control | Frame |
|---|---|---|
| Feed Conductivity mS/cm | 56.16 | 55.9 |
| Product Conductivity mS/cm | 55.23 | 54.08 |
| Amperage A | 2.01 | 3.0 |
| Product Flow Rate 1/min | 2.81 | 2.66 |
| Current Efficiency % | 49 | 63.3 |

The control modular unit without the frame had a measured current efficiency of 49%. The modular unit with the frame had a measured current efficiency of 63.3%. This represents approximately a 29% improvement in current efficiency when using a frame with slots.

Example 2

A prototype modular unit with 145 cell pairs in a 3-pass flow configuration was assembled. The cell pairs were in 3 frames, containing 50 cell pairs, 50 cell pairs and 45 cell pairs, respectively. In tests with 56 mS/cm NaCl solution as feed, the average process efficiency was 65% with flow velocity in the range of 2.0-4.3 cm/s.

Example 3

Figure 50:
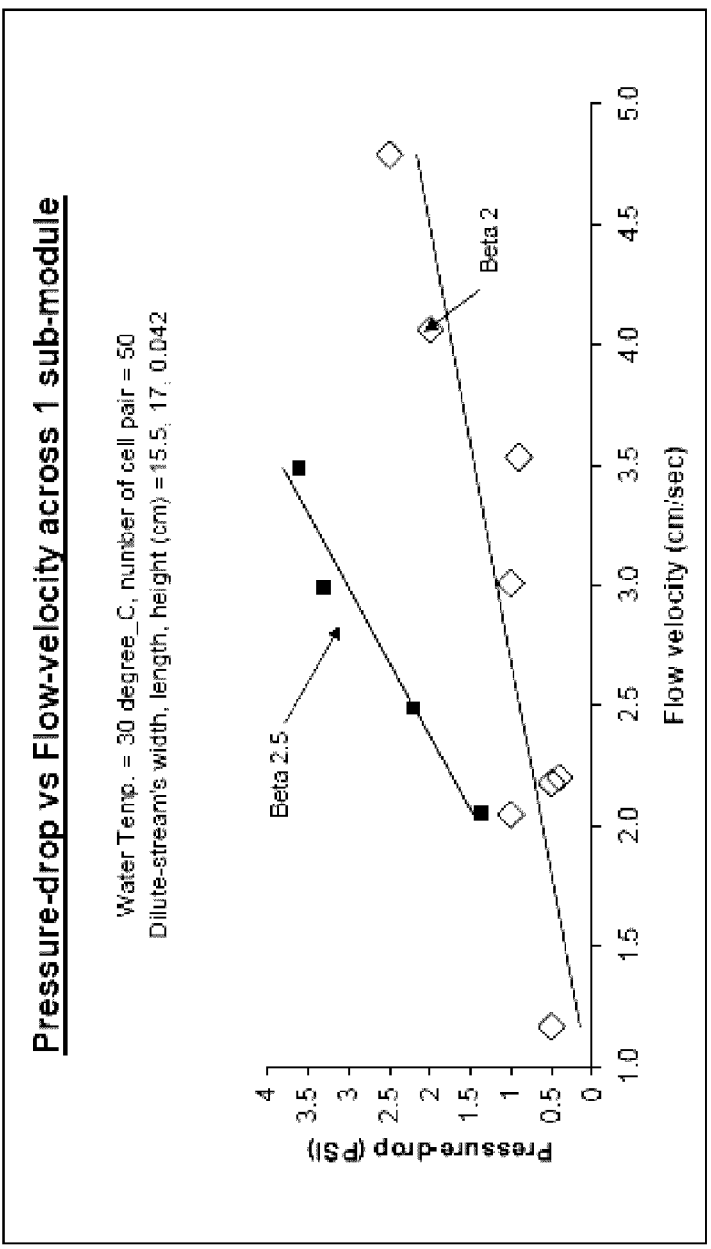
FIG. 50 presents data referenced in an accompanying Example in accordance with one or more embodiments.

A modular unit with an insert in the supporting frame (Beta 2.5) was operated in comparison to a modular unit without an insert in the supporting frame (Beta 2). The data is presented in FIG. 50, illustrating a higher pressure drop associated with the insert.

Example 4

A modular unit with an insert having a central manifold was modeled and simulated using computational fluid dynamics (CFD) software in comparison to a modular unit with an insert having an offset manifold. The results indicated that the offset manifold was associated with a wider region of low velocity flow at the sides than the central manifold. Scaling may be more likely to form at regions of low velocity so the central manifold may provide better flow distribution. The central manifold was also associated with a pressure drop about 14% lower than that of the offset manifold.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A flow distributor for electrochemical separation, comprising:
    a first side configured to be disposed outside of and proximate sides of a plurality of alternating ion depleting and ion concentrating compartments of a cell stack of an electrochemical separation device, and a second side arranged opposite the first side;
    a plurality of first passages, distinct from the plurality of alternating ion depleting and ion concentrating compartments of the cell stack, oriented in a first direction and each of the first passages configured to deliver feed directly to more than one of the plurality of ion depleting or ion concentrating compartments of the cell stack of the electrochemical separation device; and
    a plurality of second passages oriented in a second direction, the plurality of second passages in fluid communication with and proximate the plurality of first passages and configured to be disposed in fluid communication with an inlet manifold associated with the electrochemical separation device, the plurality of first and second passages constructed and arranged in cooperation to define a flow path between the first and second sides of the flow distributor.

2. The flow distributor of claim 1, wherein the first direction is substantially vertical.

3. The flow distributor of claim 2, wherein the second direction is substantially horizontal.

4. The flow distributor of claim 1, wherein the plurality of first passages are arranged in parallel.

5. The flow distributor of claim 4, wherein the plurality of second passages are arranged in parallel.

6. The flow distributor of claim 1, wherein at least one first passage intersects at least one second passage.

7. The flow distributor of claim 6, further comprising a blocking member at an intersection of a first passage and a second passage.

8. The flow distributor of claim 1, wherein the plurality of first passages and the plurality of second passages are arranged to reduce current leakage within the electrochemical separation device.

9. The flow distributor of claim 8, wherein the plurality of first passages are arranged with the plurality of second passages to define a lattice structure.

10. The flow distributor of claim 1, wherein the flow distributor further comprises a plurality of ports on the first side.

11. The flow distributor of claim 10, wherein the flow distributor further comprises a plurality of ports on the second side.

12. The flow distributor of claim 11, wherein the plurality of ports on the first and second sides comprise slots.

13. The flow distributor of claim 11, wherein each port on the first side is oriented substantially perpendicular to compartments of the electrochemical separation device.

14. The flow distributor of claim 13, wherein each port on the second side is oriented substantially parallel to compartments of the electrochemical separation device.

15. The flow distributor of claim 14, wherein the plurality of ports on the second side is fluidly connected to the plurality of ports on the first side via the flow path defined by the plurality of first and second passages.

16. The flow distributor of claim 13, wherein at least one port on the first side is in fluid communication with two or more compartments of the electrochemical separation device.

17. The flow distributor of claim 1, constructed and arranged to promote current flow to operating surfaces of the electrochemical separation device.

18. The flow distributor of claim 1, further comprising a port substantially centered with respect to the flow distributor to promote uniform flow distribution from the inlet manifold to the compartments of the electrochemical separation device.

19. The flow distributor of claim 1, constructed and arranged to fluidly isolate concentrated and diluted outlet streams associated with the electrochemical separation device.

20. The flow distributor of claim 1, configured to be removably received by the electrochemical separation device.

21. The flow distributor of claim 1, wherein the flow distributor is configured to be inserted into a recess of a frame surrounding the cell stack of the electrochemical separation device.

22. The flow distributor of claim 1, wherein the second side is configured to be disposed proximate the inlet manifold associated with the electrochemical separation device.

23. The flow distributor of claim 1, wherein the first side is further configured to be disposed proximate a plurality of inlets to the compartments of the cell stack of the electrochemical separation device.

24. The flow distributor of claim 1, wherein the flow distributor is configured to promote current efficiency within the electrochemical separation device.

25. The flow distributor of claim 1, wherein the flow distributor is configured to form a current bypass path having an electrical resistance greater than an electrical resistance of a path through the plurality of compartments of the cell stack of the electrochemical separation device.

* * * * *